(12) United States Patent
Ozawa et al.

(10) Patent No.: US 7,445,075 B2
(45) Date of Patent: Nov. 4, 2008

(54) FOUR-WHEELED VEHICLE

(75) Inventors: Eiji Ozawa, Wako (JP); Oumi Iida, Wako (JP); Seiji Higashihara, Wako (JP); Yumio Shibata, Wako (JP); Koichi Sugioka, Wako (JP); Kiyotaka Fujiwara, Wako (JP); Paolo Allasia, Turin (IT); Marco Ferrario, Turin (IT); Raffaele Vergano, Turin (IT); Andreas Wachtler, Turin (IT)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 160 days.

(21) Appl. No.: 10/629,208

(22) Filed: Jul. 29, 2003

(65) Prior Publication Data

US 2004/0079561 A1 Apr. 29, 2004

(30) Foreign Application Priority Data

Jul. 31, 2002 (IT) .......................... TO2002A0687
Jun. 2, 2003 (JP) ............................. 2003-157359

(51) Int. Cl.
*B60K 5/00* (2006.01)
(52) U.S. Cl. ........................................ 180/291; 180/908
(58) Field of Classification Search ................. 180/210, 180/215, 292, 337, 908, 291, 217, 233, 364, 180/366; 297/195.1, 215.1, 215.11, 195.12; 296/65.01
See application file for complete search history.

(56) References Cited

U.S. PATENT DOCUMENTS

| | | | | | |
|---|---|---|---|---|---|
| 2,435,021 | A | * | 1/1948 | Seider | 180/212 |
| 3,776,353 | A | * | 12/1973 | Roth | 180/215 |
| 4,225,183 | A | * | 9/1980 | Hanagan et al. | 297/411.31 |
| 4,437,535 | A | * | 3/1984 | Winchell et al. | 180/215 |
| 4,466,660 | A | * | 8/1984 | Mabie | 297/215.11 |
| 4,506,754 | A | * | 3/1985 | Hirano et al. | 180/219 |
| 4,606,429 | A | * | 8/1986 | Kurata | 180/292 |
| 4,625,825 | A | * | 12/1986 | Ethier | 180/24 |
| 4,662,468 | A | * | 5/1987 | Ethier | 180/215 |
| 4,721,178 | A | * | 1/1988 | Ito | 180/215 |
| 4,804,221 | A | * | 2/1989 | Saiki | 297/284.9 |
| 5,174,622 | A | * | 12/1992 | Gutta | 296/77.1 |

(Continued)

FOREIGN PATENT DOCUMENTS

JP SHO 41-15969 9/1966

(Continued)

OTHER PUBLICATIONS

Online description/publication of Corbin Seat for 2001 Honda Goldwing from webarchive.org, Jun. 19, 2001.*

*Primary Examiner*—Vaughan T Coolman
(74) *Attorney, Agent, or Firm*—Hamre, Schumann, Mueller & Larson, P.C.

(57) ABSTRACT

A four-wheeled vehicle includes a steering mechanism having a bar handle, right and left front wheels, and right and left rear wheels. The vehicle includes a front cover and a windshield disposed in front of the bar handle. The vehicle includes a driver's seat, and a rear passenger seat disposed behind the driver's seat and between the rear wheels. The rear passenger seat is directed forwardly. The vehicle includes a power unit part disposed below the rear passenger seat, and a body cover disposed rearwardly of the driver's seat.

18 Claims, 60 Drawing Sheets

U.S. PATENT DOCUMENTS

| | | | |
|---|---|---|---|
| 5,327,989 A * | 7/1994 | Furuhashi et al. | 180/248 |
| 5,984,356 A * | 11/1999 | Uphaus | 280/781 |
| 6,007,150 A * | 12/1999 | Clerkin et al. | 297/215.12 |
| 6,068,334 A * | 5/2000 | Bonfilio | 297/215.12 |
| 6,131,994 A * | 10/2000 | Yates | 297/214 |
| 6,142,253 A * | 11/2000 | Mueller et al. | 180/219 |
| 6,203,043 B1 * | 3/2001 | Lehman | 280/288.1 |
| 6,218,804 B1 * | 4/2001 | Toriyama et al. | 320/104 |
| 6,270,106 B1 * | 8/2001 | Maki et al. | 280/291 |
| 6,273,207 B1 * | 8/2001 | Brown | 180/219 |
| 6,293,616 B1 * | 9/2001 | Williams et al. | 296/203.01 |
| 6,296,073 B1 * | 10/2001 | Rioux et al. | 180/292 |
| 6,349,785 B1 * | 2/2002 | Ohmika et al. | 180/227 |
| 6,412,585 B1 * | 7/2002 | DeAnda | 180/291 |
| 6,547,023 B2 * | 4/2003 | Laimbock | 180/227 |
| D480,991 S * | 10/2003 | Rondeau et al. | D12/107 |
| D485,788 S * | 1/2004 | Guay et al. | D12/107 |
| 6,712,172 B2 * | 3/2004 | Inagaki et al. | 180/292 |
| 6,732,830 B2 * | 5/2004 | Gagnon et al. | 180/291 |
| 6,755,269 B1 * | 6/2004 | Davis et al. | 180/89.1 |
| 6,823,960 B2 * | 11/2004 | Shimizu et al. | 180/292 |
| 2001/0007293 A1 * | 7/2001 | Yamauchi | 180/219 |

FOREIGN PATENT DOCUMENTS

| | | |
|---|---|---|
| WO | WO 9709223 A1 * | 3/1997 |
| WO | WO 9954188 A1 * | 10/1999 |

* cited by examiner

FIG. 19A        FIG. 19B
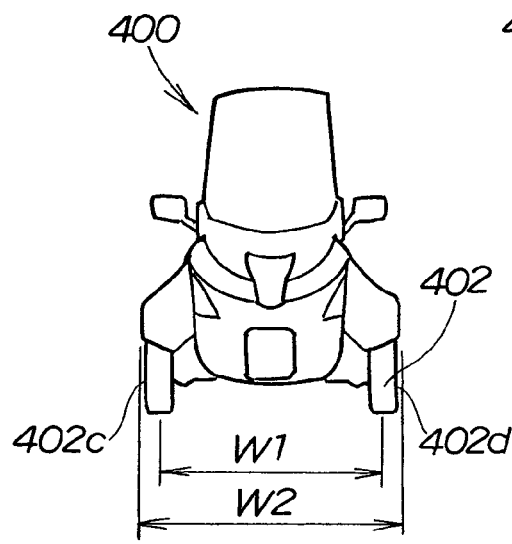 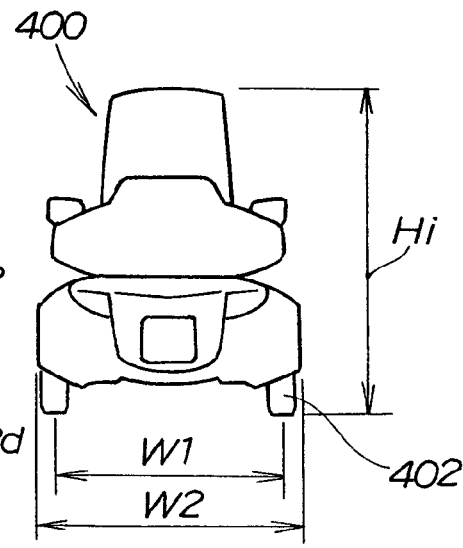
FIG. 19C        FIG. 19D        FIG. 19E
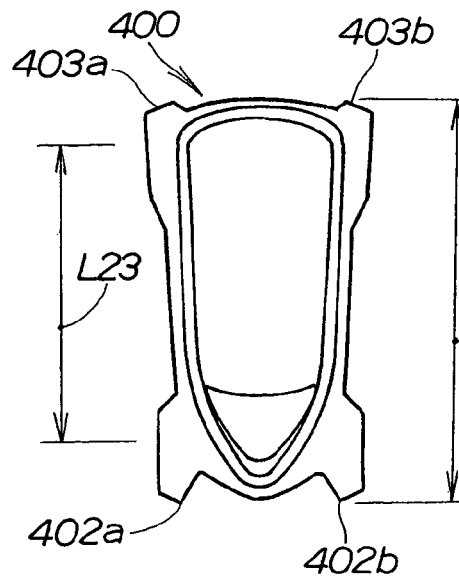 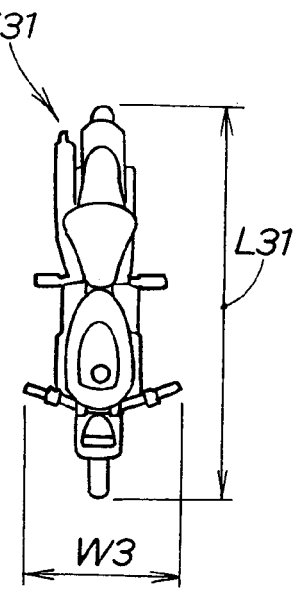 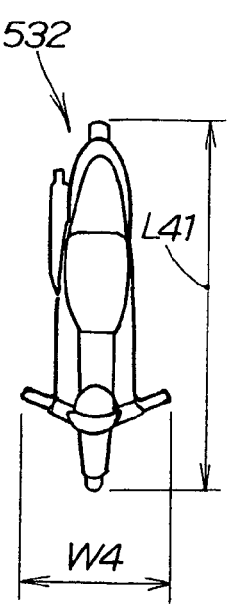

FOUR-WHEELED VEHICLE

FIELD OF THE INVENTION

The present invention relates to an improvement in a vehicle including a steering mechanism with a bar handle.

BACKGROUND OF THE INVENTION

Known vehicles include steering mechanisms having bar handles. Such vehicles are known from, for example, Japanese Patent Post-Exam Publication No. SHO 41-15969. The publication discloses a three-wheeled vehicle including two front wheels, one rear wheel, a steering mechanism having a bar handle, a driver's seat, and a passenger's seat disposed behind the driver's seat.

The disclosed vehicle includes the single rear wheel positioned centrally of a rear part thereof. Since the rear part is mostly occupied by the rear wheel, such components as a power unit can not be disposed thereat. Therefore, the passenger's seat is inevitably positioned at a higher level above the rear wheel. With this arrangement, the vehicle undesirably has its center of gravity positioned higher. The vehicle should be improved to ensure that its front and rear parts has weights balanced with each other when a driver and a passenger sit on their seats.

The vehicle has doors provided at opposite sides thereof. The driver's seat and the passenger's seat are of "sit-in type". This is disadvantageous in that the driver and passenger get on or off the vehicle with difficulty or troublesomeness.

Further, this vehicle is not designed to take account of protecting the driver and the passenger.

Further, the vehicle is not improved for practical use. For the vehicle to be parked advantageously, for example, the vehicle should be designed to be advantageously parked in a space available between two-wheeled or four-wheeled vehicles parked near to the vehicle.

SUMMARY OF THE INVENTION

An object of the present invention is to provide a four-wheeled vehicle having a space useful for providing a lower center of gravity, so as to maintain weight balance when passengers sit on their respective seats disposed one behind another.

A further object of the present invention is to provide a four-wheeled vehicle designed to allow passengers to get on or off the vehicle easily.

A still further object of the present invention is to provide a four-wheeled vehicle designed to protect passengers with increased effectiveness.

According to a first aspect of the present invention, there is provided a four-wheeled vehicle comprising: a steering mechanism having a bar handle; a front part having right and left front wheels; a rear part having right and left rear wheels; a driver's seat disposed at said front part; and a rear passenger seat disposed behind said driver's seat and between said right and left rear wheels, said rear passenger seat facing forwardly.

The steering mechanism has the bar handle that is easy to operate. Manipulating the bar handle requires less time and effort than turning a conventional steering wheel. The four wheels are arranged such that the vehicle can travel stably. Because the vehicle is designed to travel stably, the former can include a seat elongated longitudinally thereof. The seat includes the driver's seat and the passenger seat disposed in tandem. The driver's seat and the passenger seat provide a useful space formed therebelow. Forming such a space is advantageous in that the passenger seat is positioned so low as to provide a lowered center of gravity of the vehicle. Providing the lowered center of gravity helps the vehicle travel with increased stability.

In a preferred form of the present invention, said driver's seat includes a front part having driver's footrests provided at opposite sides thereof, said driver's seat being formed to allow a driver to sit astride thereon with his feet rested on said footrests.

With this arrangement, the driver can hold his or her back upright while sitting on the driver's seat astride. The driver sitting in the upright posture maintains his or her high eye level. Taking the upright posture is advantageous because the driver can get on or off the vehicle easily.

In a further preferred form of the present invention, each of said footrests has a side edge projecting upwardly.

The side edge portions projecting upwardly are disposed to allow the footrests to be splashed with little or no water when the vehicle travels through a deep puddle.

In a further preferred form of the present invention, said right front wheel and said right rear wheel provide a first straight line extending therethrough, said left front wheel and said left rear wheel provide a second straight line extending therethrough, and said side edges are positioned within a region defined between said first and second straight lines when viewed in top plan.

The side edge portions thus arranged do not hinder a person from pushing the vehicle. Therefore, the person can walk easily, pushing the vehicle.

In a further preferred form of the present invention, the four-wheeled vehicle further comprises rear passenger's footrests disposed behind said driver's footrests.

The passenger's footrests are disposed behind and continuous with the driver's footrests. Such footrests are simple in construction. Because the driver's footrests are disposed in front of the passenger's footrests, passenger(s) can sit on the rear passenger seat, resting the feet on the driver's footrest(s).

In a further preferred form of the present invention, said driver's seat and said rear passenger seats are opened at opposite sides thereof.

This arrangement allows the driver and passenger to get on or off the vehicle readily.

In a further preferred form of the present invention, said driver's seat and said rear passenger seat are formed to allow passengers to sit astride thereon.

All the passengers can sit on the seats astride. Bestriding the seats is advantageous because the passengers can get on or off the vehicle easily.

In a further preferred form of the present invention, said driver's seat is positioned at substantially the same level as said rear passenger seat.

This is advantageous because the driver's seat can be easily formed integrally with the rear passenger seat. Further, weights of the driver and the driver's seat are balanced with weights of the passenger and the rear passenger seat.

In a further preferred form of the present invention, said rear passenger seat has bulged portions provided at opposite sides thereof for providing a larger width than said driver's seat.

Provision of the bulged portions allows the passenger to easily sit on or stand up away from the rear passenger seat. Further, the rear passenger seat having the bulged portions is widened so that two passengers sit thereon side by side or otherwise large-sized baggage is placed thereon.

In a further preferred form of the present invention, the four-wheeled vehicle further comprises a front cover and a windshield disposed in front of said bar handle, and a body cover disposed behind and below said driver's seat.

This means that the vehicle is opened at any side through which passengers pass to sit on or stand up away from the seats. The other sides of the vehicle are covered to protect a driver sitting on the driver's seat from rain, mud, dust and the like.

In a further preferred form of the present invention, the four-wheeled vehicle further comprises a roof member continuous with said windshield and disposed above said driver's seat and said rear passenger seat.

Providing the roof member makes it possible not only for the driver but also for a rear passenger sitting on the rear passenger seat to be protected from rain. Alternatively, baggage can be placed on the rear passenger seat, protected from rain by the roof member. Because the vehicle has its rear part protected from rain by the roof member, the protected rear part is useful for exhibition, sale or transportation of commercial items or goods. Since the vehicle is covered at its opposite sides, passengers get on or off the vehicle readily. The roof member does not hinder the passengers from getting on or off the vehicle. Furthermore, the vehicle has its opposites optionally covered with additional, detachable curtains. The thus arranged vehicle can be advantageously used for various purposes.

In a further preferred form of the present invention, the four-wheeled vehicle further comprises a power unit part disposed below one of said driver's seat and said rear passenger seat, said power unit part including a torque converter mechanism.

This arrangement eliminates the need for an additional clutch. Therefore, the power unit part can achieve transmission of motive power without requiring a driver to perform clutch operation.

In a further preferred form of the present invention, said power unit part further includes a transmission mechanism for transmitting an output from said torque converter mechanism to said right and left rear wheels to drive said right and left rear wheels.

With the thus arranged power unit part, a driver can drive the vehicle for fun or other various purposes.

In a further preferred form of the present invention, the four-wheeled vehicle further comprises first side support members disposed at opposite sides of said driver's seat.

The side support members are disposed to advantageously support a driver sitting on the driver's seat, especially when the vehicle makes a turn to apply a centrifugal force to the driver. Such side support members are useful especially for a four-wheeled vehicle of small track designed to apply a greater centrifugal force to the driver when making a turn.

In a further preferred form of the present invention, the four-wheeled vehicle further comprises second side support members disposed at opposite sides of said rear passenger seat.

The side support members are disposed to advantageously support a rear passenger sitting on the rear passenger seat, especially when the vehicle makes a turn to apply a greater centrifugal force to the rear passenger.

In a further preferred form of the present invention, the four-wheeled vehicle further comprises a storage portion, a roll bar and roof supporting posts provided behind said rear passenger seat, and at least one of said storage portion, and said roll bar and said roof supporting posts is united with said second side support members.

The side support members are united with members of increased rigidity. This arrangement enables the side support members to withstand a greater load with increased sufficiency. The side support members themselves need not have increased rigidity. Thus, the side support members are compact, making no change to an outer appearance of the vehicle.

In a further preferred form of the present invention, the four-wheeled vehicle further comprises a backrest disposed behind said driver's seat and united with said first side support members.

Forming the side support members integrally with the backrest helps decrease the number of components for the vehicle. Because the backrest originally serves as a cushion, the side support members serve as cushions in addition to supporting the driver. Accordingly, the driver is more advantageously or comfortably supported by the side support members.

In a further preferred form of the present invention, said driver's seat and said rear passenger seat have a member disposed therebetween, said driver's seat and said rear passenger seat cooperating with each other to provide a single seat, said member being positioned at an intermediate part of said single seat.

By providing such a member, a single seat can be separated into the driver'seat and the rear passenger seat. In other words, there is no need to provide two different types of seats for a driver and a passenger. With this arrangement, it becomes possible to provide the lightweight, compact vehicle having the reduced number of components.

In a further preferred form of the present invention, the four-wheeled vehicle, further comprising a power unit part disposed below said rear passenger seat, said front wheel and said rear wheel providing a straight line extending through the vicinities of uppermost points thereof, said power unit part being disposed below said straight line.

The vehicle having the seats extending longitudinally thereof needs to be steered with better stability than a known four-wheeled vehicle different from the vehicle of the present invention. For better stability, the vehicle should have heavy components disposed closely to each other as well as providing a lowered center of gravity. The power unit part of high weight is disposed in such a manner that a driver drives or steers the vehicle with improved stability.

In a further preferred form of the present invention, the four-wheeled vehicle further comprises a power unit part disposed below said rear passenger seat, said power unit part including a forwardly directed engine.

The vehicle having the seats extending longitudinally thereof needs to be steered with better stability than a known four-wheeled vehicle different from the vehicle of the present invention. For better stability, the vehicle should have heavy components disposed closely to each other as well as providing a lowered center of gravity. The power unit part of high weight is disposed in such a manner that a driver drives or steers the vehicle with improved stability.

According to a second aspect of the present invention, there is provided a four-wheeled vehicle comprising: a front part having right and left front wheels; a rear part having right and left rear wheels; a driver's seat disposed at the front part; and a rear passenger seat disposed behind said driver's seat and between said right and left rear wheels, said rear passenger seat facing forwardly and being in the form of a bucket seat.

For a conventional four-wheeled vehicle including a seat extending longitudinally thereof, a passenger sitting on a rear part of the seat is undesirably subjected to a great centrifugal force produced when the vehicle makes a turn. For the vehicle including the rear passenger seat taking the form of the bucket seat, however, the passenger sitting on the rear passenger seat is subjected to the least centrifugal force when the vehicle makes a turn.

According to a third aspect of the present invention, there is provided a four-wheeled vehicle comprising: a front part having right and left front wheels; a rear part having right and left rear wheels; a driver's seat disposed at the front part; a rear passenger seat disposed behind said driver's seat and between said right and left rear wheels, said rear passenger seat facing forwardly; a front roll bar disposed in front of said driver's seat and in upright position; a rear roll bar disposed behind said rear passenger seat and in upright position; and said front roll bar and said rear roll bar providing a straight line extending through the vicinities of top ends thereof, said straight line having a space defined therebelow to allow a driver and a rear passenger to sit on said driver's seat and said rear passenger seat, respectively, within said space.

This arrangement makes it possible to advantageously protect a driver sitting on the driver's seat and a rear passenger sitting on the rear passenger seat.

In a preferred form of the invention, the four-wheeled vehicle further comprises a backrest disposed behind said driver's seat, said backrest being positioned at the same level as the waist of said driver sitting on said driver's seat.

The front roll bar is disposed lower than the rear roll bar so as to ensure that the driver has a forward view. Thus, the straight line extends forwardly and downwardly from the vicinity of the top end of the rear roll bar to the vicinity of the top end of the front roll bar. When in upright posture, the driver has his or her head positioned below or on the straight line. The backrest of the driver's seat is disposed so low that the driver brings his or her head down into a space defined below the straight line.

According to a fourth aspect of the present invention, there is provided a four-wheeled vehicle having substantially the same overall length as a motorcycle, and a width substantially half the overall length, said vehicle comprising: a front part having right and left front wheels; a rear part having right and left rear wheels; a driver's seat disposed at the front part; and a rear passenger seat disposed behind said driver's seat and between said right and left rear wheels, said rear passenger seat facing forwardly.

The thus arranged vehicle can be parked in a space having the same length as a motorcycle. Accordingly, it becomes possible to provide the four-wheeled vehicle designed to match existing parking lots or car parks.

BRIEF DESCRIPTION OF THE DRAWINGS

Certain preferred embodiments of the present invention will hereinafter be described in detail, by way of example only, with reference to the accompanying drawings, in which:

FIG. 19A is a front elevation view of the vehicle of FIG. 1, FIG. 19B shows a modification of the vehicle of FIG. 1 as viewed in front elevation, FIG. 19C is a top plan view of the vehicle of FIG. 1, and FIGS. 19D and 19E illustrate different motorcycles for the purpose of comparison to the vehicle as shown in FIG. 19A through FIG. 19C;

DETAILED DESCRIPTION OF THE PREFERRED EMBODIMENTS

Figure 1:
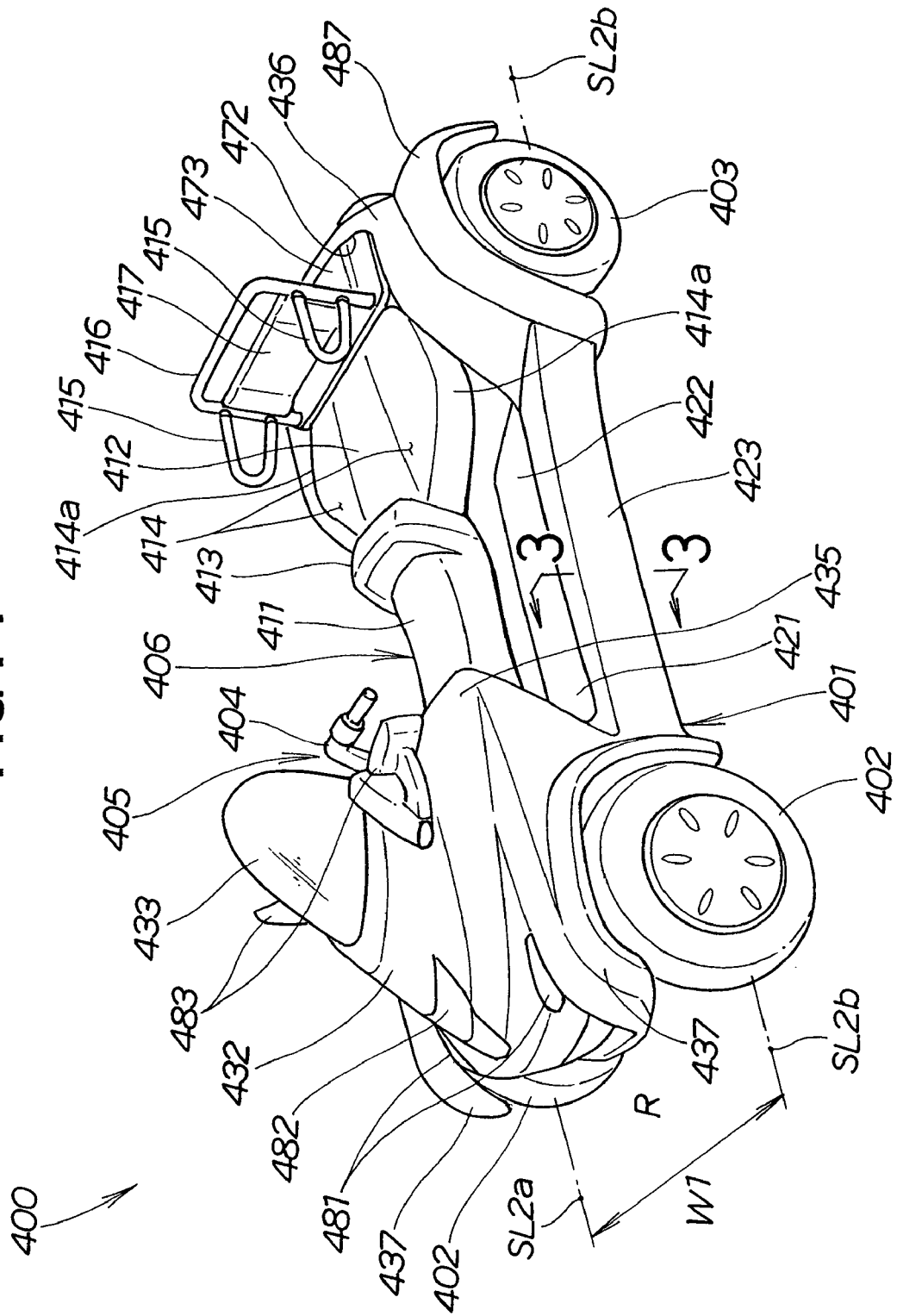
FIG. 1 is a perspective view of a four-wheeled vehicle according to a first embodiment of the present invention.
Figure 2:
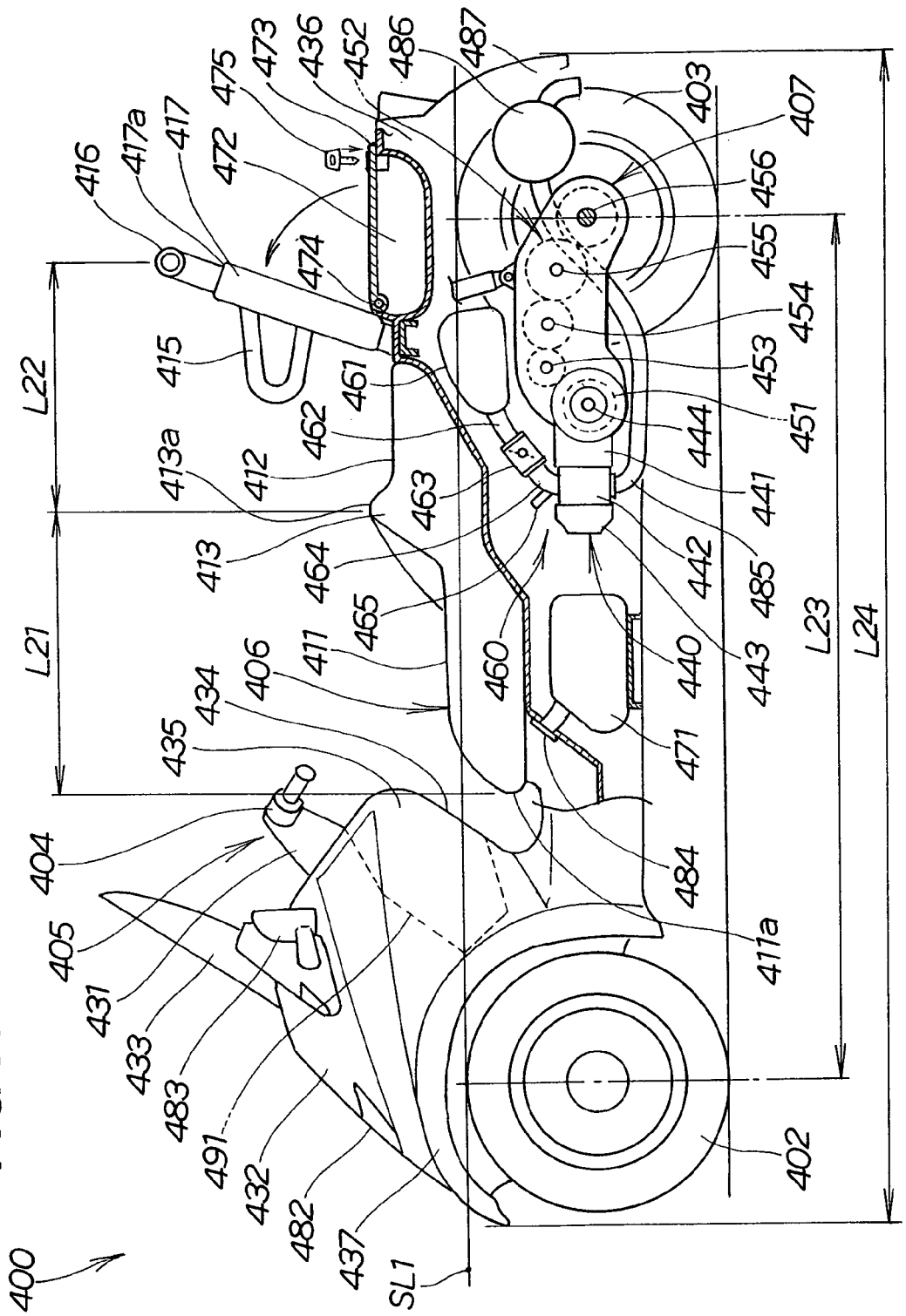
FIG. 2 illustrates partly in cross-section the vehicle of FIG. 1 as viewed in left side elevation.

Referring to FIG. 1 and FIG. 2, there is shown a small-sized, four-wheeled vehicle 400 according to a first embodiment of the present invention. The vehicle 400 includes a vehicle body 401. The vehicle body 401 includes right and left front wheels 402, 402 provided at right and left sides of a front part thereof, and right and left rear wheels 403, 403 provided at right and left sides of a rear part thereof. The vehicle body 401 has a seat 406 provided centrally thereof. The vehicle 401 includes a steering mechanism 405 provided at the front part thereof. The mechanism 405 has a bar handle 404. The vehicle 401 includes a power unit part 407 provided at the rear part thereof.

Each of the four wheels 402, 402, 403, 403 includes a tire having a diameter of 12 inches, for example.

The seat 406 extends longitudinally of the vehicle body 401. This type of seat is often called "tandem seat". The seat 406 includes a driver's seat 411 provided at a front part thereof and a rear passenger seat 412 provided at a rear part thereof. These seats 411, 412 are positioned in tandem. The seat 406 includes a member at its intermediate part to define the driver's seat 411 and the passenger seat 412. That is, this member is disposed between the driver's seat 411 and the rear passenger seat 412. The member is, for example, a backrest 413 for the driver's seat 411. The driver's seat 411 cooperates with the passenger seat 412 to provide the single seat 406. The backrest 413 provided at a rear part of the driver's seat 411 has the same level as a driver's waist or hip when the driver sits on the seat 411.

The seat 406 may have a storage space of small depth formed therebelow.

The driver's seat 411 has its right and left sides opened outwardly. The level of the seat 411 is substantially equal to that of the seat 412. More specifically, the rear passenger seat 412 is positioned at a slightly higher level than the driver's seat 411. The seats 411, 412 have substantially the same level as a first straight line SL1 extending through the vicinities of uppermost points of the wheels 402, 403. This makes it possible for the vehicle 400 to provide a lowered center of gravity.

The passenger seat 412 faces forwardly and is disposed behind the driver's seat 411 and between the right and left rear wheels 403, 403. The rear passenger seat 412 has right and left bulged portions 414, 414 provided at right and left sides thereof, respectively. Each bulged portion 414 is opened at its one side 414a opposite or remote from the seat 412. The seat 412 including the bulged portions 414, 414 are wider than the seat 411. The rear passenger seat 412 has right and left side support members (second side support members) 415, 415 provided rightwardly and leftwardly thereof.

Provision of the bulged portions 414, 414 enables a passenger to sit on or stand up away from the seat 412 with minimum difficulty. Further, two passengers can sit on the seat 412 side by side. Otherwise, any load or baggage of large size may be placed or carried on the seat 412.

The side support members 415, 415 are united with a roll bar 416 disposed behind the rear passenger seat 412. The roll bar 416 is disposed in an upright position and mounted to the vehicle body 401. The roll bar 416 is of inverted U-shaped configuration as viewed in front elevation. The roll bar 416 has the right and left side support members 415, 415 projecting forwardly from right and left sides thereof, respectively. The roll bar 416 has a passenger's backrest 417 provided centrally thereof. More specifically, the backrest 417 extends between the right and left sides of the roll bar 416.

The driver's seat 411 has its length L21 (see FIG. 2) or distance between a front end 411a thereof and an intermediate portion 413a of the driver's backrest 413. The passenger seat 412 has its length L22 or distance between the intermediate portion 413a and a rear end 417a of the passenger's backrest 417.

The backrest 417 is positioned proximate foremost points of the rear wheels 403, 403. This makes it possible to provide a minimized wheelbase L23 or distance between the front and rear wheels 402, 403. Accordingly, the vehicle 400 extends in a front-and-rear direction thereof by a reduced distance L24. As can be seen from FIG. 2, the distance L24 is defined by a distance between a foremost point of a front fender 437 and a rearmost point of a rear fender 487.

The vehicle body 401 has right and left driver's footrests (only left one shown and designated 421) provided at right and left sides of a front part of the driver's seat 411. Each footrest 421 serves as a floor on which the driver sitting on the seat 411 rests his or her foot or feet. Providing these footrests 421, 421 allows the driver to sit on the seat 411 astride.

Each footrest 421 for the driver has a passenger's footrest 422 disposed rearwardly thereof. The footrest 422 is continuous with the footrest 421. Each footrest 422 serves as a floor on which the passenger sitting on the seat 412 rests his or her foot or feet. Providing the passenger's footrests allows the passenger to sit on the seat 412 astride.

Figure 3:
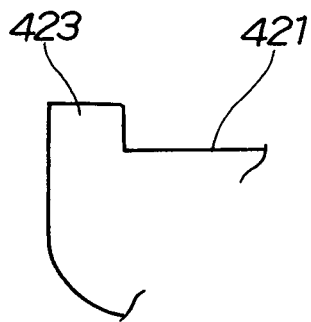
FIG. 3 is a cross-sectional view taken along line 3-3 of FIG. 1.

As shown in FIG. 1 and FIG. 3, the left footrest 421 has a projecting side edge portion 423 provided at one side edge thereof opposite or remote from the seat 411. So does the right footrest 421 (not shown). Each projecting side edge portion 423 projects upwardly. As viewed in top plan, the left projecting side edge portion 423 is positioned more inwardly of the vehicle body 401 than a left second straight line SL2b extending through the left front wheel 402 and the left rear wheel 403. Likewise, when viewed in top plan, the right projecting side edge portion 423 (not shown) is positioned more inwardly of the vehicle body 401 than a right second straight line SL2a extending through the right front wheel 402 and the right rear wheel 403. In other words, the right and left projecting side edge portions are positioned within a space or region R defined between the straight lines SL2a, SL2b. Thus, the projecting side edge portions provide a distance therebetween smaller than a tread (track) W1 between the front wheels 402, 402.

Further in FIG. 1 and FIG. 2, the vehicle 400 has a handle post 431, the bar handle 404, a front cover 432, a windshield 433, an inner cover 434, and right and left leg shields 435, 435 all of which are provided at a front part thereof. More specifically, the handle post 431 has the bar handle 404 provided at an upper end thereof. The front cover 432 covers the front part of the vehicle body 401. The front cover 432 has the windshield 433 mounted on a top edge thereof. The inner cover 434 is disposed inside the front cover 432 and covers in part the handle post 431. The inner cover 434 has the right and left leg shields 435, 435 disposed at right and left sides thereof, respectively (see FIG. 4A and FIG. 4B). The front cover 432 and the windshield 433 are positioned in front of the bar handle 404. Behind and below the driver's seat 411, there is disposed a body cover 436.

The right leg shield 435 extends rearwardly from a right front fender 437 and the front cover 432. Likewise, the left leg shield 435 extends rearwardly from a left front fender 437 and the front cover 432. When sitting on the seat 411, therefore, the driver has his or her right and left knees covered with the right and left leg shields 435, 435, respectively.

The power unit part 407 is disposed below the rear passenger seat 412. More specifically, the power unit part 407 is positioned below the first straight line SL1 extending through the vicinities of the uppermost points of the front and rear wheels 402, 403.

The power unit part 407 is a unit swing-type power unit (a unit swing-type engine) and is suspended on the vehicle body 401 in such a manner as to pivot vertically on a pivot shaft (not shown) together with the rear wheels 403, 403. The power unit part 407 includes an engine 440 disposed at a front side thereof and a transmission mechanism 452 disposed at a rear side thereof. The mechanism 452 is positioned behind the engine 440. The thus arranged power unit part 407 is made compact and lightweight. This leads to improved productivity of the power unit part.

The power unit part 407 may have a differential gear built therein and be secured to the vehicle body 401. In such a case, there can be provided a free space within which the power unit part 407 would otherwise pivot. Such a space is useful for some purpose.

The engine 440 is a four-stroke one of 125 cc. The engine 440 is oriented forwardly in a lying position and includes a cylinder 441, a cylinder head 442, and a head cover 443. The power unit part 407 may have an electric motor in lieu of the engine 440 to produce a motive power source for causing the vehicle 400 to travel. The engine 440 may have its displacements of up to 200 cc suitable for the size of the vehicle 400.

The power unit part 407 further includes a torque converter (a torque converter mechanism) 451. The transmission mechanism 452 is arranged to transmit an output from the torque converter 451 to rear wheels 403, 403. When supplied with the output, the rear wheels are driven. The engine 440 includes a crankshaft 444 having the torque converter 451 provided at a right end thereof. The crankshaft 444 has an AC generator (not shown) provided at a left end thereof. The transmission mechanism 452 has a main shaft 453 and a counter shaft 454. The power unit part 407 includes an output shaft 455. The shafts 453, 454 have their gears arranged to reduce the engine speed of the engine 440. The gears are thus turned at such a reduced engine speed to provide a motive power the output shaft 454 transmits to a differential gear for an axle 456.

As shown in FIG. 2, the engine 440 has an intake system 460. The system 460 has an air cleaner 461 disposed above the transmission mechanism 452. The air cleaner 461 extends forwardly and downwardly. The cleaner 461 has an outlet port formed at a front end thereof. The outlet port of the air cleaner 461 is connected via a connecting tube 462, a throttle valve 463, and an inlet pipe 464 to an intake port of the engine 440. Either of the intake port and the inlet pipe 464 includes a fuel injection device 465.

Below the driver's seat 411, there is disposed a fuel tank 471. The seat 411 may have the tank 471 disposed below the front part thereof. The body cover 436 has its rear part positioned behind the passenger's seat 412 and above the rear wheels 403, 403. The rear part of the body cover 436 has a storage portion (a rear storage box) 472 formed at a top thereof. The storage portion 472 has an opening formed at a top thereof. The opening of the storage portion 472 is closed by a deck 473 serving as a lid.

The storage portion 472 is positioned directly behind the backrest 417. The deck 473 is a flat sheet. The deck 473 has a hinge 474 disposed proximate the backrest 417. The deck 473 is vertically pivotable on the hinge 474 to open and close the opening of the storage portion 472. The deck 473 can be locked with a key 475, thereby keeping the opening of the storage portion 472 closed.

The front cover 432 has the right front fender 437 bulged outwardly or rightwardly from a right side edge thereof, and the left front fender 437 bulged outwardly or leftwardly from a left side edge thereof. The right front fender 437 has a right direction indicator 481 formed at an upper portion thereof. The left front fender 437 has a left direction indicator 481 formed at an upper portion thereof. Reference numeral 482 denotes a headlamp, 483 a side mirror, 484 a port for taking in fuel to be fed or supplied to the tank 471, 485 an exhaust pipe for the engine 440, and 486 a muffler (silencer). The vehicle body 401 includes right and left rear fenders (only one shown and designated at 487).

Figure 4A:
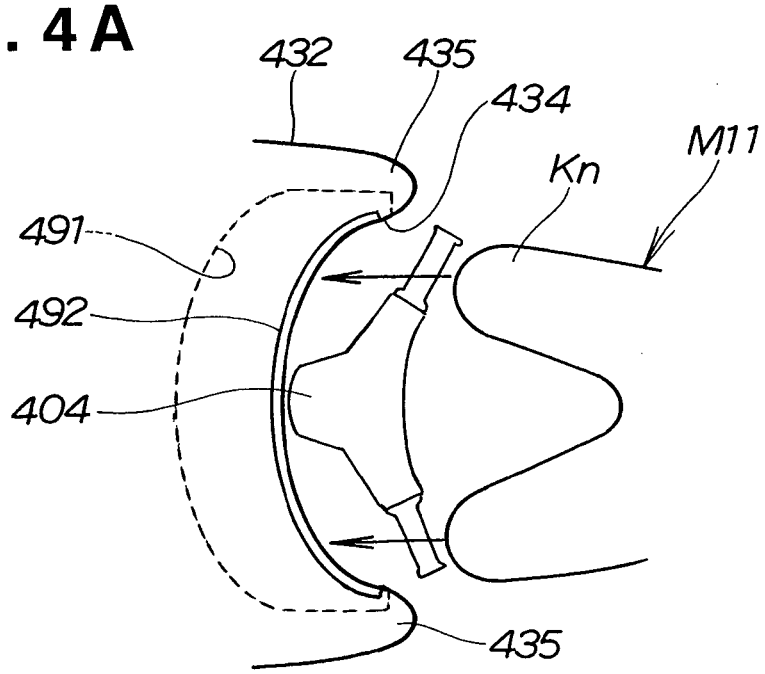
FIG. 4A is a top plan view of the knees of a driver and a front part of the vehicle including a bar handle and a front cover of the vehicle and FIG. 4B is the view of FIG. 4A except that the driver hits his or her knees on the front part of the vehicle.

As shown in FIG. 4A, the inner cover 434 has a front storage box 491. The box 491 has an opening formed at a rear part thereof. The opening of the box 491 can be opened or closed by a lid 492. The inner cover 434, the front storage box 491 and the lid 492 are made from rigid resinous material, for example.

Figure 4B:
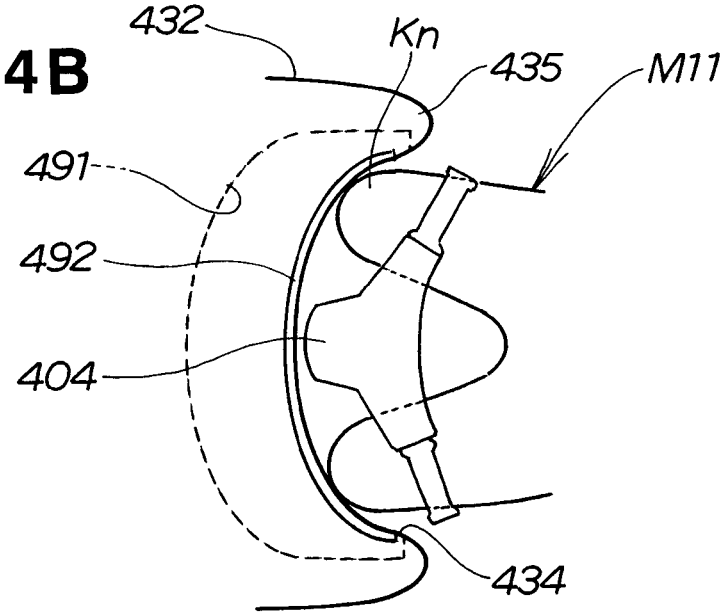

If the vehicle 400 undergoes collision energy at the front part thereof, a driver M11 sitting on the seat 411 is made to move forwardly as shown by arrows of FIG. 4A. The driver M11 then hits his or her knees (only one designated at Kn) against the box 491 or the lid 492, as shown in FIG. 4B. This makes it possible to prevent further forward movement of the driver M11.

Figure 5:
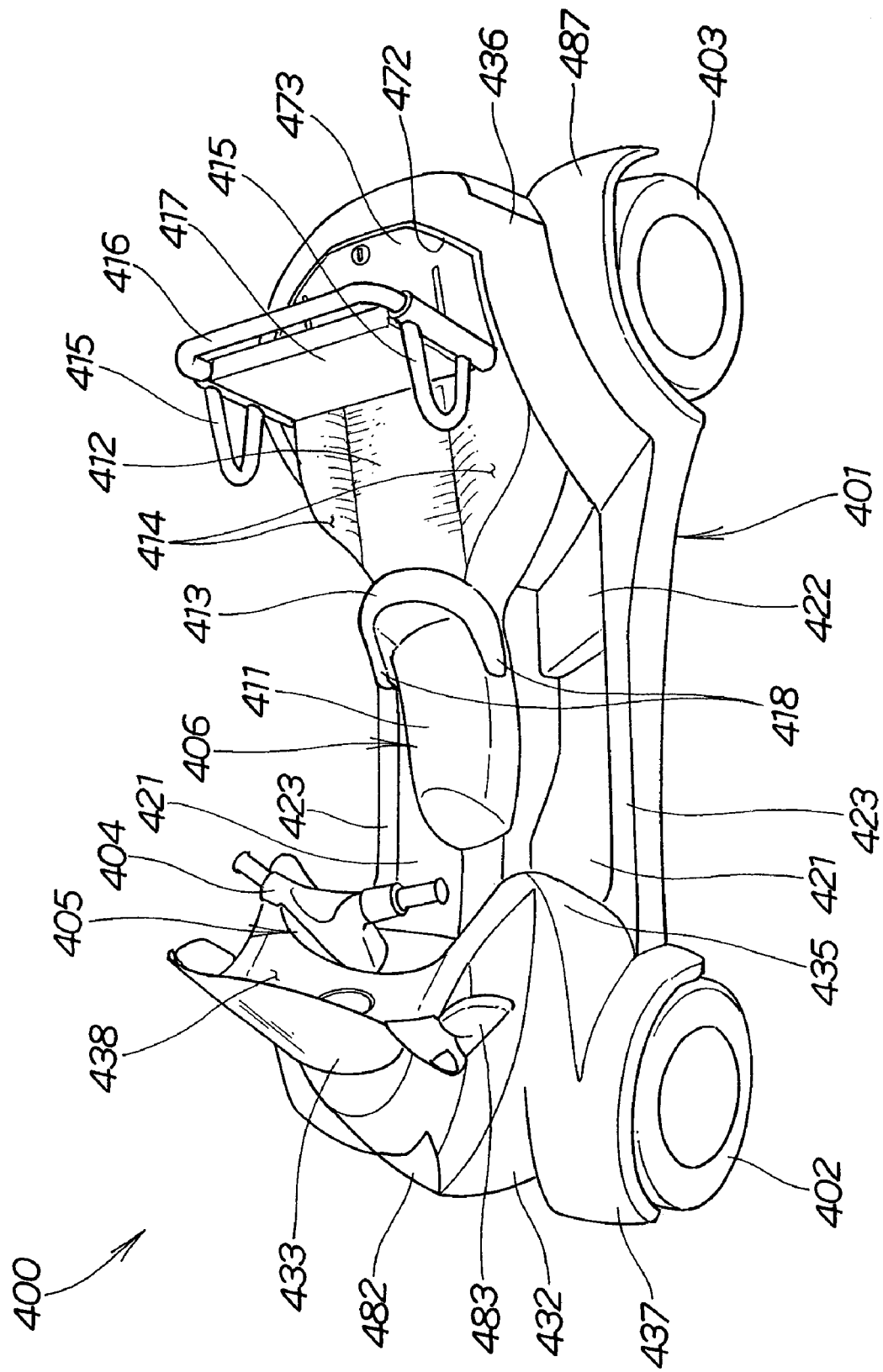
FIG. 5 illustrates a modification of the vehicle of FIG. 1 as viewed in perspective.

FIG. 5 shows a modified four-wheeled vehicle 400. The modified vehicle 400 includes a driver's seat 411 having right and left side support members (first side support members) 418, 418 provided at right and left sides thereof, respectively. The side support members 418, 418 are integral with a backrest 413 provided at a rear part of the driver's seat 411.

Figure 6:
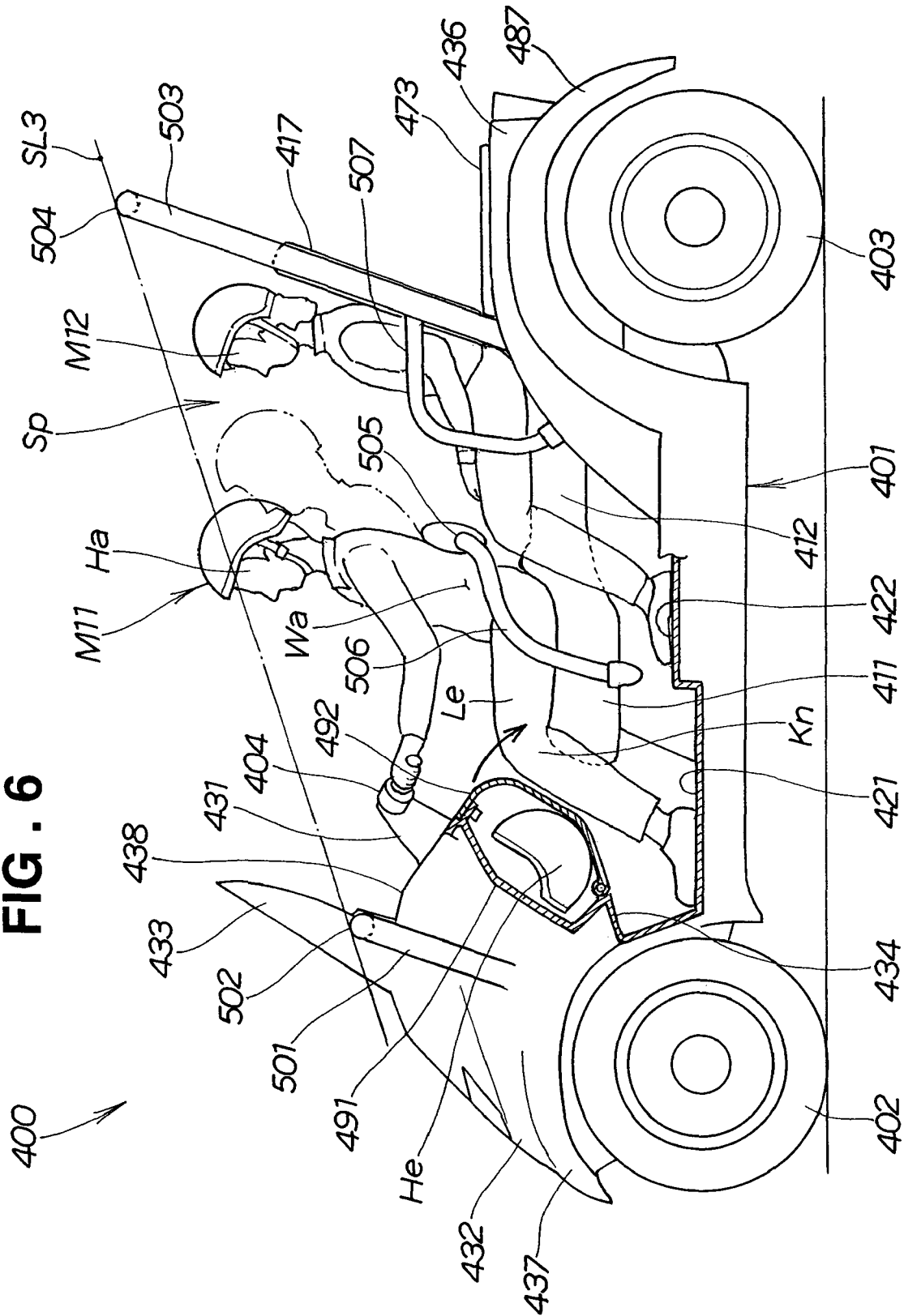
FIG. 6 illustrates a further modification of the vehicle of FIG. 1 as viewed in left side elevation.
Figure 7:
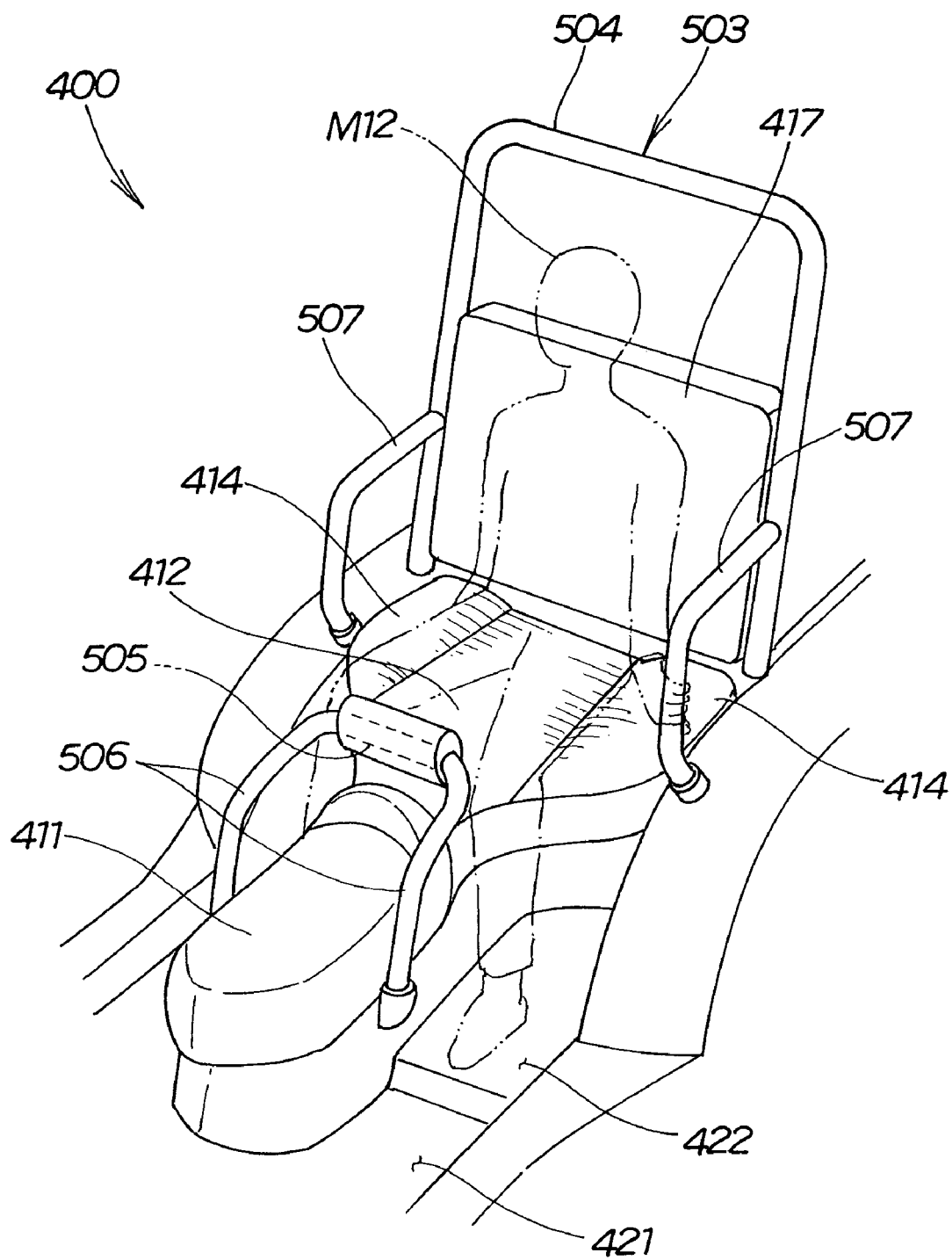
FIG. 7 is a perspective view of a driver's seat and a rear passenger seat of the vehicle of FIG. 6.

Turning to FIG. 6 and FIG. 7, there is shown a further modified four-wheeled vehicle 400. The vehicle 400 includes a driver's seat 411 having a front roll bar 501 provided forwardly thereof. The roll bar 501 is disposed in an upright position. The vehicle 400 includes a rear passenger seat 412 disposed behind the driver's seat 411. The seat 412 has a rear roll bar 503 positioned rearwardly thereof. The roll bar 503 is disposed in an upright position. The roll bar 501 and the roll bar 503 have their top ends 502, 504 providing a third straight line SL3 extending through the vicinities thereof. A driver M11 sitting on the seat 411 and a rear passenger M12 sitting on the seat 412 are positioned within a space Sp defined below the third straight line SL3.

The four-wheeled vehicle 400 as shown in FIG. 6 and FIG. 7 can better protect the driver M11 and the passenger M12 sitting in tandem.

The vehicle 400 includes a vehicle body 401 having the roll bar 501 provided at a front part thereof. The front roll bar 501 extends upwardly out of an upper part of an inner cover 434. The roll bar 501 has an inverted U-shaped configuration as viewed in front elevation. The vehicle body 401 has the roll bar 503 provided at the rear part thereof. The rear roll bar 503 extends upwardly out of a body cover 436 and is disposed behind the passenger seat 412. The roll bar 503 has an inverted U-shaped configuration as viewed in front elevation. These roll bars 501, 503 have great rigidity.

The roll bar 501 has its height set such that the top end 502 does not block forward view of the driver M11. The top end 504 is positioned higher than the passenger M12 sitting on the seat 412.

The driver's seat 411 has a backrest 505 positioned over a rear part thereof within the space Sp. The backrest 505 has the same level as the waist Wa of the driver M11.

Because the front roll bar 501 is positioned lower than the rear roll bar 503, the third straight line SL3 extends forwardly and downwardly from the vicinity of the top end 504 to the vicinity of the top end 502. The third straight SL3 extends tangentially to or through the head Ha of the driver M11 positioned within the space Sp. The backrest 505 is disposed so low that the driver M11 assumes a rearwardly inclined position to thereby lower the head Ha into the space Sp, as shown by a phantom line of FIG. 6. This arrangement allows the driver M11 to change his posture freely.

The backrest 505 is a horizontally extending bar positioned above the driver's seat 411. The backrest 505 has right and left side support members (first side support members) 506, 506 extending forwardly and downwardly from right and left ends thereof. In other words, the members 506, 506 are disposed at the right and left sides of the seat 411. The side support members 506, 506 are mounted to a lower part of the driver's seat 411. The driver's seat 411 and the backrest 505 have an open space defined therebetween. With this arrangement, the driver M11 can sit on the seat 411 more comfortably. The backrest 505 is united with the side support members 506, 506. Each side support member serves as a stay for the backrest 505.

The rear roll bar 503 has right and left side support members (second side support members) 507, 507 extending forwardly from right and left sides thereof. In other words, the side support members 507, 507 are disposed at the right and left sides of the rear passenger seat 412. The side support members 507, 507 have their front parts extending downwardly with their front ends mounted to the vehicle body 401. The side support members 507, 507 serve as grips the passenger M12 grasps with his or her hands. This allows the passenger M12 to sit on the seat 412 more comfortably. The rear roll bar 503 has a central backrest 417 disposed between the right and left sides thereof.

As shown in FIG. 6, the vehicle 400 includes footrests (only one shown and designated 421) for the driver M11, and footrests (only one shown and designated 422) for the passenger M12 positioned behind the footrest 421. The footrest 422 is higher than the footrest 421. Each of the footrest 421 and the footrest 422 serves as a step. Providing the footrests 421, 421 lower than the footrests 422, 422 allows the driver M11 sitting on the seat 411 to stretch his or her legs (only one shown and designated Le) forwardly and downwardly. This makes it possible for the driver M11 to sit on the seat 411 more comfortably. Since he or she stretches the legs Le forwardly and downwardly, the driver M11 can easily get off the vehicle 400 even after the vehicle 400 undergoes collision energy at its front side. The driver M11 can more easily get off the vehicle 400 if the footrest 421 further extends into a space between right and left front wheels 402, 402.

Providing the footrest 422 higher than the footrest 421 allows the passenger M12 to rest his or her foot or feet thereon with minimum difficulty.

As shown in FIG. 6, a bar handle 404 is positioned lower than the top end 502 of the front roll bar 501. A handle post 431 is positioned behind a deck surface 438 formed in an upper part of the inner cover 434.

A front storage box 491 has a space big enough to accommodate a helmet He therein.

Figure 8:
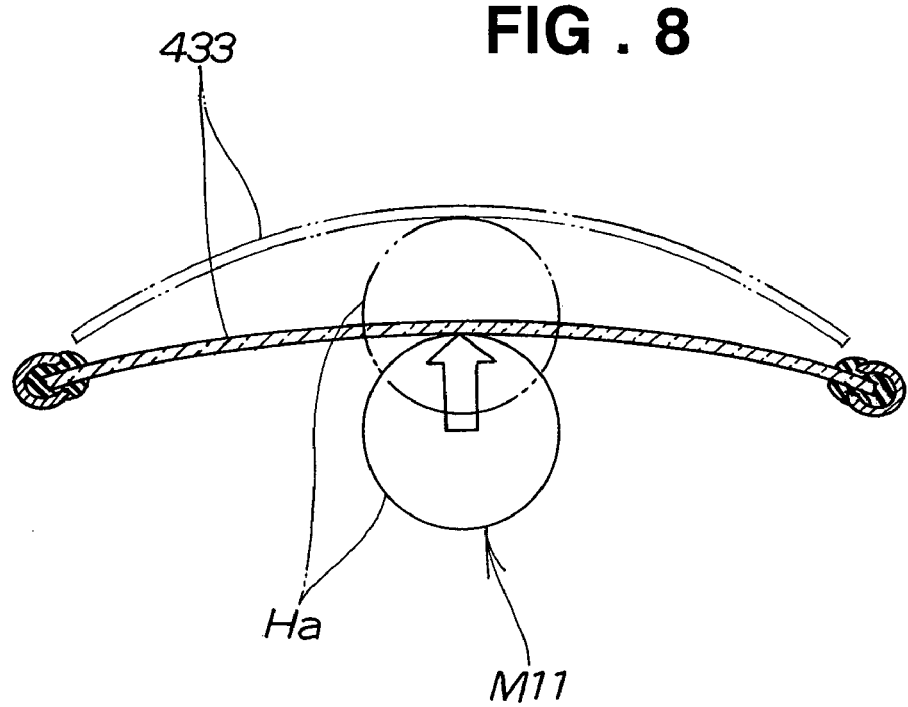
FIG. 8 is a top plan view of a windshield of the vehicle of FIG. 6.

As shown in FIG. 8, when the vehicle 400 of FIG. 6 undergoes a collision energy at its front side, the driver M11 having sat on the seat 411 is made to move forwardly. Then, the driver M11 hits a windshield 433 disposed in front of him to thereby apply a load to a rear side of the windshield 433. Upon undergoing the load, the windshield 433 is forced to move forwardly for detachment from a front cover 432. This makes it possible to protect the driver M11 with increased efficiency.

Description will be made as to a variety of usages of the passenger's backrest 417, the storage portion 472 and the deck 473 of the vehicle 400 of FIGS. 1 and 2 with reference to FIG. 9 to FIG. 13.

Figure 9:
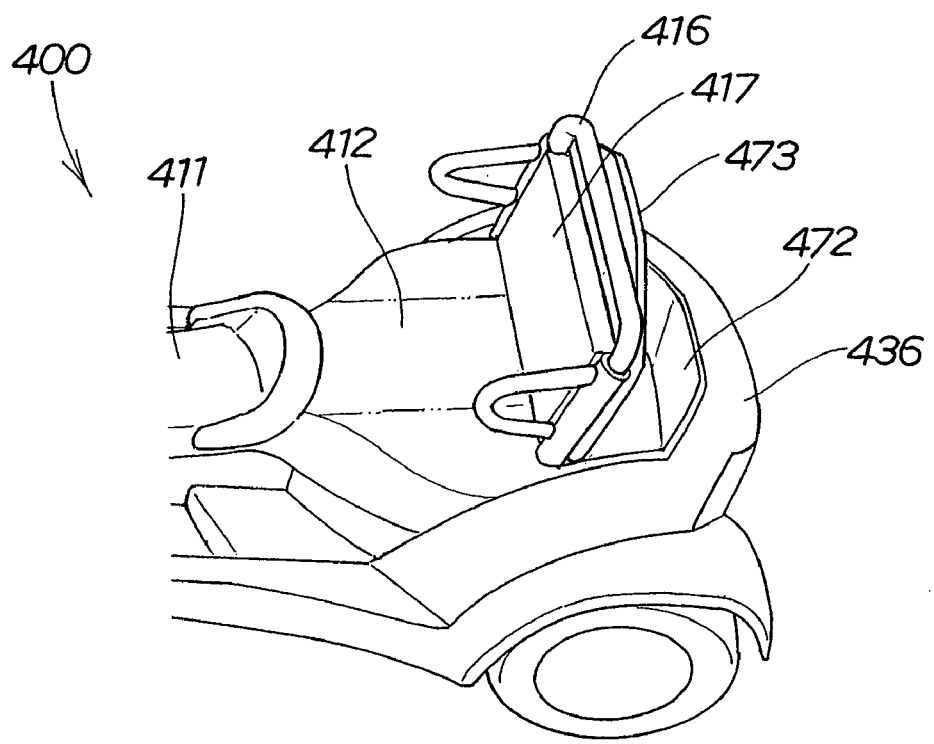
FIG. 9 illustrates in perspective a rear part of the vehicle of FIG. 1 with a storage portion opened.
Figure 10:
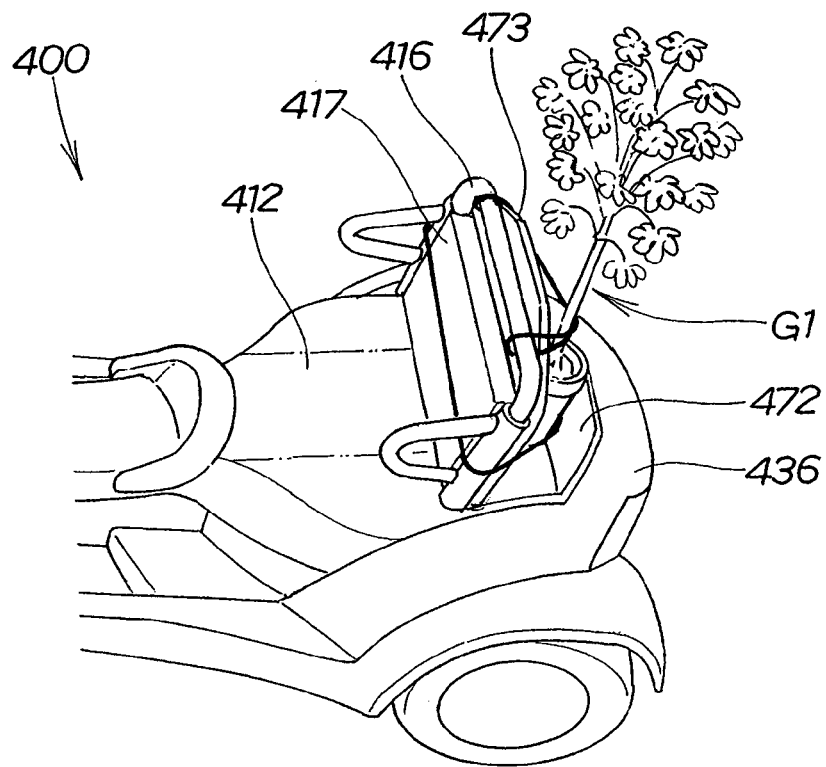
FIG. 10 is the view of FIG. 9 with an elongated objects placed within the storage portion.

As shown in FIG. 9, the deck 473 is in an opened position to thereby keep the opening of the storage portion 472 open. In this state, the storage portion 472 accommodates therein an elongated object G1 such as a tub with an ornamental tree, as shown in FIG. 10. More specifically, the object g1 has its lower half accommodated in the storage portion 472. The object G1 has its upper half extending upwardly out of the storage portion 472 for exposure to the air. This makes it possible for the storage portion 472 to carry the object G1.

Figure 11:
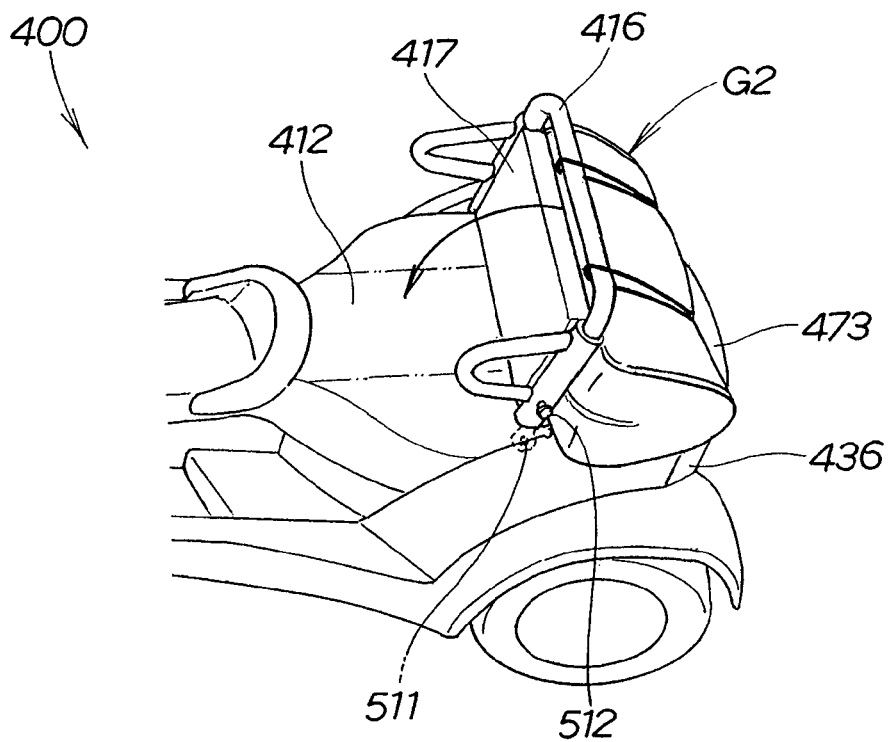
FIG. 11 is the view of FIG. 9 with the storage portion closed to carry a luggage thereon.
Figure 12:
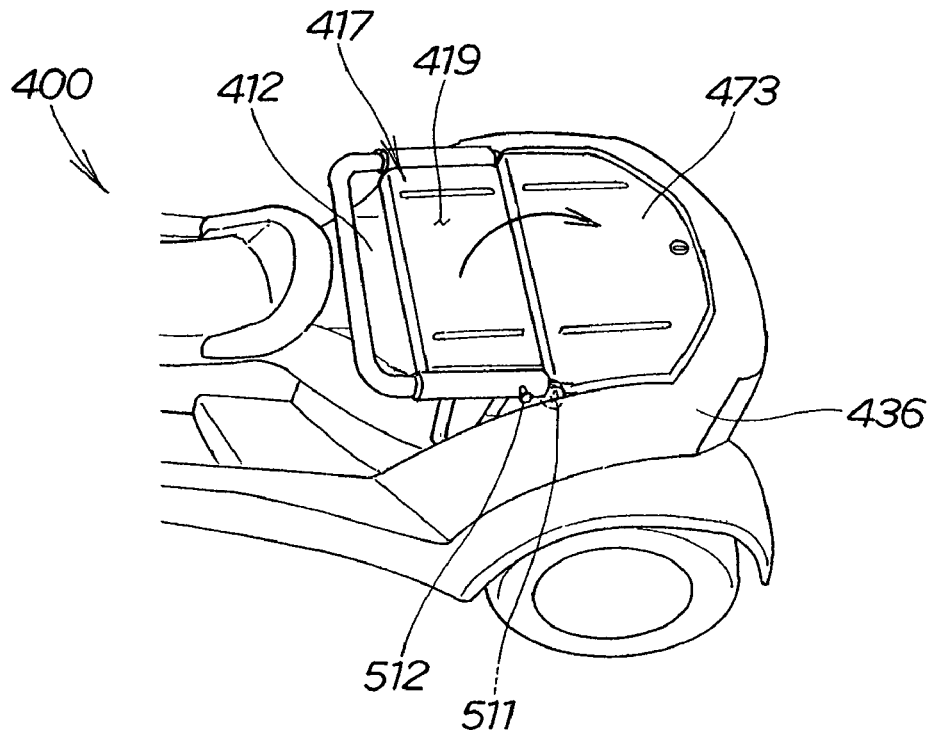
FIG. 12 is the view of FIG. 9 with the storage portion closed and with a backrest held in a lying position.

As shown in FIG. 11, the deck 473 has a load or baggage G2 such as a bag placed thereon. The backrest 417 is mounted to the vehicle body 401 in such a manner as to pivot back and forth on a hinge 511, as shown by an arrow. The backrest 417 can pivot forwardly to a lying position by removing a lock pin 512. In the lying position, the backrest 417 lies over the passenger's seat 412, as shown in FIG. 12. The backrest 417 serves as a backrest of the seat 412 when pivoted back to in an upright position as shown in FIG. 9.

Figure 13:
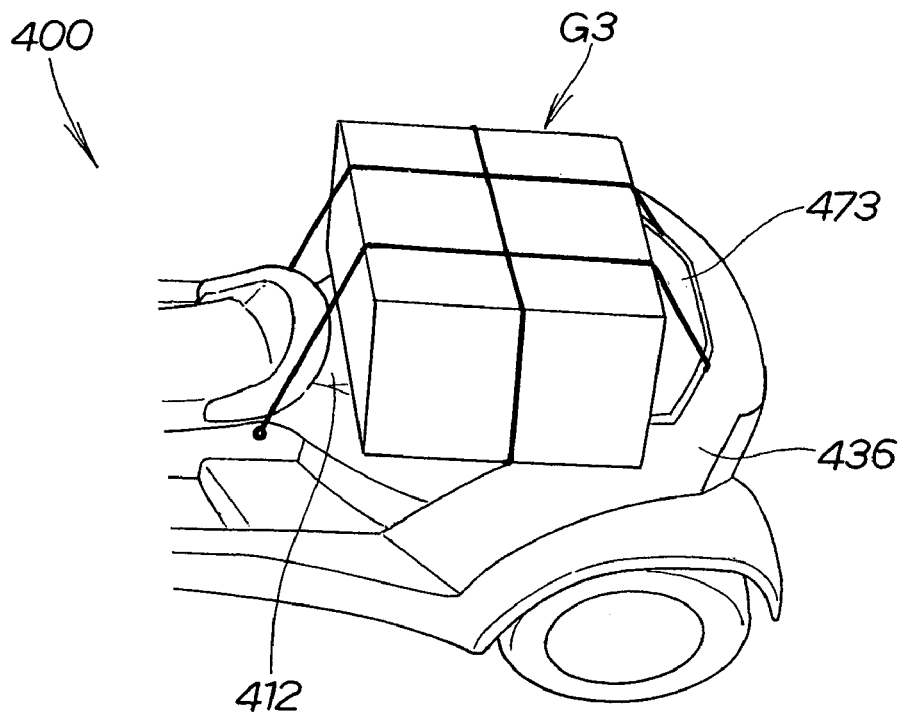
FIG. 13 is the view of FIG. 12 with baggage carried on the storage portion and the backrest.

When in the lying position, the backrest 417 of the seat 412 has a back surface 419 continuous with the deck 473 to thereby provide a surface on which some object is placed. Such a surface is so large in size or area that even a large-sized object G3 can be carried thereon, as shown in FIG. 13.

Figure 14:
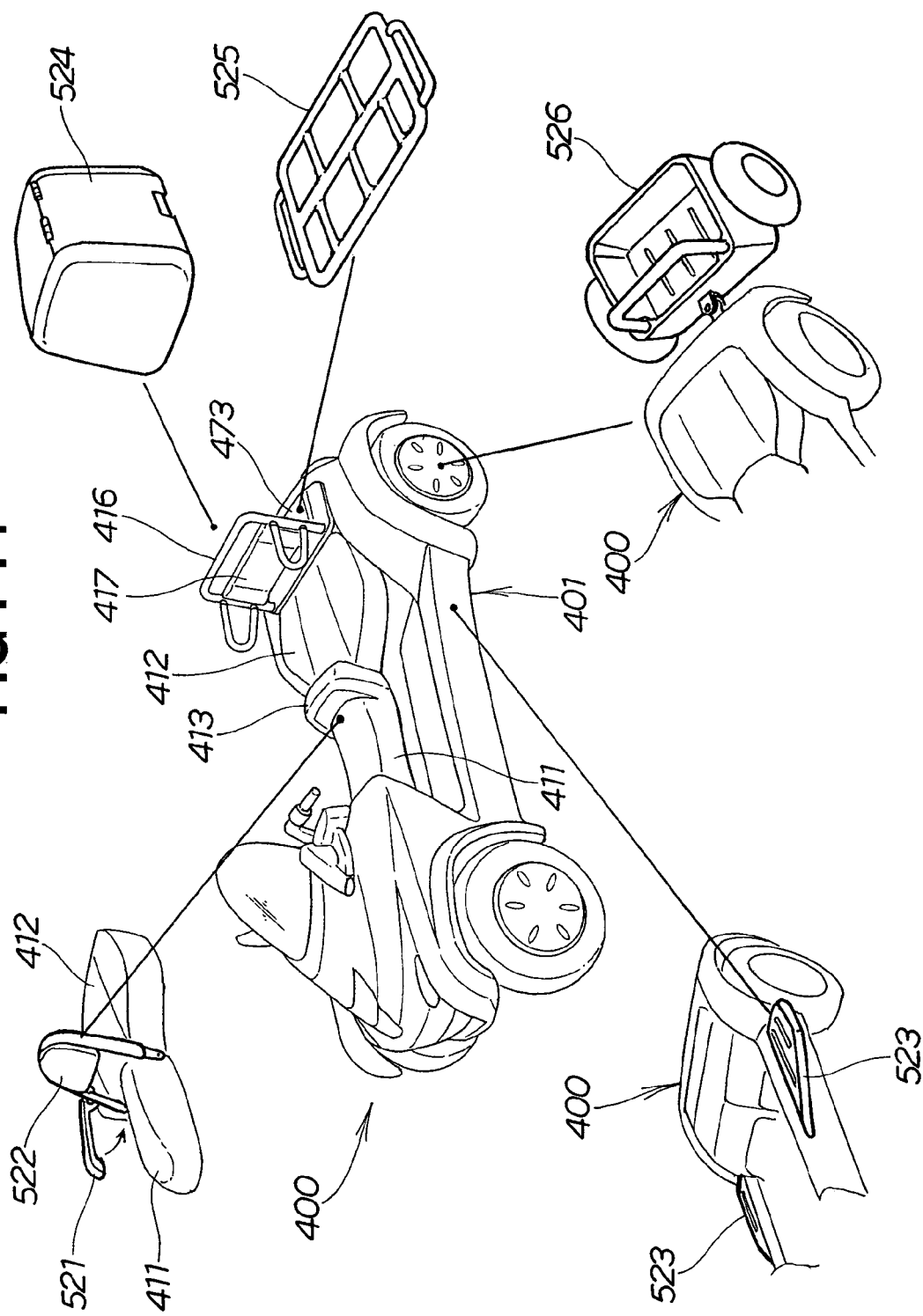
FIG. 14 illustrates a variety of options for the vehicle of FIG. 1.

The vehicle 400 can selectively have a variety of options 521 to 526, as shown in FIG. 14. More specifically, the backrest 413 is replaced with a backrest 522 having an armrest 521 to allow the driver to sit on the seat 411 more comfortably. The armrest 521 can be provided on either one or both of the right and left sides of the seat 411 although it is shown in this figure as being provided only on the right side of the seat 411. The armrest 521 serves as a side support member.

The vehicle 400 may have right and left side panels 523, 523 on its right and left sides, respectively, for allowing a child to rest his or her foot or feet thereon.

The deck 473 may have a luggage box 524 detachably mounted thereon for accommodating deliveries.

The deck 473 may have a large-sized carrier 525 detachably mounted thereon for carrying an increased amount of objects.

The vehicle 400 may have a trailer connected to a rear part thereof for carrying a greater amount of objects.

In FIG. 15 through FIG. 18, there are shown various modifications to the vehicle 400.

Figure 15:
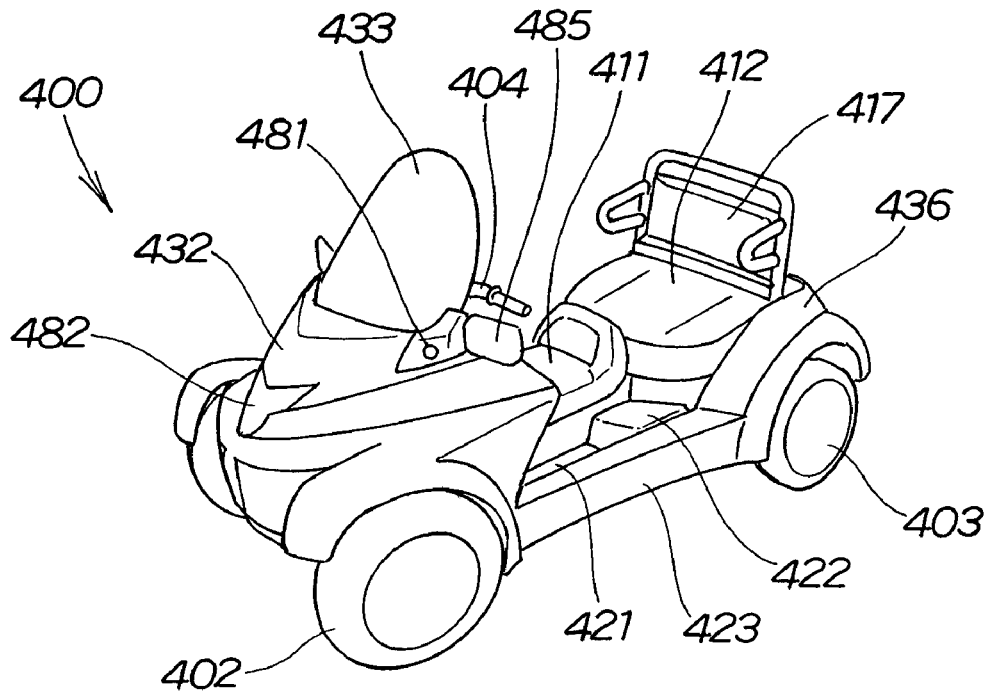
FIG. 15 illustrates a further modification of the vehicle of FIG. 1 as viewed in perspective.

FIG. 15 shows a modification of the vehicle 400 of FIG. 1. More specifically, the front part of the vehicle body 401 is modified such that the right and left direction indicators 481, 481 are disposed in close proximity to the right and left side mirrors 483, 483, respectively. In addition, the footrest 421 for the driver is positioned lower than the footrest 422 for the rear passenger. These footrests serve as steps.

Figure 16:
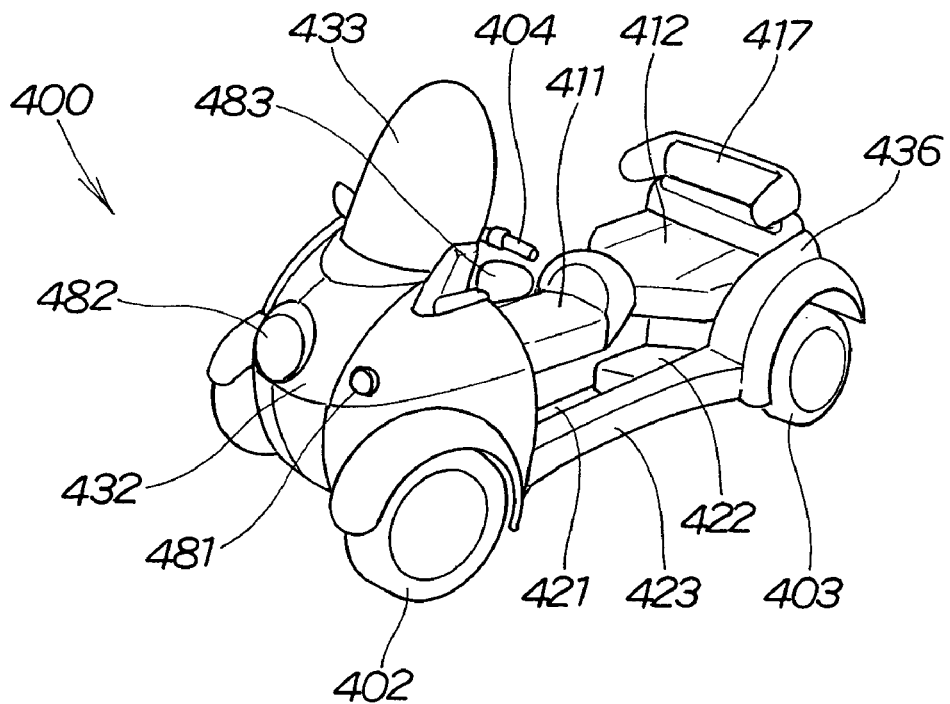
FIG. 16 illustrates a modification of the vehicle of FIG. 15.

FIG. 16 shows a modification of the vehicle of FIG. 15. More specifically, the front part of the vehicle 400 is rounded throughout. The direction indicators 481, 481 are disposed different positions from those of FIG. 15. The headlamp 482 is changed in configuration. The backrest 417 is changed in configuration.

Figure 17:
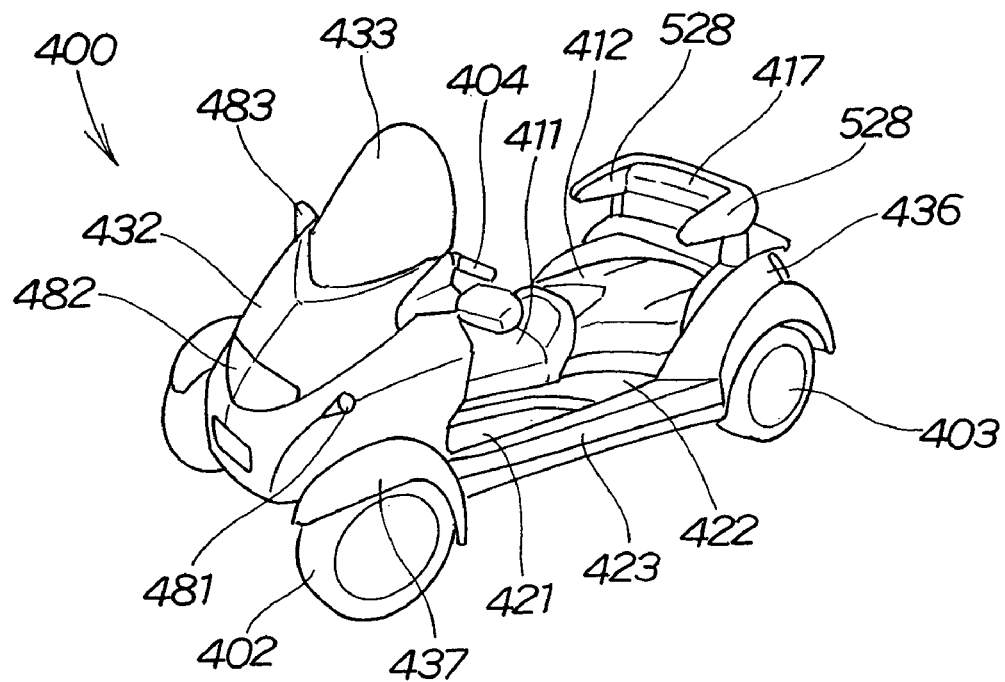
FIG. 17 illustrates a further modification of the vehicle of FIG. 1 as viewed in perspective.

FIG. 17 shows a modification of the vehicle 400 of FIG. 1. More specifically, the front part of the vehicle body 401 is modified such that each front fender 437 is provided separately from the front cover 432. The rear passenger seat 412 is modified into a bucket seat.

The backrest 417 positioned at a rear part of the passenger seat 412 has right and left side supports (second side support members) 528, 528 of round shape extending forwardly from right and left side ends thereof. In other words, the side supports 528, 528 are disposed at the right and left sides of the rear passenger seat 412. This makes it possible to allow the passenger sitting on the seat 412 to move rightward or leftward by a limited distance.

For a vehicle having "tandem seat", a passenger sitting on a rear side of the seat is unavoidably subjected to a greater centrifugal force when the vehicle is turned. For the vehicle 400, however, the passenger sitting on the seat 412 is subjected to a minimum centrifugal force when the vehicle 400 is turned. This is because the seat 412 for the passenger is the bucket seat.

Figure 18:
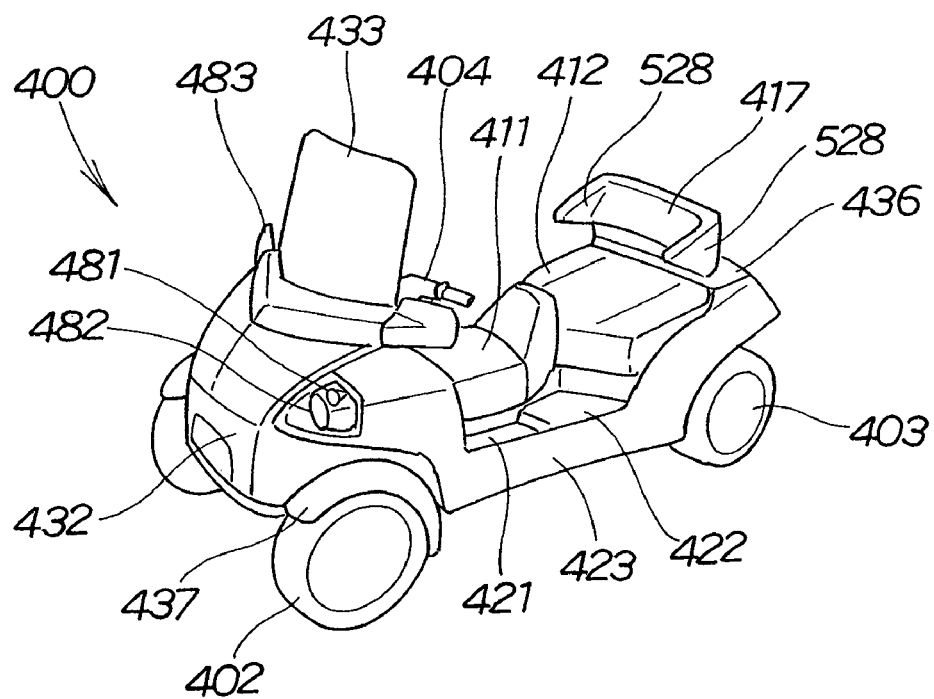
FIG. 18 illustrates a further modification of the vehicle of FIG. 17.

FIG. 18 shows a modification of the vehicle 400 of FIG. 17. More specifically, the front part of the vehicle body 401 is rounded throughout. Such a front part of rounded configuration has right and left headlamps 482, 482 disposed at right and left sides thereof, respectively. Each headlamp 482 has a direction indicator 481 incorporated therein. The backrest 417 is modified in configuration.

In FIG. 19A and FIG. 19C, there is illustrated the vehicle 400 of FIG. 1. FIG. 19B shows a modification of vehicle 400. FIG. 19D and FIG. 19E illustrate vehicles for the purpose of comparison to the vehicle 400.

More specifically, FIG. 19A shows in front elevation the vehicle 400. FIG. 19B shows in front elevation a modified vehicle 400. FIG. 19C shows in top plan the vehicle 400. FIG. 19D shows in top plan a first motorcycle 531. FIG. 19E shows in top plan a second motorcycle 532.

The respective vehicles of FIG. 19A and FIG. 19B have the same tread W1 and width W2 (about 1100 mm). The modified vehicle 400 of FIG. 19B has its height Hi (about 1700 mm). The vehicle 400 of FIG. 19C has its wheelbase L23 (about 1700 mm) and its overall length L24 (about 2200 mm).

The first and second motorcycles 531, 532 are of well-known type. The first motorcycle 531 has its width W3 (about 730 mm) and its overall length L31 (about 2200 mm). The second motorcycle 532 has its width W4 (about 960 mm) and its overall length L41 (about 2020 mm).

The length L24 is substantially equal to the lengths L31, L41. The width W2 is substantially half the length L24. As shown in FIG. 2, the length L24 is the distance between the foremost point 402a (or 402b) of the front fender 437 and the rearmost point 403a (or 403b) of the rear fender 487. The width W2 is a distance between an outermost point 402c of the right front wheel 402 and an outermost point 402d of the left front wheel 402, as shown in FIG. 19A and FIG. 19B.

Accordingly, the vehicle 400 can be parked in a space having the same length as the motorcycles 531, 532. In other words, the four-wheeled vehicle 400 is sized to match existing parking lots or car parks.

Figure 20:
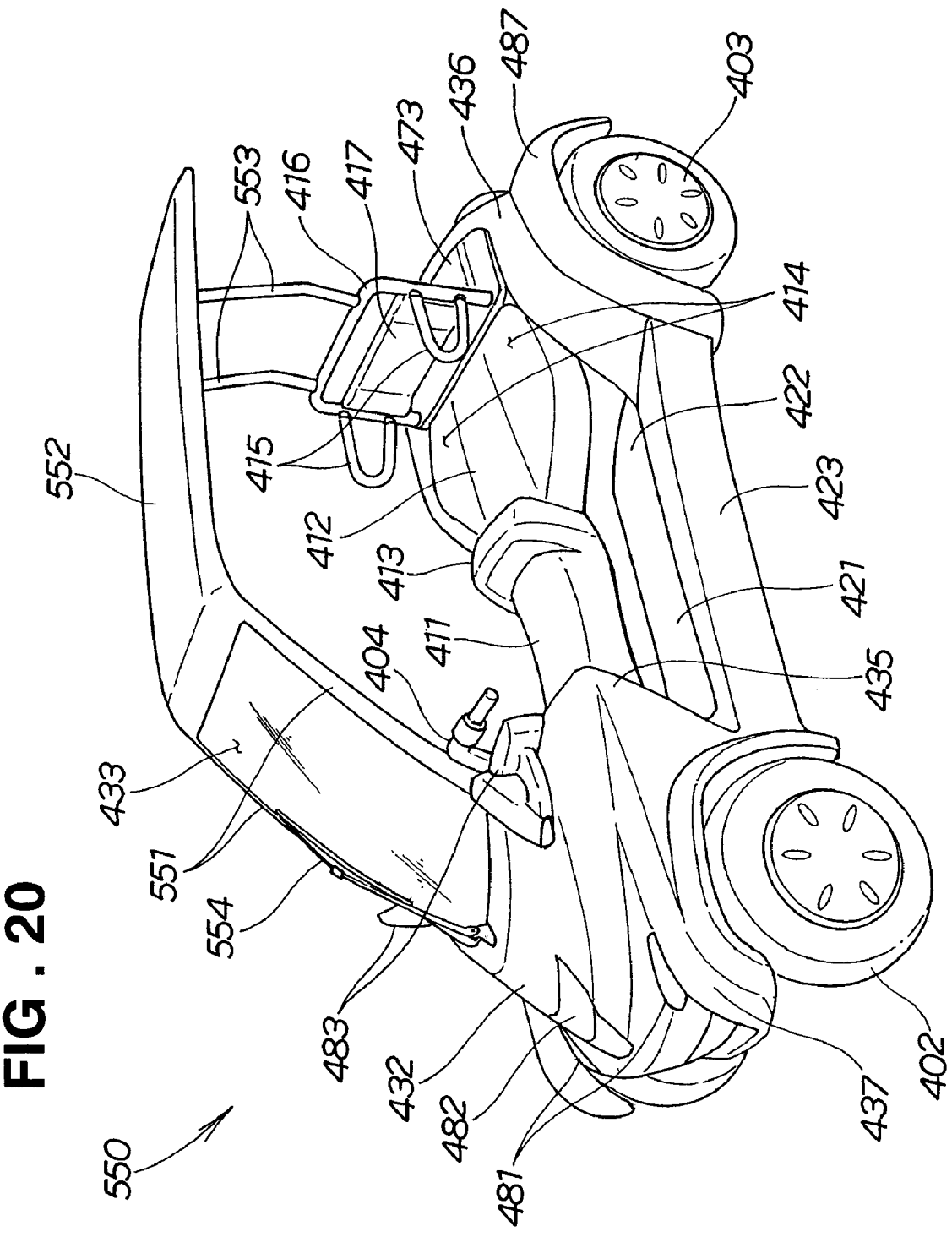
FIG. 20 is a perspective view of a four-wheeled vehicle according to a second embodiment of the present invention.
Figure 21:
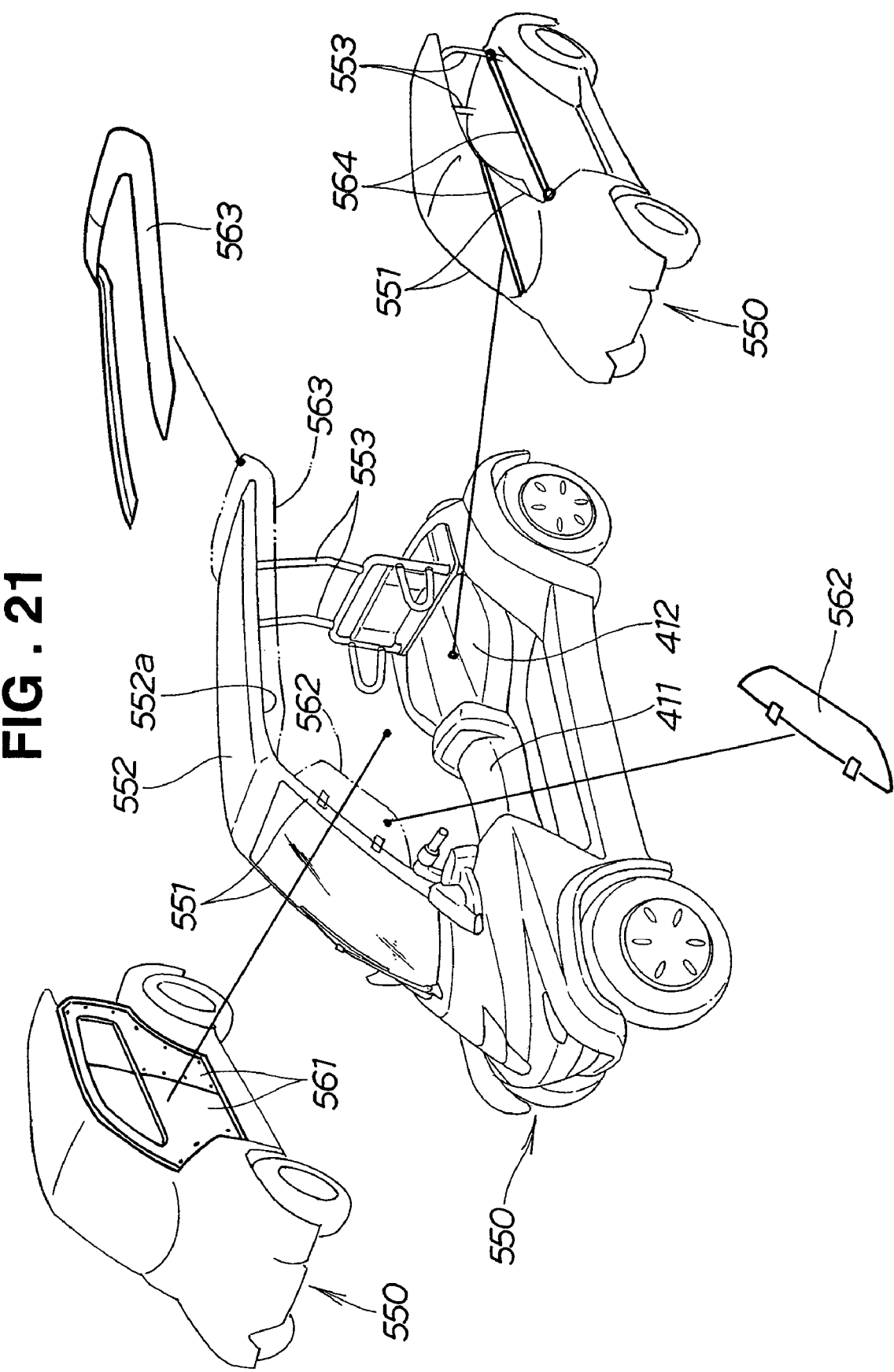
FIG. 21 illustrates a variety of options for the vehicle of FIG. 20.

Referring to FIG. 20 and FIG. 21, there is shown a four-wheeled vehicle 550 according to a second embodiment of the present invention. The same components of the vehicle 550 as those in the first embodiment are denoted by the same reference numerals, and their descriptions will be omitted.

As shown in FIG. 20, the vehicle 550 includes a roof member 552 continuous with a windshield 433. The roof member 552 extends over a driver's seat 411 and a rear passenger seat 412. Namely, the roof member 552 is disposed above the driver' seat and the rear passenger seat 412.

More specifically, the vehicle 550 includes a vehicle body having a front cover 432 provided at a front part thereof. The front cover 432 has right and left front pillars (roof supporting posts) 551, 551 extending rearwardly and upwardly from a top edge thereof. The roof member 552 is a substantially flat sheet extending rearwardly from top ends of the pillars 551, 551. The roll bar 416 has right and left rear pillars (roof supporting posts) 553, 553 extending upwardly from an upper portion thereof. The rear pillars 553, 553 have their upper ends mounted to the vicinities of a rear end of the roof member 552. The front pillars 551, 551 and the rear pillars 553, 553 support the roof member 552.

The windshield 433 is provided between the right and left front pillars 551, 551. The roof member 552 has its rear end positioned rearwardly of a backrest 417 for a passenger. The roof member 552 has its width substantially equal to or slightly smaller than the overall width of the vehicle 550. The vehicle 550 has its right and left sides opened such that the driver or the passenger freely gets on or off the vehicle 550.

The driver's seat 411 has its front side covered with the windshield 433. The driver's seat 411 and the rear passenger seat 412 have their upper sides covered with the roof member 552. Reference numeral 554 denotes a wiper.

With this arrangement, it becomes possible to protect the passenger as well as the driver from rain. Moreover, this arrangement is advantageous in that baggage placed on the seat 412 are protected from rain and the like. Further, the thus arranged vehicle 400 can be advantageously used in transporting commercial items or exhibiting goods for sale. Since the vehicle 550 is opened at its right and left sides, it is easy to get on or off. The roof member 552 does not hinder the passengers from getting on or off the vehicle. The vehicle 550 may have additional, detachable curtains to cover the right and left sides thereof. As stated above, the vehicle 550 can be used for various purposes.

As shown in FIG. 21, the vehicle 550 may selectively have a variety of options 561 to 564. More specifically, the vehicle 550 have additional, detachable curtains 561, 561 (only one shown) for covering the right and left sides thereof. It thus becomes possible to cover the right and left sides of the respective seats 411, 412. Provision of the curtains protects the driver and passenger sitting on the seats 411, 412 from rain with increased effectiveness. Accordingly, the vehicle 550 can be opened or closed at its right and left sides, depending upon what purpose it is used for.

The front pillar 551 may have a visor 562 detachably mounted thereto to protect the driver from strong wind.

The roof member 552 may have a roof spoiler 563 detachably mounted to right and left edges (only one shown and designated at 552a) thereof to change the stream of wind flowing around the vehicle 550, such that the vehicle 550 is prevented from being floated up.

Where necessary, the right front pillar 551 and the right rear pillar 553 may have a bar 564 detachably mounted therebetween. Likewise, the left front pillar 551 and the left rear pillar 553 may have a bar 564 mounted therebetween. This makes it possible to provide an increased rigidity of the vehicle 550. The bars 564, 564 are pipes of high rigidity.

Figure 22:
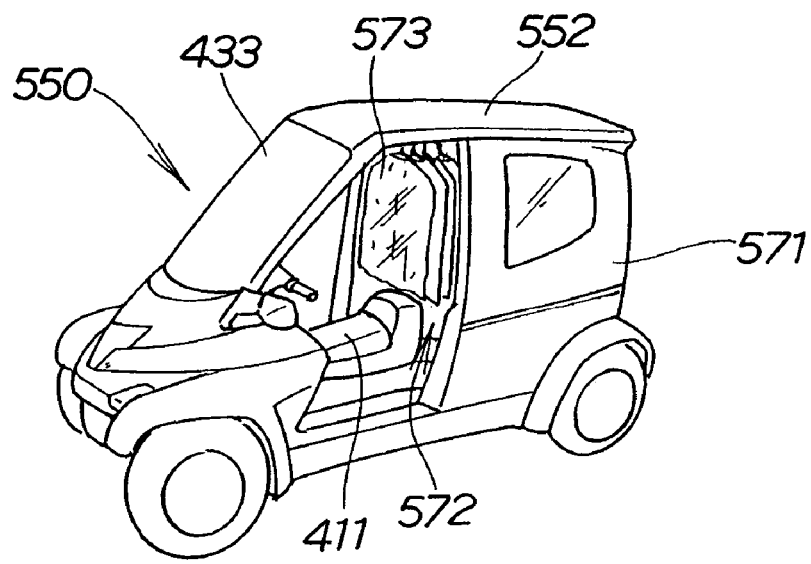
FIG. 22 illustrates a modification of the vehicle of FIG. 20.

FIG. 22 shows a modification of the vehicle 550 of FIG. 20 into a retailer's vehicle for delivery purpose. More specifically, the vehicle 550 of FIG. 22 has right and left rear side panels 571, 571 covering right and left sides of a rear part thereof, respectively. By thus providing the rear side panels 571, 571, there can be formed an enclosed space 572 of large capacity behind the driver's seat 411. The space 572 accommodates therein a lot of large-sized baggage 573 such as laundered clothes to thereby keep them clean during delivery operation.

Figure 23:
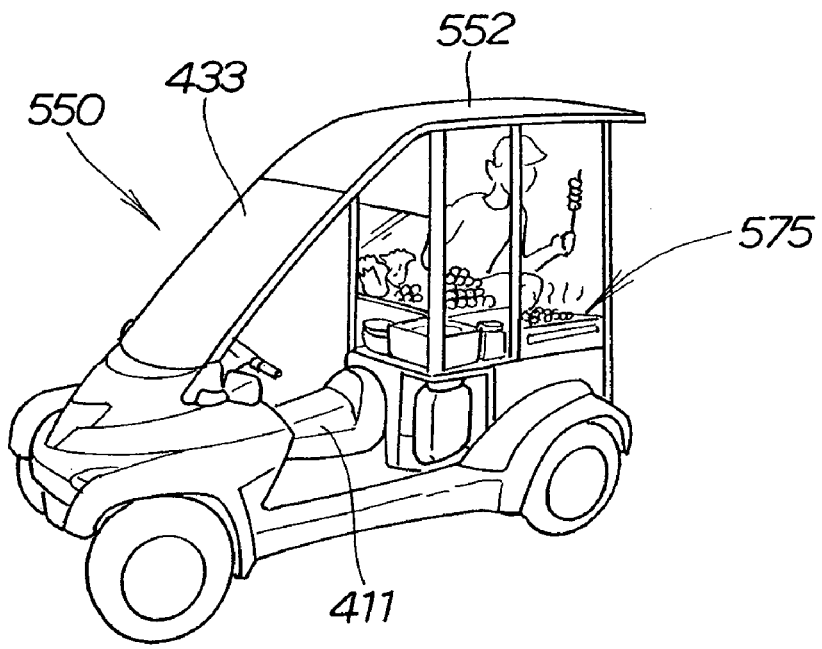
FIG. 23 illustrates a further modification of the vehicle of FIG. 20.

The rear part of the vehicle 550 of FIG. 20 may be modified into a stall 575 as shown in FIG. 23. In other words, the space formed behind the driver's seat 411 is used for providing a stall. The vehicle 550 having the stall 575 of simple structure is freely movable. Since the vehicle 550 includes the roof member 552, the stall 575 can be used even in a rainy day.

Figure 24:
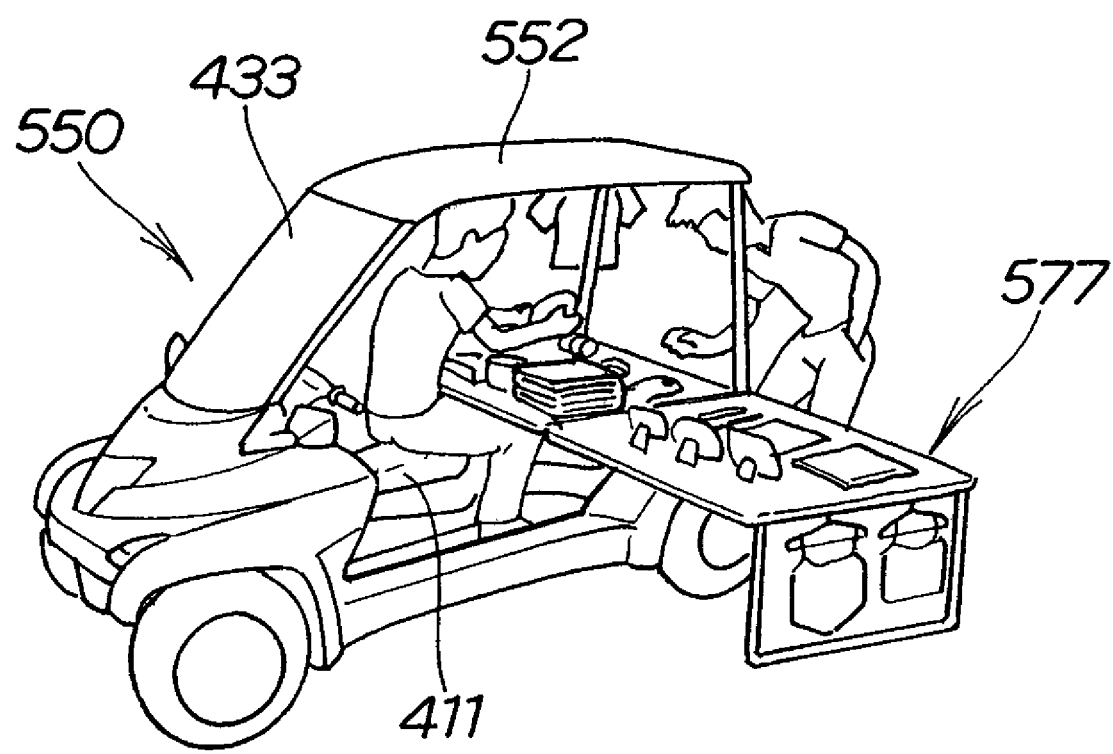
FIG. 24 illustrates a further modification of the vehicle of FIG. 20.

As shown in FIG. 24, alternatively, the rear part of the 550 of FIG. 20 may be modified into a stall 577 different from that of FIG. 23. In other words, the space formed behind the driver's seat 411 can be used for providing a stall. The vehicle 550 having the stall 577 of simple structure is freely movable. It therefore becomes possible for the vehicle to exhibit commercial items or goods for sale. Because the vehicle 550 includes the roof member 552, the stall 577 can be used even in a rainy day.

Referring to FIG. 25 to FIG. 28, there is shown a four-wheeled vehicle 600 according to a third embodiment of the present invention. The same components of the vehicle 600 as those in the second embodiment are denoted by the same reference numerals, and hence their descriptions will be omitted.

Figure 25:
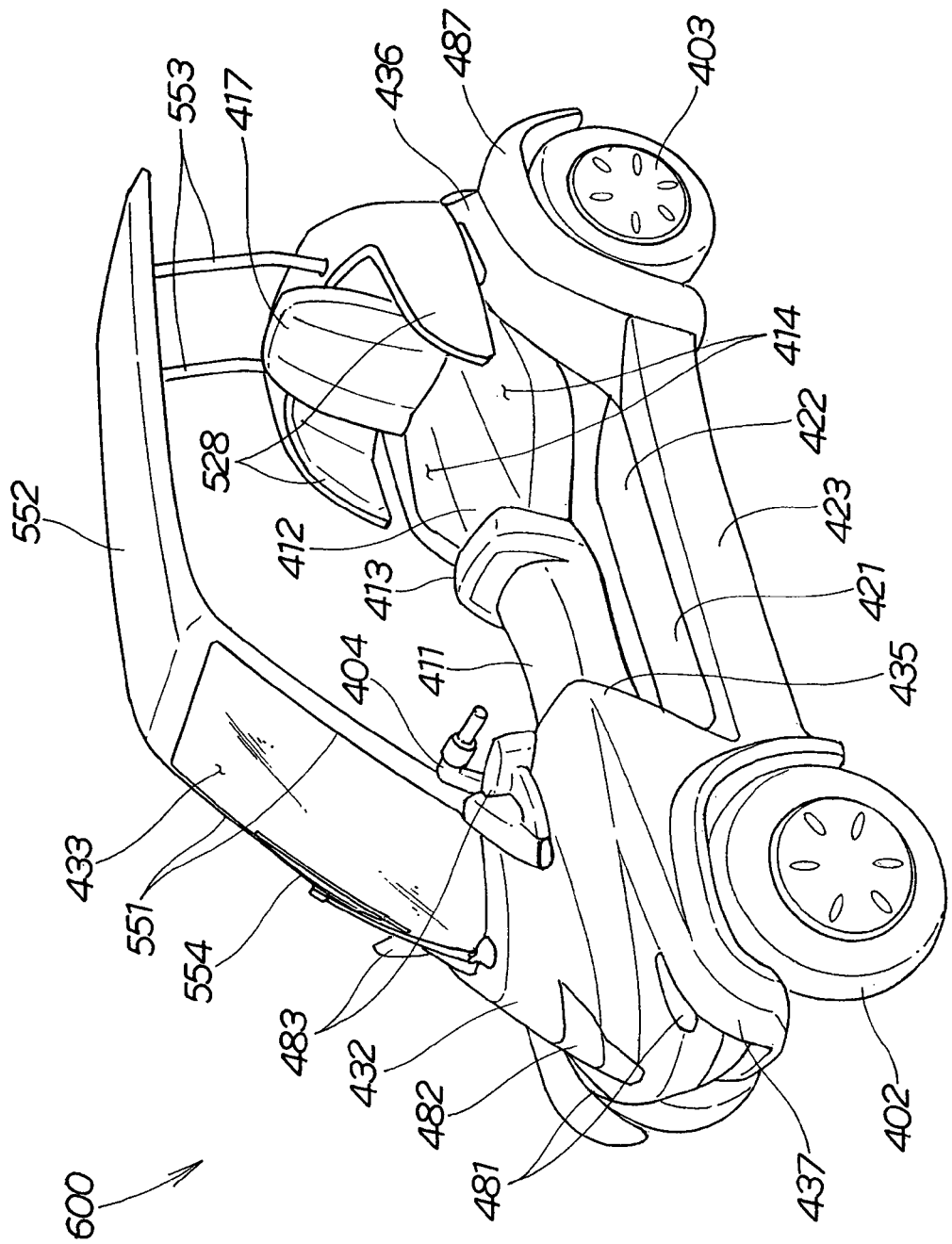
FIG. 25 is a perspective view of a four-wheeled vehicle according to a third embodiment of the present invention.

As shown in FIG. 25, the vehicle 600 includes a rear passenger seat 412 in the form of a bucket seat. The bucket seat is the same construction as that of FIG. 17, and therefore its description will be omitted.

Figure 26:
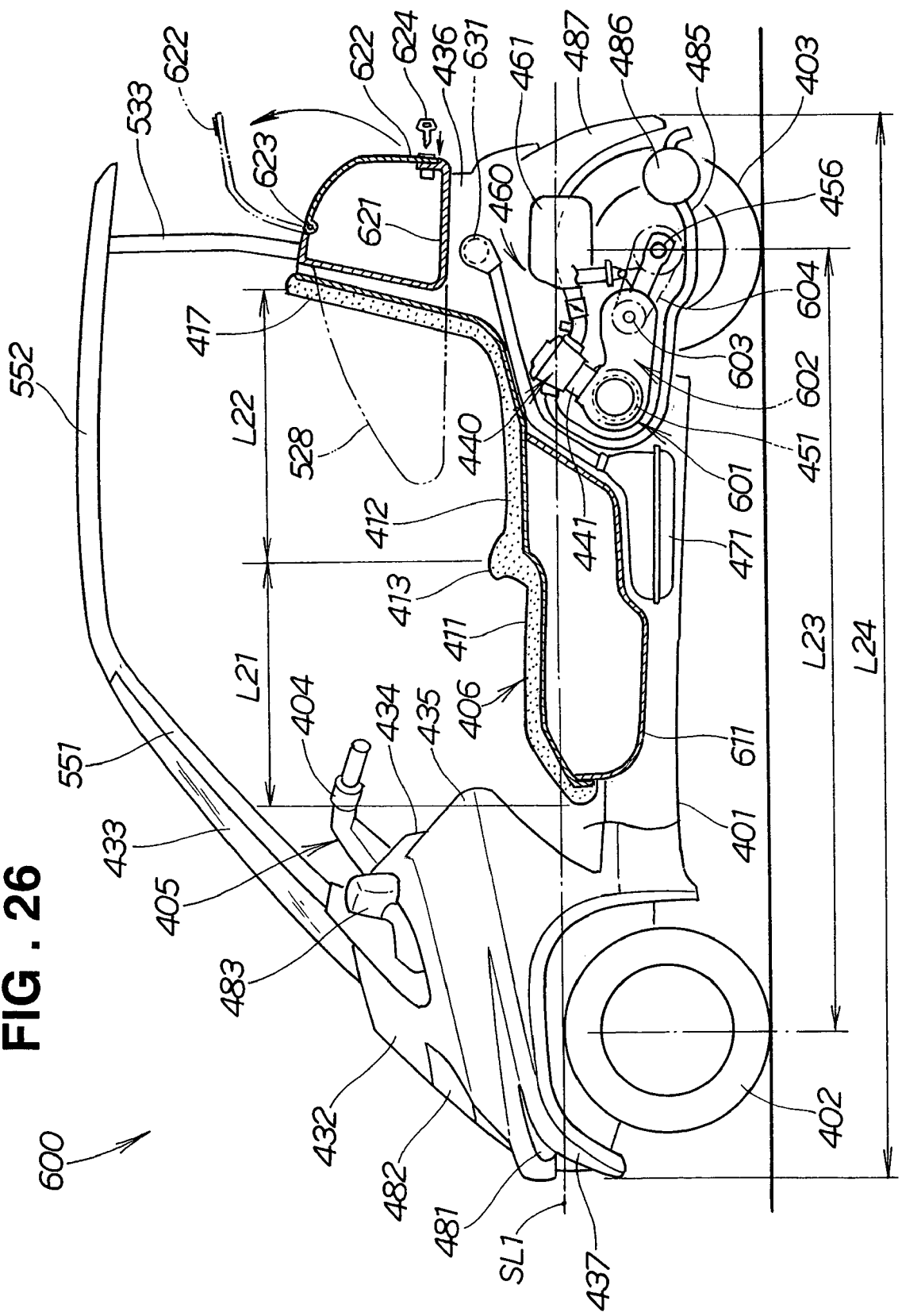
FIG. 26 illustrates partly in cross-section the vehicle of FIG. 25 as viewed in left side elevation.

As shown in FIG. 25 and FIG. 26, the vehicle 600 includes a power unit part 601 disposed below the rear passenger seat 412. More specifically, the power unit part 601 is positioned substantially below a first straight line SL1 extending through the vicinities of the uppermost points of front and rear wheels 402, 403.

The power unit part 601 is a unit swing-type power unit and is suspended on a vehicle body 401 in such a manner as to pivot vertically on a pivot shaft (not shown) together with the rear wheels 403, 403. The power unit part 601 has an engine 440 provided at a front part thereof and a transmission mechanism 602 provided at a rear part thereof.

The power unit part 601 may have a differential gear portion incorporated therein and be secured to the vehicle body 401. In such a case, there can be provided a free space within which the power unit part 601 would otherwise pivot. Such a space is usable for other purposes.

The engine 440 is a four-stroke one of 125 cc and extends upwardly and rearwardly.

The engine power unit 601 includes a torque converter 451, as does the engine power unit 407. The torque converter 451 produces an output to be transmitted via the transmission mechanism 602 to the rear wheels 403, 403. When supplied with such an output, the rear wheels 403, 403 are driven. The power unit part 601 includes an output shaft 603 for producing a motive power to be transmitted via a chain 604 to an axle 456 for the rear wheels 403, 403.

As shown in FIG. 26, the vehicle 600 has an air cleaner 461 positioned at an upper portion of the rear part of the power unit part 601, and a storage box 611 positioned below the a driver's seat 411 and the rear passenger's seat 412. The vehicle 600 has a fuel tank 471 disposed below the storage box 611. The vehicle 600 includes a body cover 436 having its rear part positioned behind the rear passenger seat 412 and above the rear wheels 403, 403. The rear part of the body cover 436 has a storage portion (a rear storage box) 621 provided at an upper portion thereof. The storage portion 621 has an opening formed in a rear part thereof. The opening of the storage portion 621 is shown as being closed by a lid 622.

The seat 412 includes a backrest 417. The storage portion 621 is formed directly behind the backrest 417. The backrest 417 is united with the storage portion 612. The storage portion 621 has a space formed therewithin. The storage portion 612 has a hinge 623 mounted on an upper portion thereof. The lid 622 is capable of pivoting vertically on the hinge 623 to open and close the opening of the storage portion 621. The lid 622 can be locked with a key 624 keeping the opening of the storage portion 612 closed. The body cover 436 has a port 631 positioned at a right side thereof for supplying fuel to the tank 471 therethrough.

Figure 27:
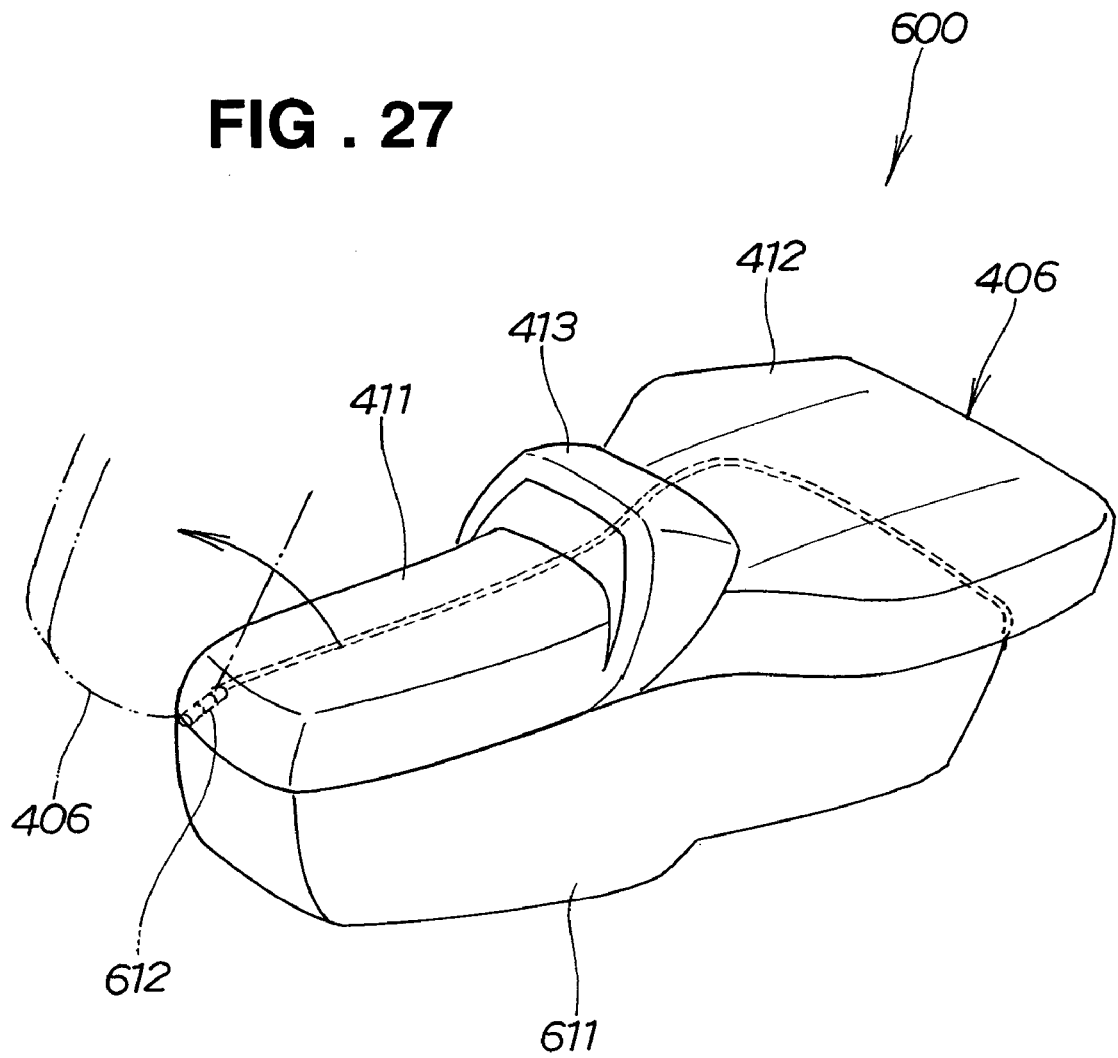
FIG. 27 is a perspective view of a seat of the vehicle of FIG. 25.

As shown in FIG. 26 and FIG. 27, the driver's seat 411 and the rear passenger seat 412 jointly define a seat 406. The storage box 611 has an opening formed at an upper part thereof. The seat 406 serves as a lid arranged to close the opening of the box 611, as shown by a solid line of FIG. 27. The box 611 and the seat 406 have front parts of which right portions are mounted to each other through a hinge 612. This enables the seat 406 to pivot forwardly and rightwardly on the hinge 612 to thereby open the opening of the box 611, as shown by a double-dot-and-dash line of FIG. 27.

Figure 28:
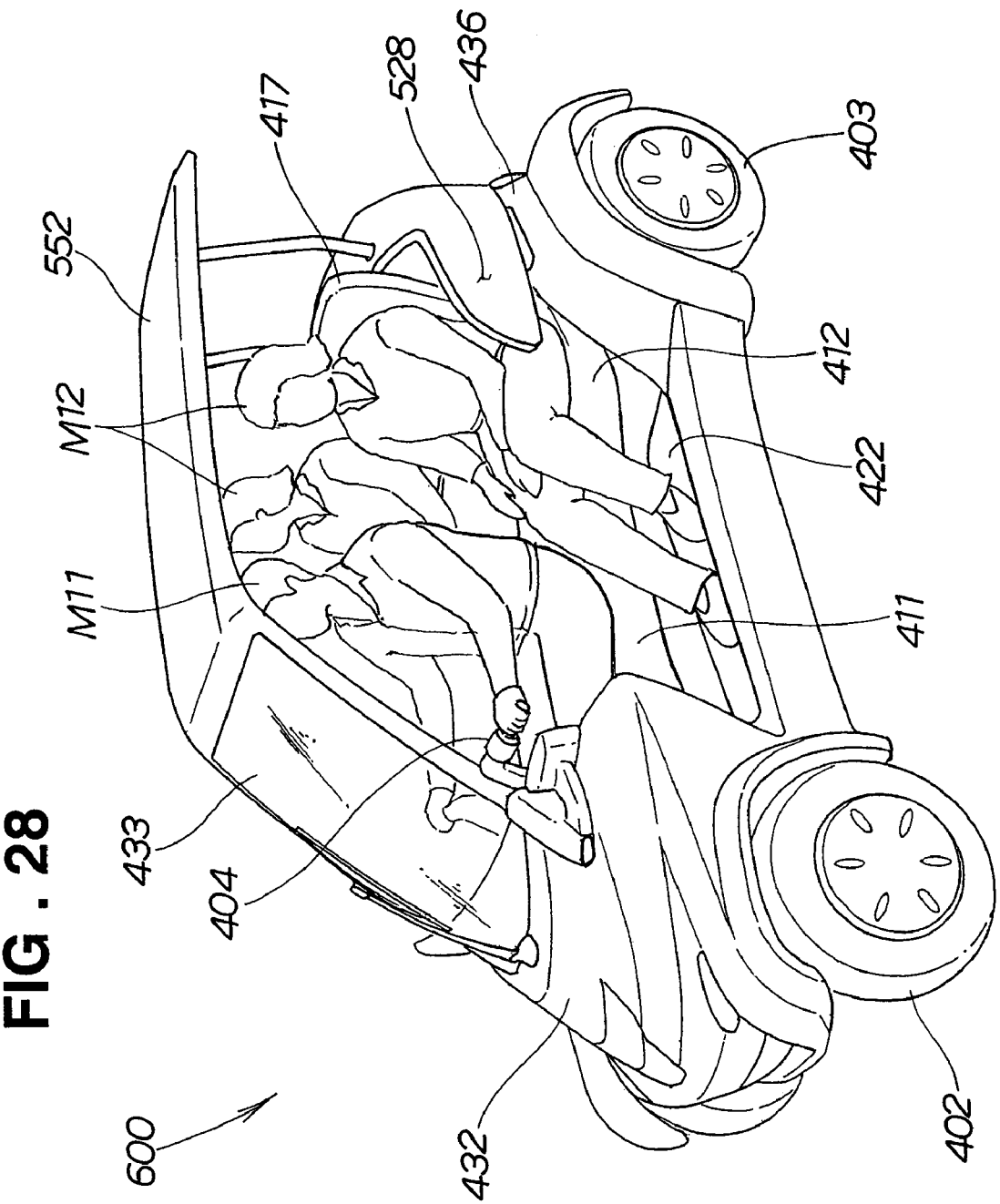
FIG. 28 is the view of FIG. 25 with passengers sitting on the seat of the vehicle.

FIG. 28 shows a driver M11 sitting on the driver's seat 411 and right and left passengers M12, M12 sitting on the rear passenger seat 412 side by side. As is apparent from this figure, the rear passenger seat 412 is designed to be taken by one or two people.

Referring to FIG. 29 through FIG. 38, there is shown a roofed contractible four-wheeled vehicle 10 in accordance with a fourth embodiment of the present invention.

Figure 29:
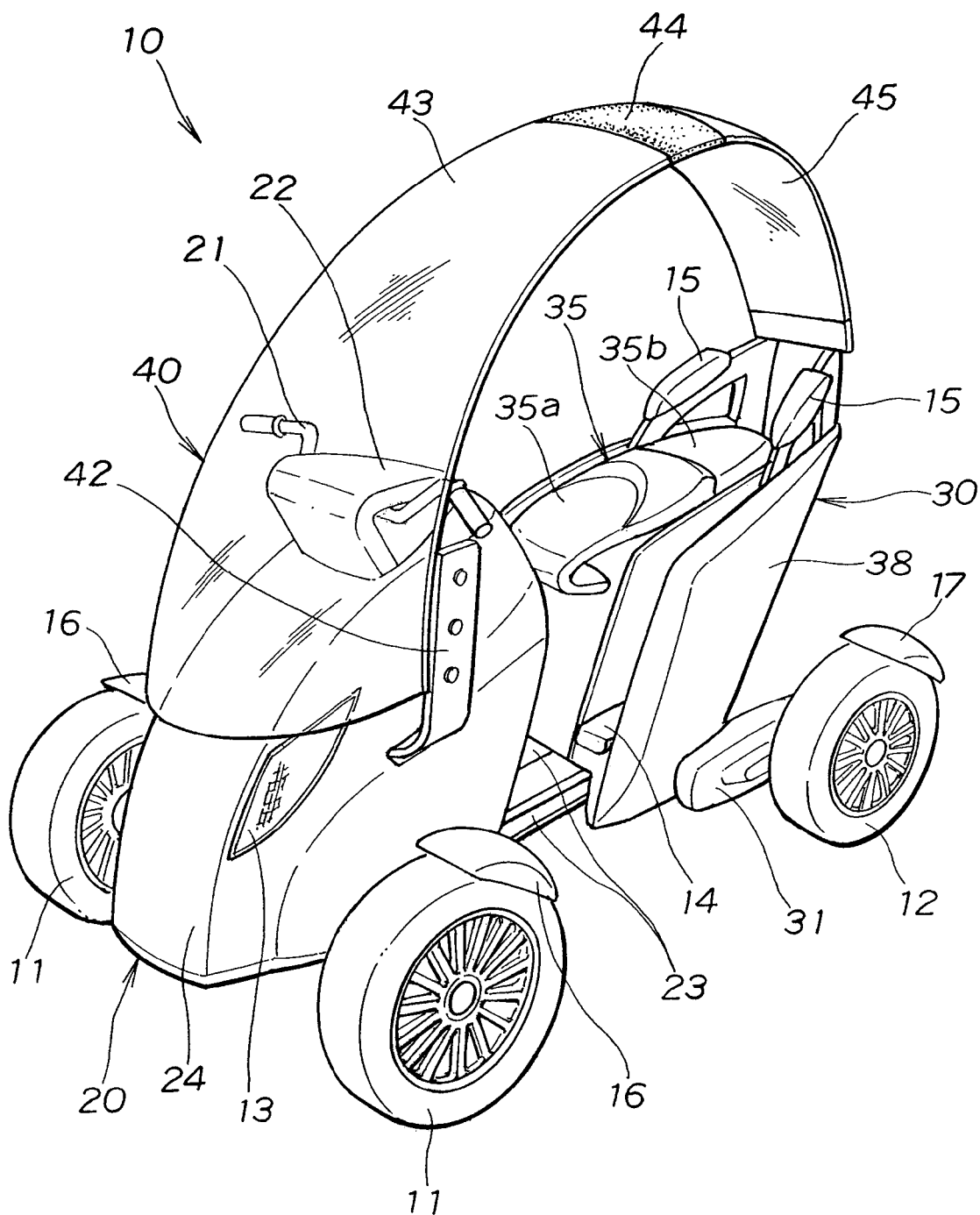
FIG. 29 is a perspective view of a roofed contractible four-wheeled vehicle according to a fourth embodiment of the present invention.
Figure 30:
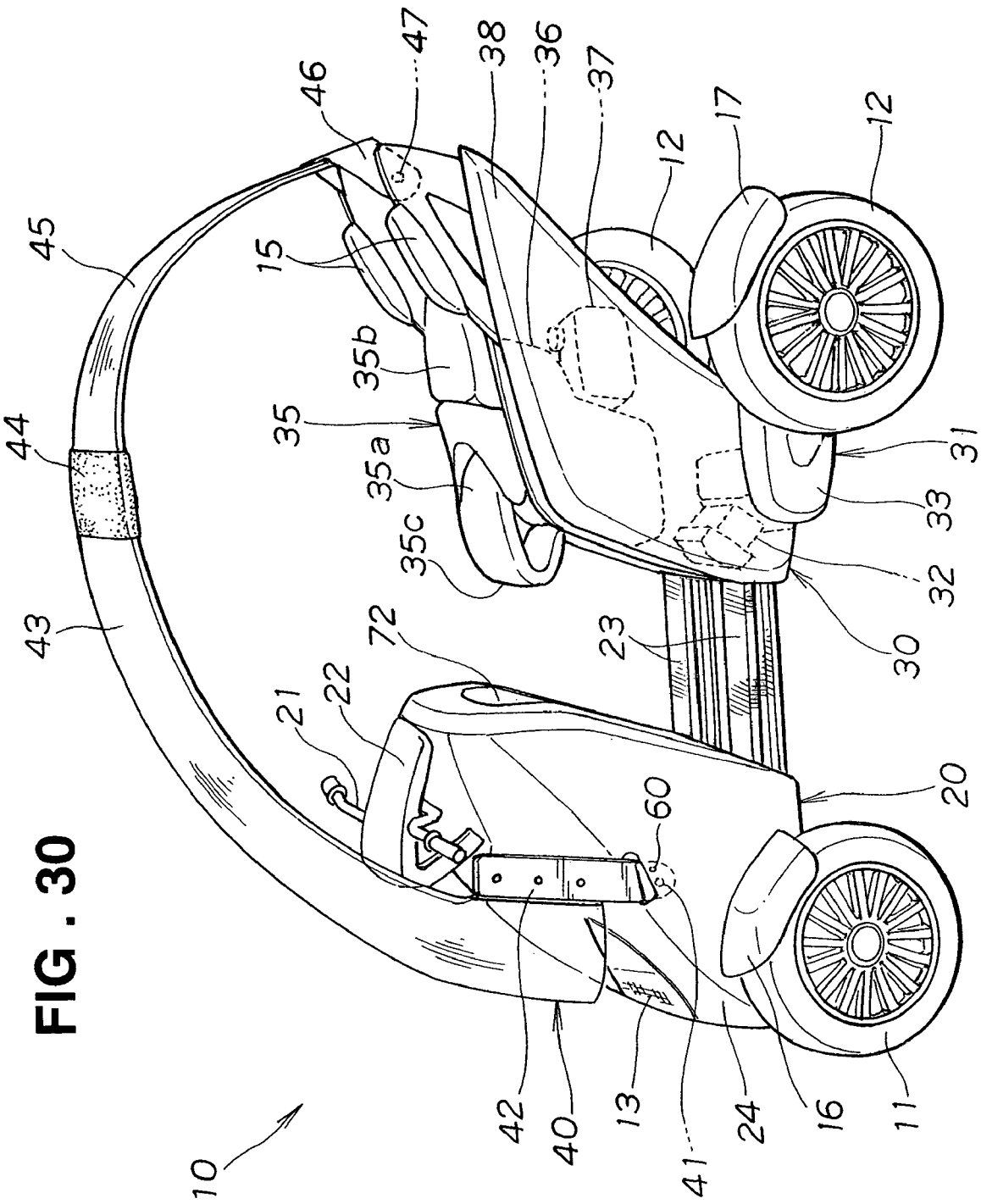
FIG. 30 is a left side elevation view of the vehicle of FIG. 29.

As shown in FIG. 29 and FIG. 30, the roofed contractible vehicle 10 in the fourth embodiment is a two-seat scooter-type four-wheeled vehicle. The vehicle 10 has a front frame 20 provided at a front part thereof, and a rear frame 30 provided a rear part thereof. The front frame 20 includes two, or right and left front wheels 11, 11. The rear frame 30 has two, or right and left rear wheels 12, 12. The front frame 20 cooperates with the rear frame 30 to thereby bring the vehicle 10 from an extended state to a contracted state or vice versa, as will be described later. More specifically, the rear frame 30 is moved towards and away from the front frame 20 for contraction or extension of the vehicle 10. The roofed contractible vehicle 10 has its wheelbase variable to change the entire length thereof.

The front frame 20 includes its upper end having a bar handle 21 and an instrument panel 22 disposed thereat, and its lower end having a pair of left and right guide rails 23, 23 extending rearward therefrom. The front frame 20 is enclosed with a front cover 24.

The rear frame 30 includes a unit swing-type engine 31 disposed at its lower portion, a seat 35 disposed at its upper portion, a storage box 36 disposed below the seat 35, a fuel tank 37 disposed behind the storage box 36, and a rear cover 38 enclosing therein the rear frame 30. The unit swing-type engine 31 is a power unit of a type including an engine 32 and a transmission (such as a continuously variable transmission) 33. The engine 31 is pivotable together with the rear wheels 12, 12. The engine 32 may be replaced with an electric motor to serve as a motive power source for driving the vehicle 10 to travel. The seat 35 is called "tandem seat" including a front driver's seat 35a to be taken by a driver and a rear seat 35b to be taken by a rear passenger.

The roofed contractible vehicle 10 has a roof 40 provided above the driver's seat 35a. The roof 40 includes right and left front stays (only left one shown and designated 42) mounted to right and left sides of the front frame 20 in such a manner as to pivot on a first hinge 41 in a front-and-rear direction of the vehicle 10, a front roof 43 having its lower front portion mounted to swingable or pivotable ends of the front stays, a rear roof 45 having its front end mounted to a rear end of the front roof 43 via a second hinge 44, a rear stay 46 mounted to a lower rear portion of the rear roof 45, and a third hinge 47 on which the rear stay 46 mounted to an upper rear portion of the rear frame 30 pivots in the front-and-rear direction of the vehicle 10. When the vehicle 10 is in the extended state, as shown in FIG. 30, the roof 40 is in a convexly curved state. The first, second and third hinges 41, 44, 47 are arranged to bring the roof 40 from the convexly curved state to a more convexly curved state or vice versa, as will be described later.

The front roof 43 is an elongated member of convex curve extending rearwardly and upwardly from a front part of the front cover 24 to the second hinge 44 disposed above the driver's seat 35a. The front roof 43 serves as a windshield. The rear roof 45 is also an elongated member of convex curve extending rearwardly and downwardly from the second hinge 44, over the seat 35, to the upper rear portion of the rear frame 30. The front and rear roofs 43, 45 are made from transparent or semitransparent material. The first, second and third hinges 41, 44 and 47 are members made from flexible material such as hard rubber capable of bending the roof 40 into the more convexly curved state.

Reference numeral 13 denotes a headlamp, 14 a step for a rear passenger, 15 a rear grip, 16 a front fender, and 17 a rear fender.

Figure 31:
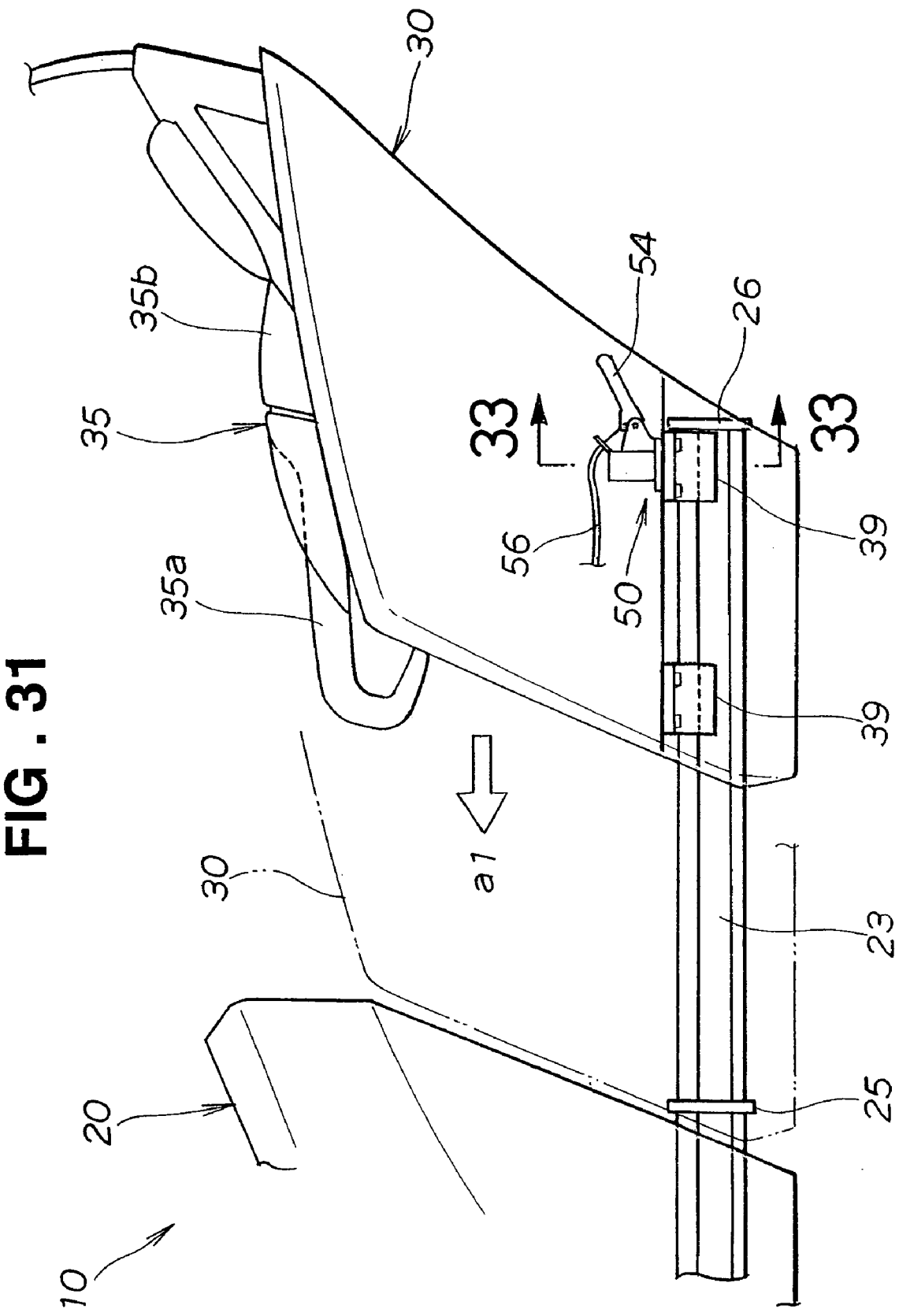
FIG. 31 is a side elevation view of a front frame, a rear frame, guide rails, and a slide locking device of the vehicle of FIG. 29.

Referring to FIG. 31, the rear frame 30 is mounted to the left and right guide rails (only one shown and designated 23) in such a manner as to move towards and away from the front frame 20. This allows the rear frame 30 to move in a direction of an arrow a1 from a position shown by a solid line to a position shown by a phantom line. The right and left guide rails 23 also serve as steps on which a driver occupying the driver's seat 35a rests his or her feet. Because the guide rails 23 serve as both rails and footrests, there is no need to provide a separate footrest only for allowing the driver to rest his or her feet thereon. In other words, this results in a reduced number of components for the vehicle 10.

The right and left guide rails 23 have front stoppers 25 disposed in the vicinity of the rear end of the front frame 20. The right and left guide rails 23, 23 have rear stoppers 26 disposed at rear ends thereof. The rear frame 30 has four sliders 39 (two shown for the purpose of illustration) at its lower portion. Of these four sliders, the two ones are mounted on the left guide rail 23 and disposed one behind the other. Likewise, the other two sliders 39, 39 are mounted on the right guide rail 23 and disposed one behind the other. The two sliders mounted on each guide rail are referred to as "front and rear sliders 39, 39". One of the rear sliders 39, 39 is provided with a slide locking device 50. The slide locking device 50 prevents the movement of the sliders 39.

Figure 32:
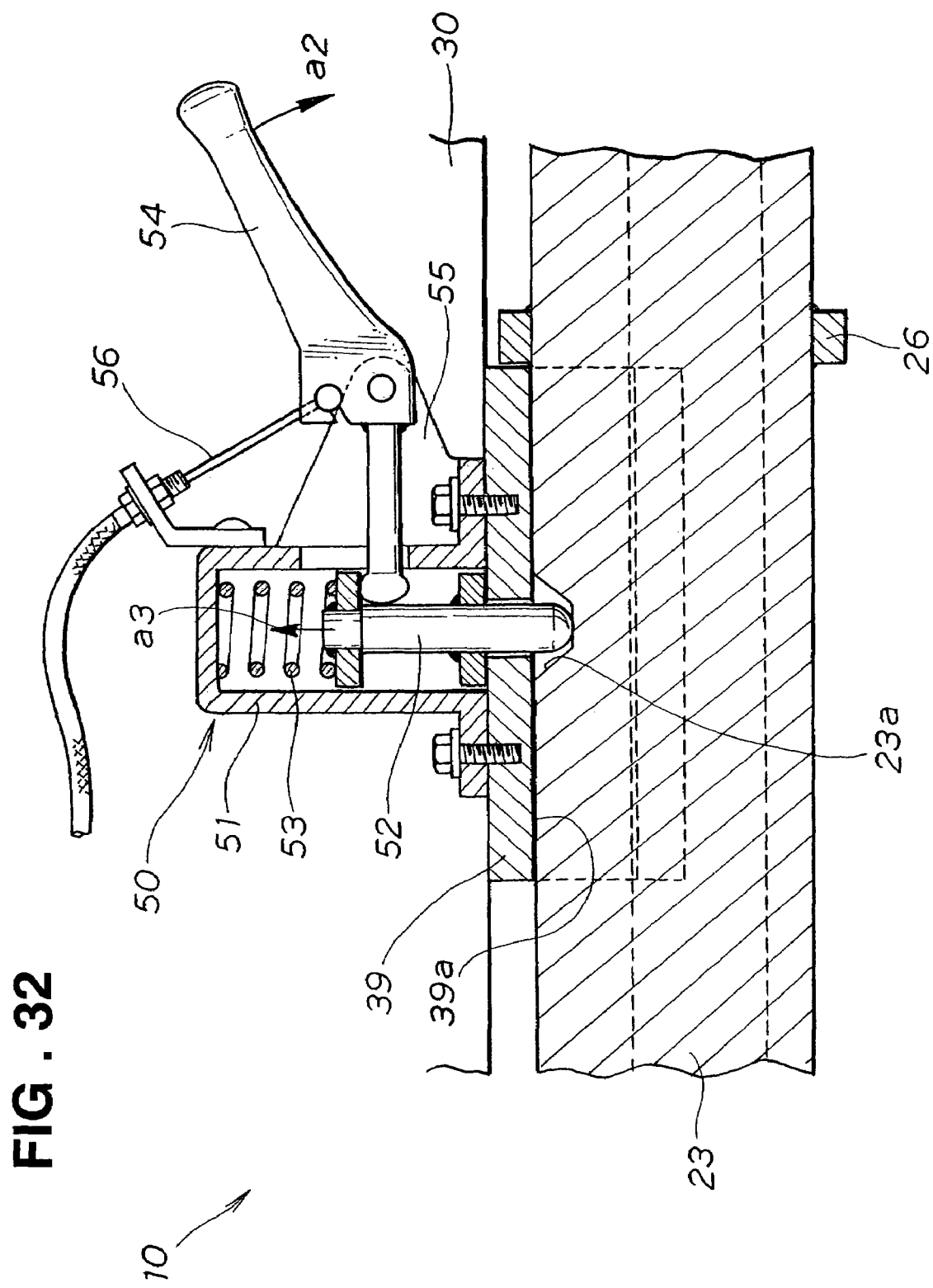
FIG. 32 is a cross-sectional view of the slide locking device of FIG. 31.
Figure 33:
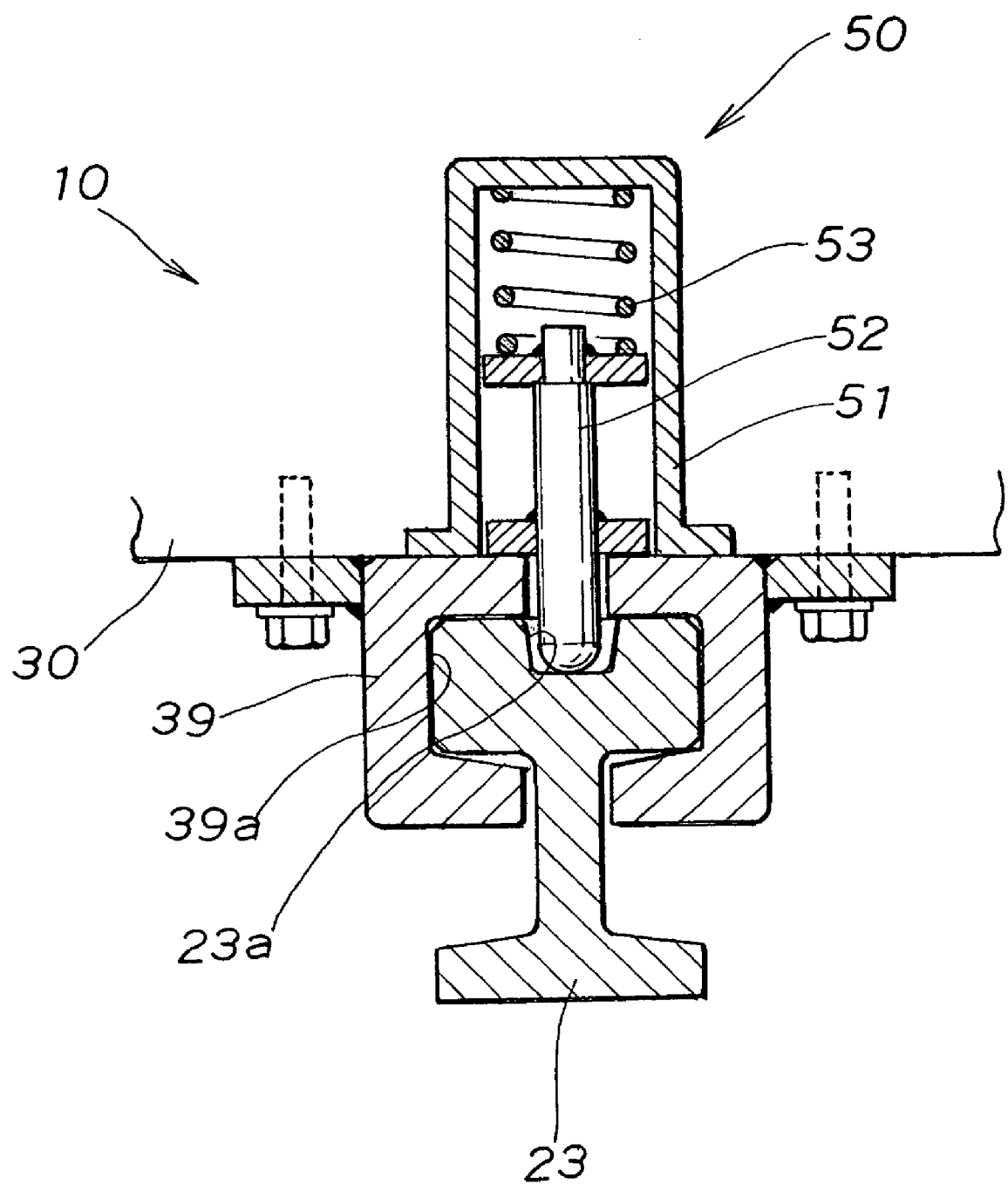
FIG. 33 is a cross-sectional view taken along line 33-33 of FIG. 31.

Reference is made to FIG. 32 and FIG. 33. The guide rail 23 has a substantially I-shaped cross-section, as shown in FIG. 33. The slider 39 has a groove 39a formed to extend along the entire length thereof. The guide rail 23 is fitted into the groove 39a to guide the slider 39 therealong. The slider 39 opens downward. More specifically, as shown in FIG. 33, the slider 39 includes its lower part having an opening formed therein. The opening has its width smaller than that of the groove 39a. The opening and the groove 39a jointly define a T-shaped configuration as best shown in FIG. 33.

The slide locking device 50 includes a lock recess 23a formed in an upper surface of the guide rail 23, a case 51 mounted on an upper surface of the slider 39, a lock pin 52 housed in the case 51 in such a manner as to vertically move into and out of engagement with the lock recess 23a, a compression spring 53 arranged to urge the lock pin 52 towards the lock recess 23a, an unlock lever 54 arranged to force the lock pin 52 to move out of the engagement with the lock recess 23a against the resilient force of the compression spring 53, and a supporter 55 for supporting the unlock lever 54 in such a manner as to allow pivotal or swing movement of the lever 54. The unlock lever 54 is connected to one end of a wire cable 56. The pivotal movement of the unlock lever 54 in the direction of an arrow a2 allows the lock pin 52 to move out of the engagement with the lock recess 23a, as shown by an arrow a3.

Figure 34:
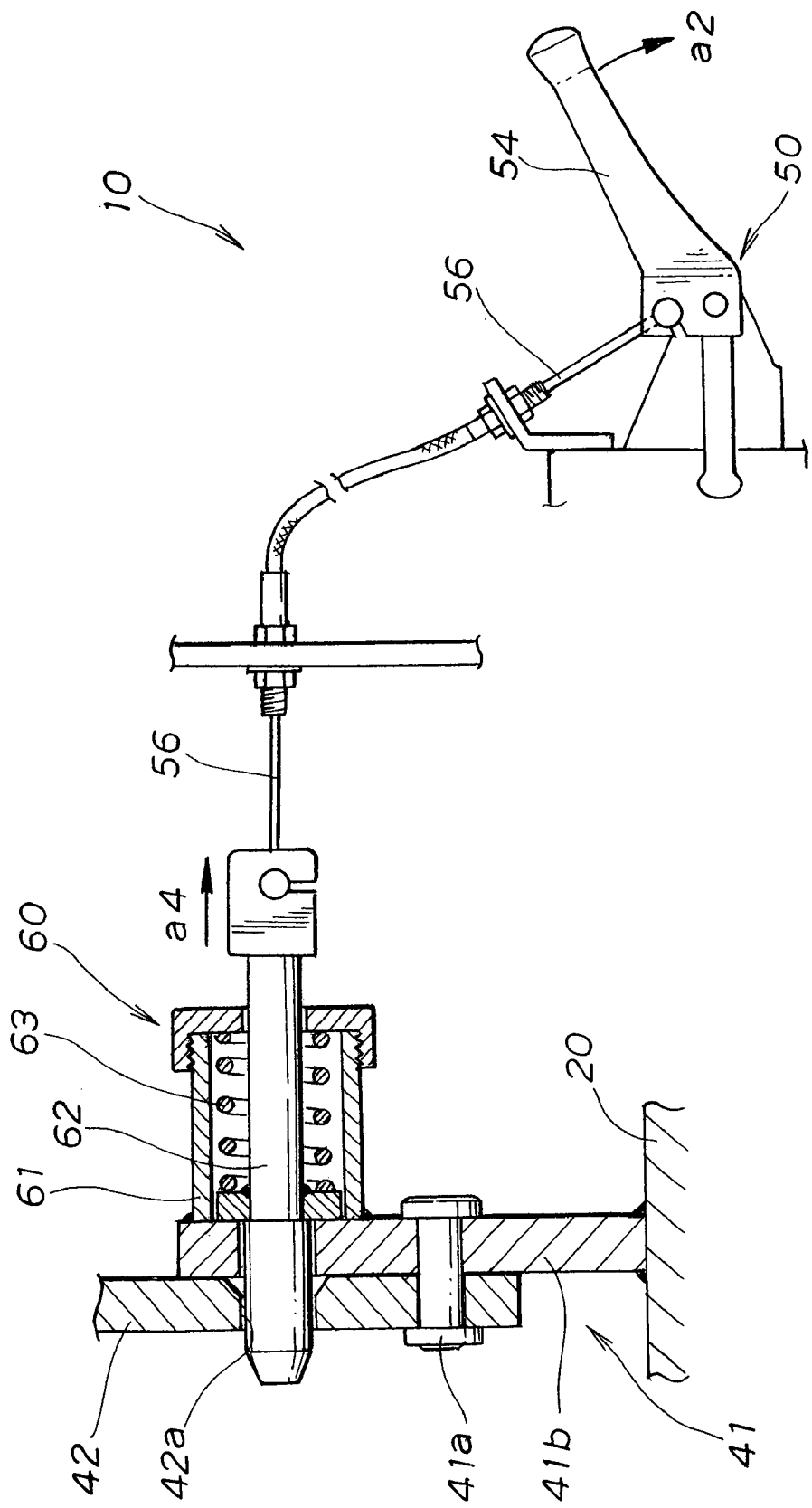
FIG. 34 illustrates in cross-section a swing locking device connected via a wire cable to the slide locking device.

The other end of the wire cable 56 is, as shown in FIG. 34, connected to a swing locking device 60 for the front stay 42. The swing locking device 60 is provided for preventing the front stay 42 from pivoting back and forth. The swing locking device 60 includes a lock aperture 42a formed in the front stay 42 and offset with respect to a hinge pin 41a of the first hinge 41, a case 61 mounted to a side surface of a hinge plate 41b of the first hinge 41, a lock pin 62 housed in the case 61 in such a manner as to move into and out of engagement with the lock aperture 42a, and a compression spring 63 arranged to urge the lock pin 62 towards the lock aperture 42a. The lock pin 62 has its rear end connected to the other end of the wire cable 56. The pivotal movement of the unlock lever 54 in the direction of the arrow a2 allows the lock pin 62 to move out of the engagement with the lock aperture 42a as shown by an arrow a4.

Figure 35:
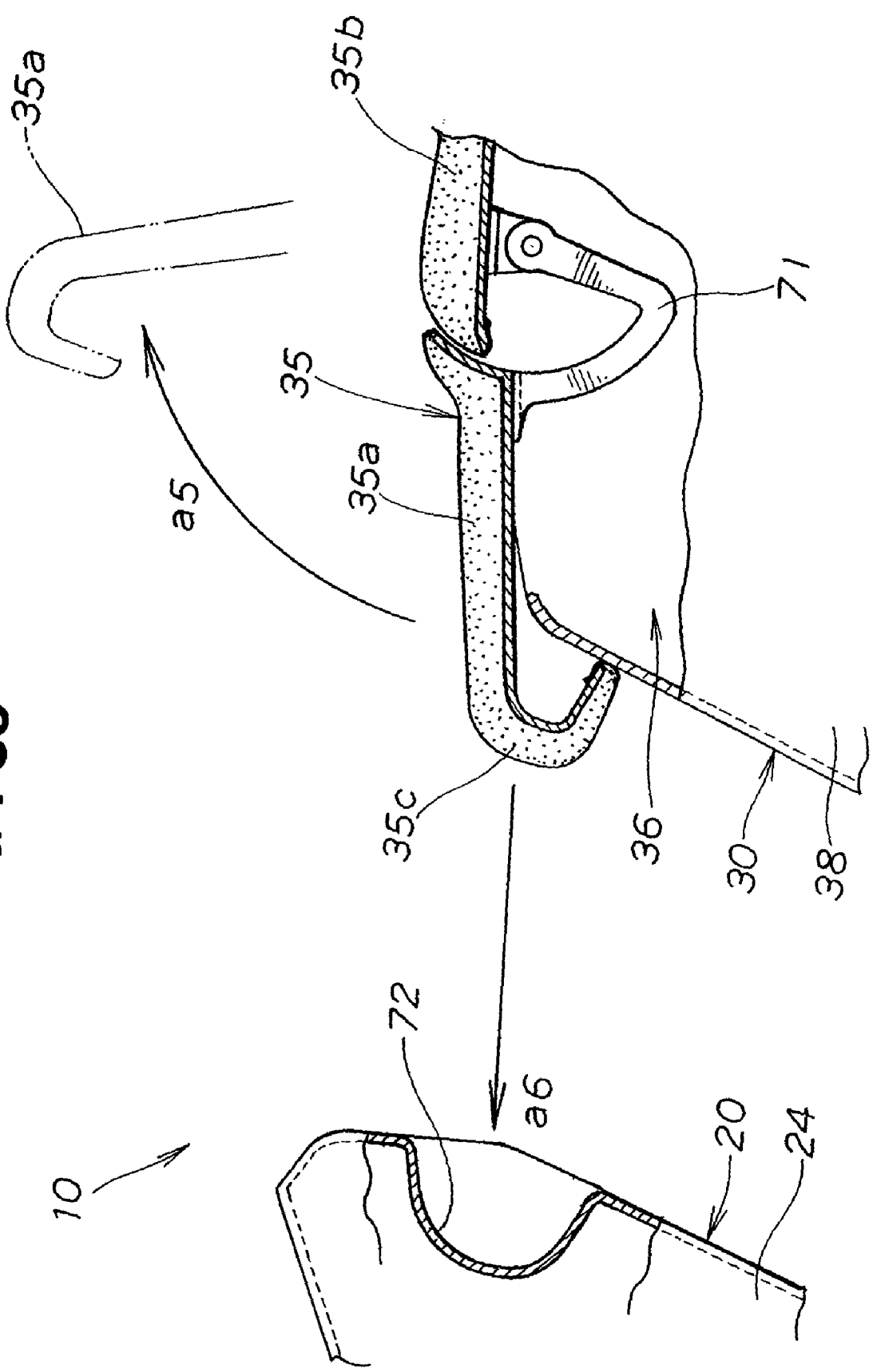
FIG. 35 is a cross-sectional view of the front frame, the rear frame, a seat and a storage box of the vehicle of FIG. 29.

Referring to FIG. 35, the driver's seat 35a is mounted on the storage box 36 in such a manner as to pivot on a hinge 71 to open and close an opening formed at an upper part of the box 36. When the seat 35a pivots to open the opening of the box 36, as shown by an arrow a5, a helmet box and the like can be taken into or out of the box 36. It is to be understood that the hinge 71 may be provided at a front end portion of the storage box 36.

Figure 36:
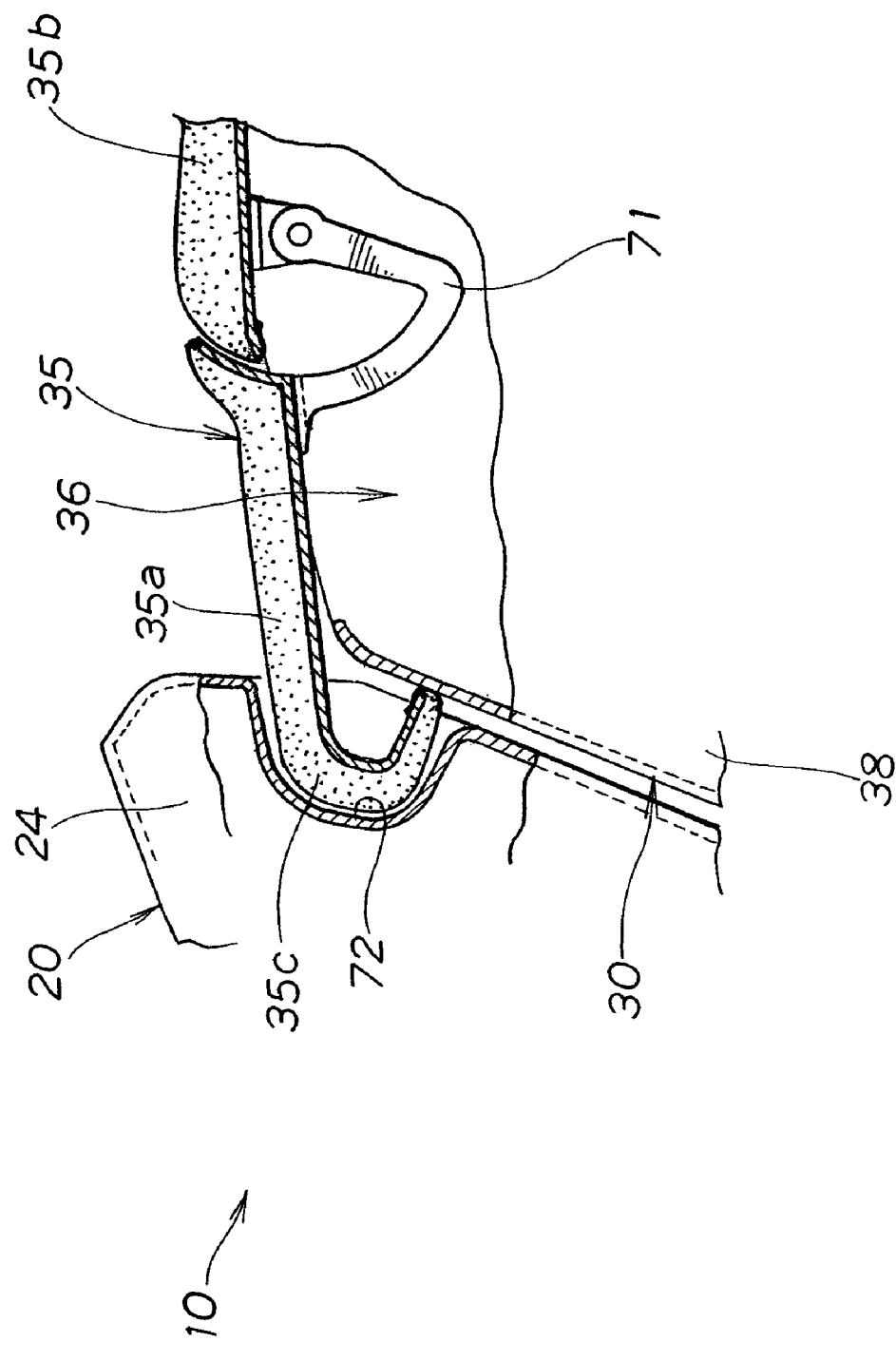
FIG. 36 is the view of the FIG. 35 with the rear frame, the seat and storage box positioned near the front frame when the vehicle is in a contracted state.

The driver's seat 35a has a front end portion 35c protruding from a front end of the rear frame 30 towards the front frame 20. The front frame 20 has at its rear end a housing recess 72. The housing recess 72 is formed to correspond to the front end portion 35c. More specifically, when the rear frame 30 is advanced, as shown by arrow a6, to come near to the front frame 20, as shown in FIG. 36, the front end portion 35c enters the housing recess 72b to thereby lock the driver's seat 35a in a closed state. When the driver's seat 35a is in the "closed state", the front end portion 35c is received within the housing recess 72. Since the driver's seat is locked in the closed state, the driver's seat 35a is not allowed to undergo the pivotal or swing movement. Therefore, when the roofed contractible vehicle 10 comes into the contracted state, the driver's seat 35a is automatically locked in the closed state as shown in FIG. 36. Since the seat 35a is in the closed state, the opening of the storage box 36 is maintained in a closed state. This eliminates the need for an additional locking mechanism only for locking the driver's seat 35a in the closed state.

Figure 37:
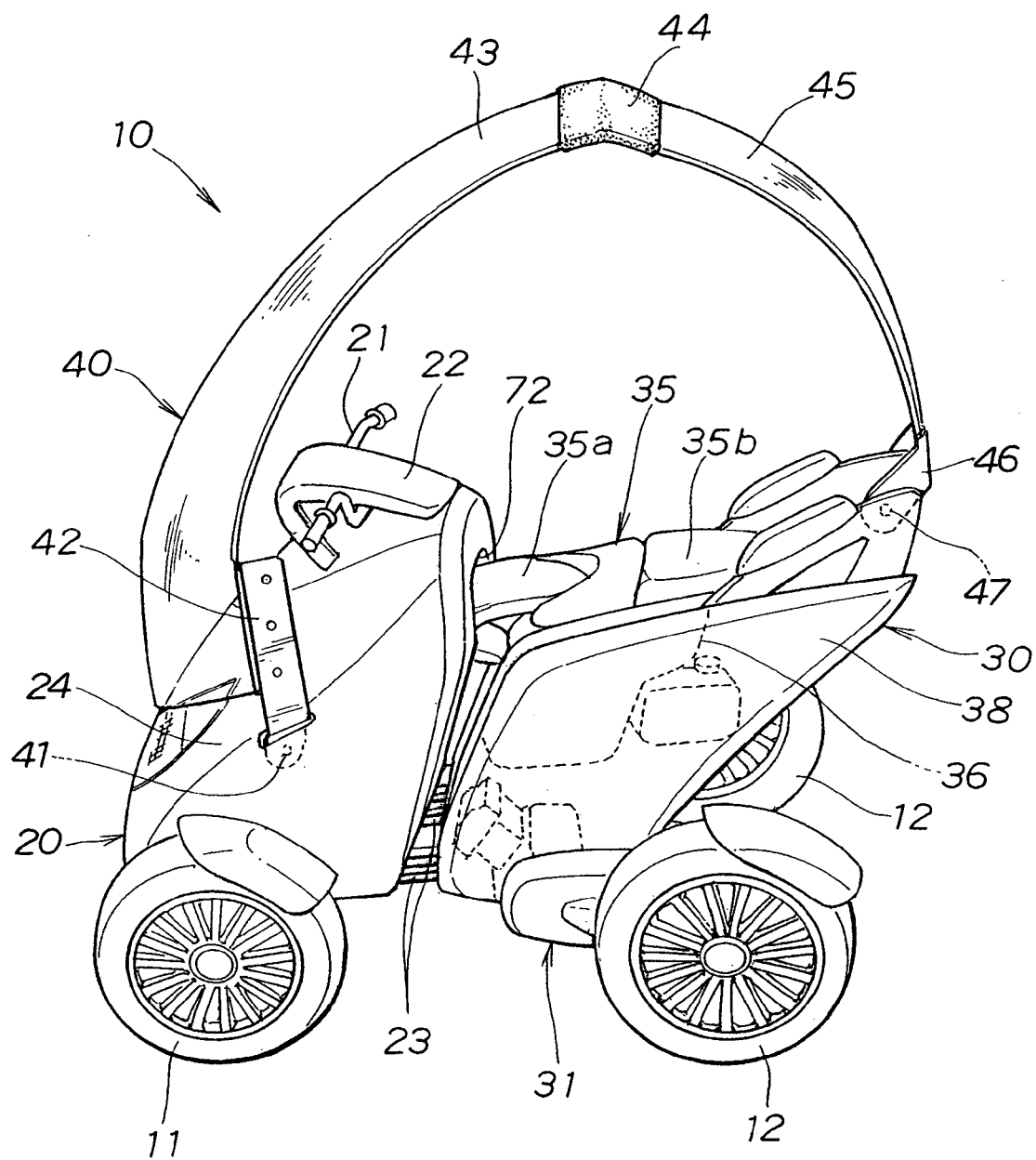
FIG. 37 is a side elevation view of the vehicle in the contracted state.

Reference is made to FIG. 30, FIG. 32 and FIG. 34. When the roofed contractible vehicle 10 is brought from the contracted state to the extended state where the driver can sit on the seat 35a to drive the vehicle 10, each of the slide locking device 50 and the swing locking device 60 is in a locked state. To contract the roofed contractible vehicle 10, the unlock lever 54 is operated to unlock the slide locking device 50 and the swing locking device 60, whereupon the rear frame 30 is moved forward or towards the front frame 20. As a result, the roof 40 is bent on the first, second and third hinges 41, 44 and 47 into the more convexly curved state to thereby contract vehicle 10, as shown in FIG. 37. A locking mechanism may be provided for the operation of the lever 54 of the slide locking device. This enables keeping the storage box locked.

As is clear from the above description, the roofed contractible vehicle 10 in the fourth embodiment has the driver's seat 35a movable in the front-and-rear direction of the vehicle 10, and the roof 40 movable between the convexly curved state and the more convexly curved state in synchronization with the movement of the driver's seat 35a in the front-and-rear direction.

Figure 38:
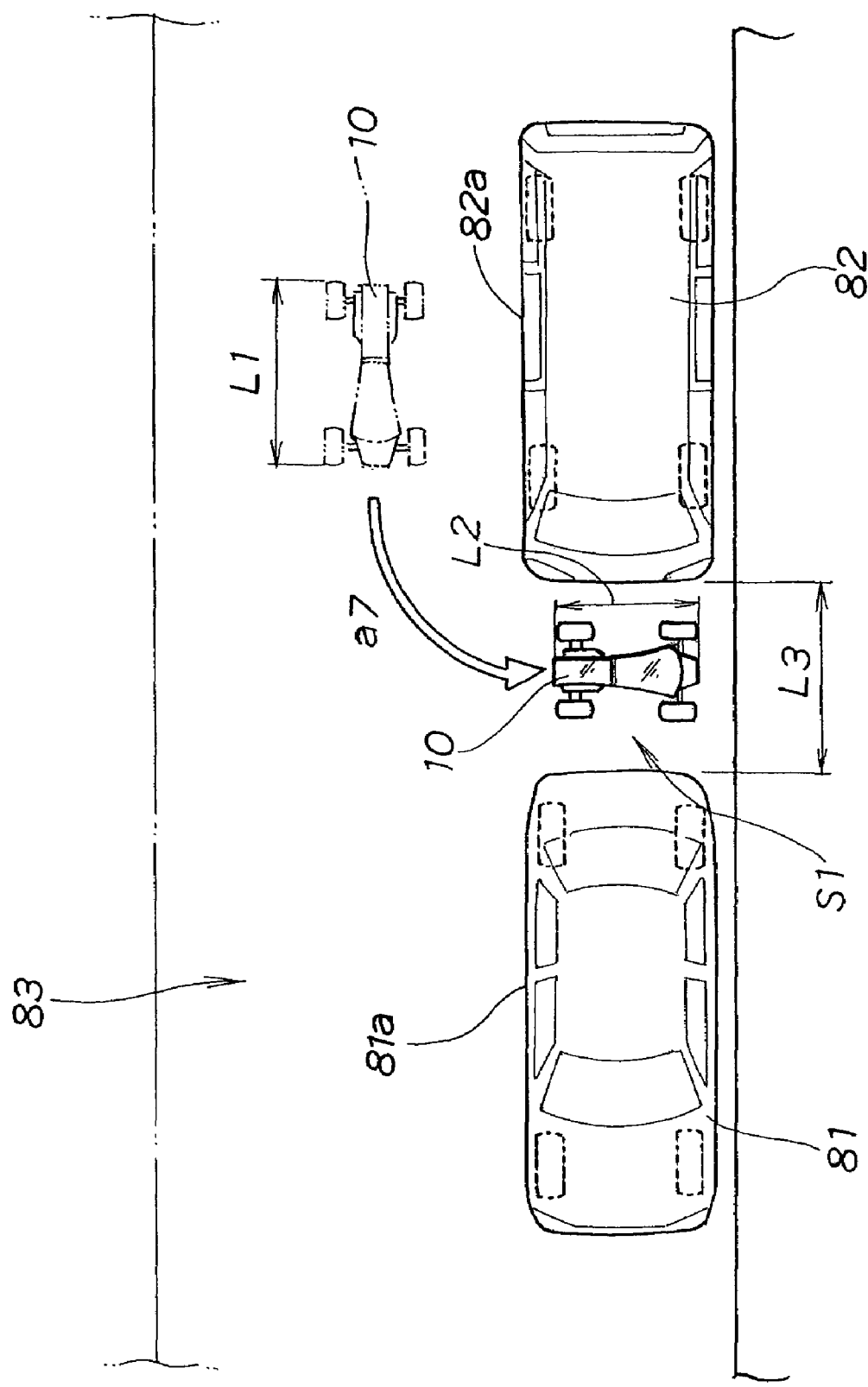
FIG. 38 illustrates how the vehicle of FIG. 29 is parked in a space provided between vehicles parked in tandem.

Turning to FIG. 38, when in the extended state as shown by a phantom line, the vehicle 10 has its entire length L1. When in the contracted state as shown by a solid line, on the other hand, the vehicle 10 has the entire length L2. The entire length L2 is much smaller than the entire length L1, and is substantially the same as the width of an automobile, for example.

When vehicles 81, 82 parked in tandem are spaced from each other by a length L3 of e.g., about 165 cm (slightly larger than the width of the vehicle 10) to provide a free space S1, the roofed contractible vehicle 10 may be parked in the empty space S1 as follows.

First, the roofed contractible vehicle 10 shown by the phantom line is turned as shown by an arrow a7 and subsequently moves in a direction perpendicular to a longitudinal direction of the vehicles 81, 82 for entry into the space S1. The vehicle 10 is then parked in orientation transverse with respect to the longitudinal direction of the vehicles 81, 82. Secondly, the driver and the passenger get off the vehicle 10, and then the roofed contractible vehicle 10 is brought to the contracted state as shown by the solid line. At this time, the roofed contractible vehicle 10 has no portion positioned more closely to the center of a road 83 than sides 81a, 82a of the vehicles 81, 82. In other words, the vehicle 10 is parked within the space S1 without protruding towards the center of the road 83 through the plane in which the sides 81a, 82a lie. Accordingly, the vehicle 10 can be effectively parked in such a narrow space S1.

As discussed above, the roofed contractible vehicle 10 in the fourth embodiment of the present invention includes the driver's seat 35a the driver sits on, and the roof 40 disposed above the driver's seat 35a. The seat 35a is movable in the front-and-rear direction of the vehicle 10. The roof 40 is movable between the convexly and more convexly curved states in response to the movement of the seat 35a in the front-and-rear direction.

With this arrangement, moving the driver's seat 35a in the front-and-rear direction of the vehicle 10 brings the roof 40 to the convexly curved state or the more convexly curved state. This enables the vehicle 10 to be contracted or extended easily. Accordingly, if desired, the vehicle 10 can be contracted into a smaller overall length. This makes it possible for the vehicle 10 to be easily parked even in a smaller space.

Further, providing the hinges 41, 44, 47 enables the roof 40 to be brought to the convexly or more convexly curved state simultaneously with the movement of the seat 35a in the front-and-rear direction of the vehicle 10. Therefore, it becomes possible to bend the roof 40 more easily.

As is apparent from the foregoing description, the four-wheeled vehicle 10 according to the fourth embodiment of the present invention includes a steering mechanism having the bar handle 21, the right and left wheels 11, 11 at the front part thereof, the right and left wheels 12, 12 at the rear part thereof, and the rear passenger's seat 35b disposed behind the seat 35a and between the rear wheels 12, 12. The rear passenger seat 35b faces forwardly.

Figure 39:
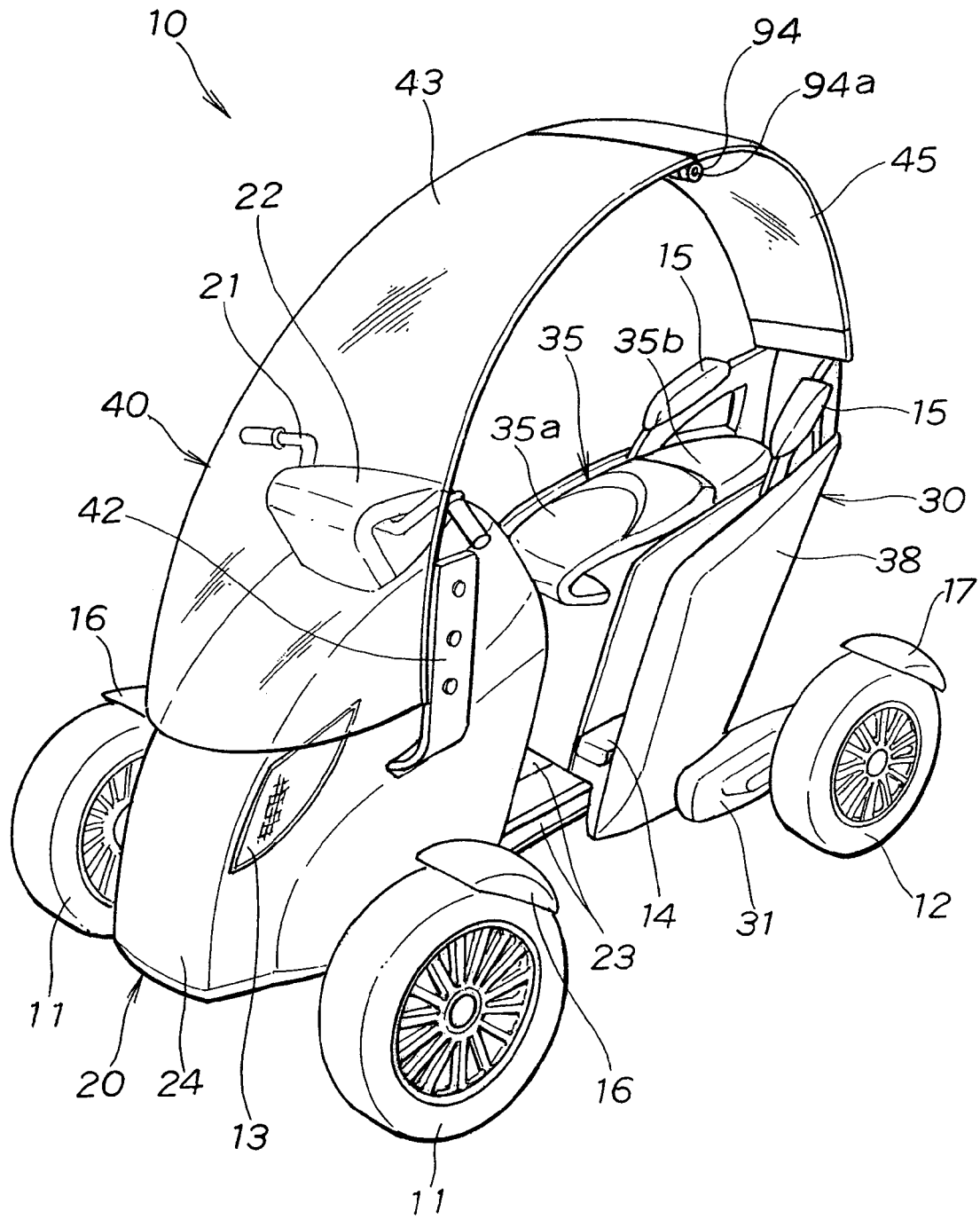
FIG. 39 illustrates a modification of the vehicle of FIG. 29.

FIG. 39 illustrates a modification of the roof 40 of the roofed contractible vehicle 10 as shown in FIG. 29. The modified roof 40 has a second hinge 94 for mounting the front end of a rear roof 45 to the rear end of a front roof 43 therethrough. The second hinge 94 includes a hinge pin 94a, like the first and third hinges 41, 47. The roofed contractible vehicle 10 of FIG. 39 is identical to that of the first embodiment in other components than the second hinge 94. The other components are thus numbered with the same reference numeral and their descriptions will be omitted.

Now, a roofed contractible four-wheeled vehicle 100 according to a fifth embodiment of the present invention will be described with reference to FIG. 40 to FIG. 49. Components identical to those of the fourth embodiment are denoted by the same reference numerals and will not be described here.

Figure 40:
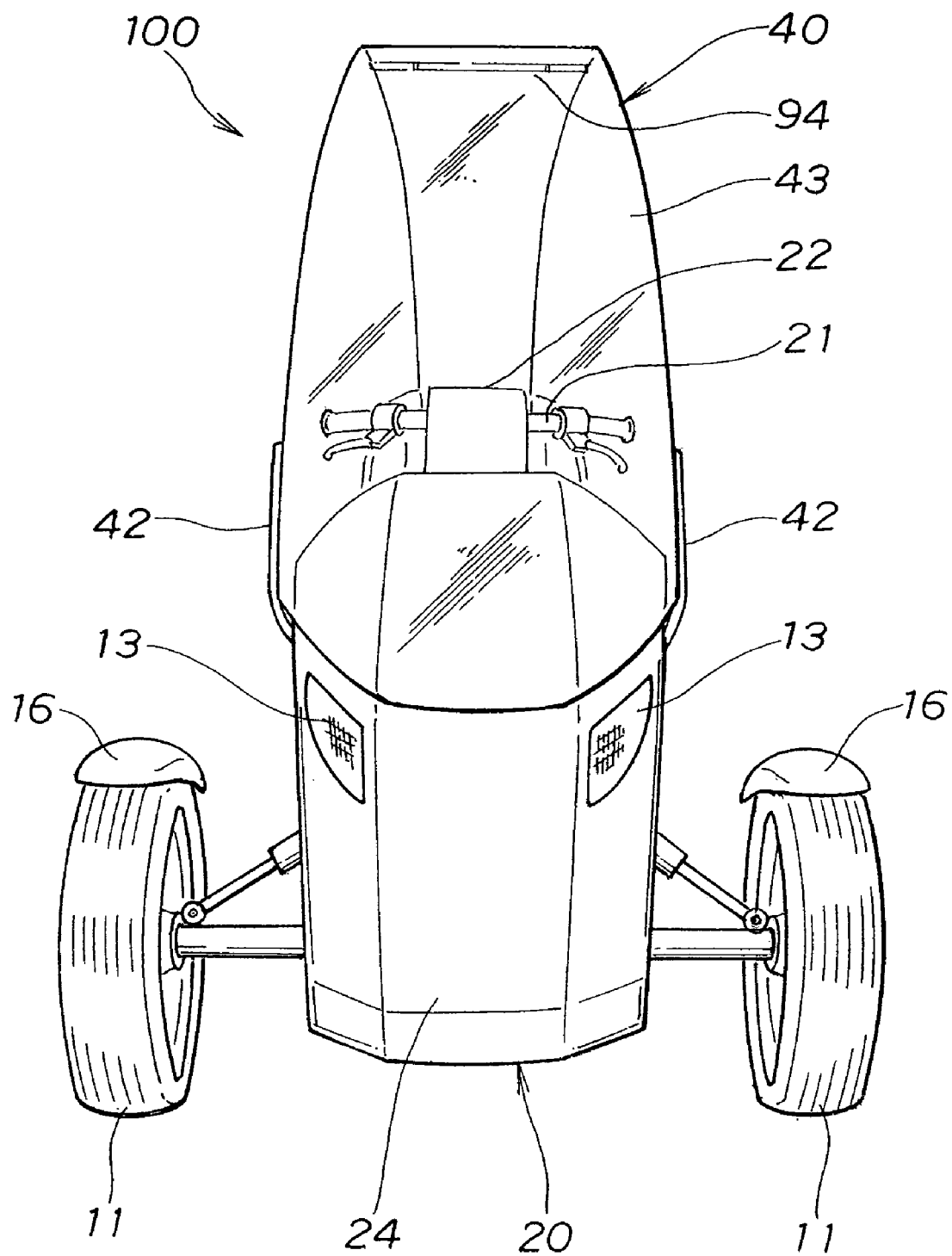
FIG. 40 is a front elevation view of a roofed contractible four-wheeled vehicle according to a fifth embodiment of the present invention.
Figure 41:
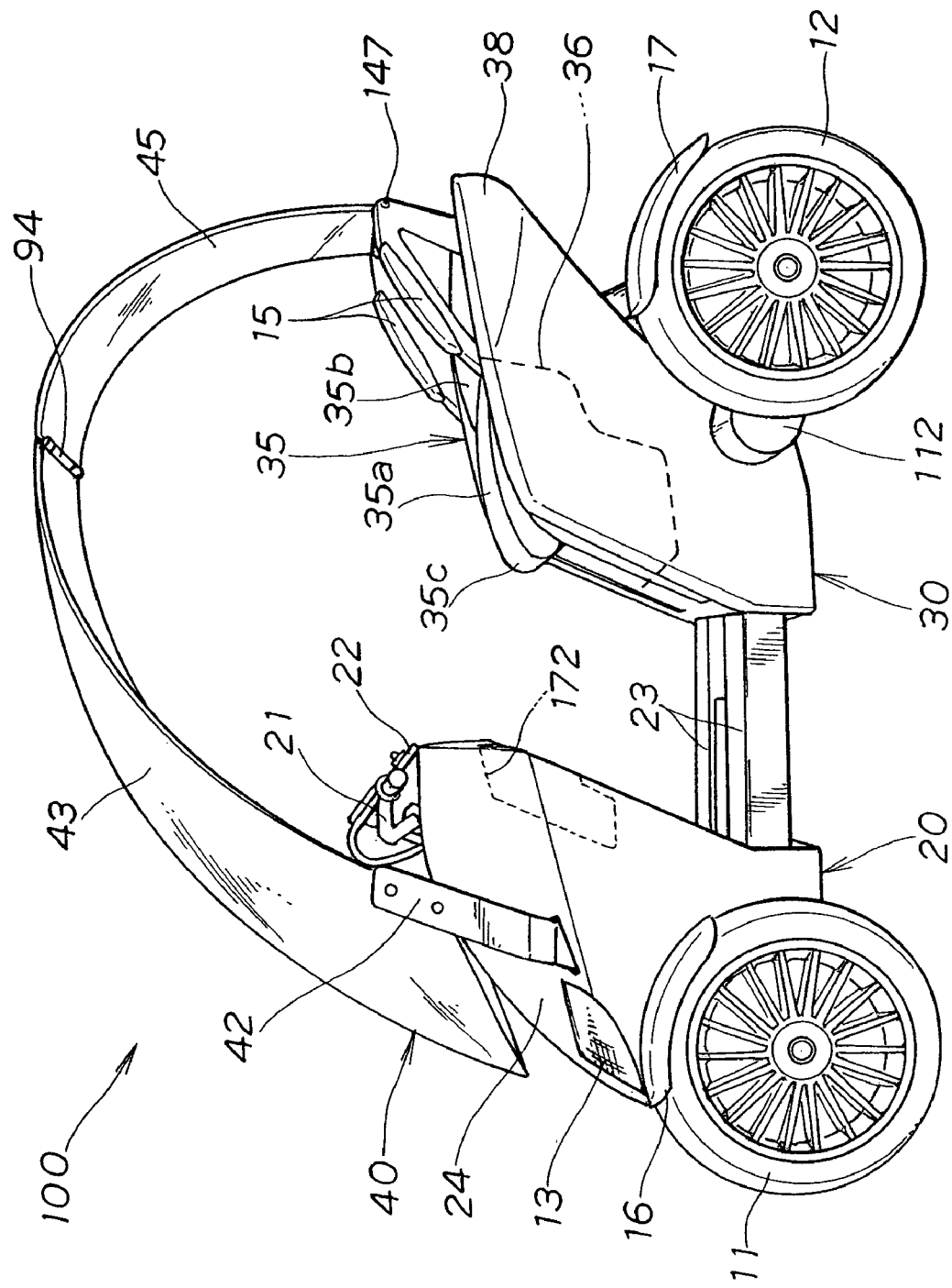
FIG. 41 is a left side elevation view of the vehicle of FIG. 40.
Figure 42:
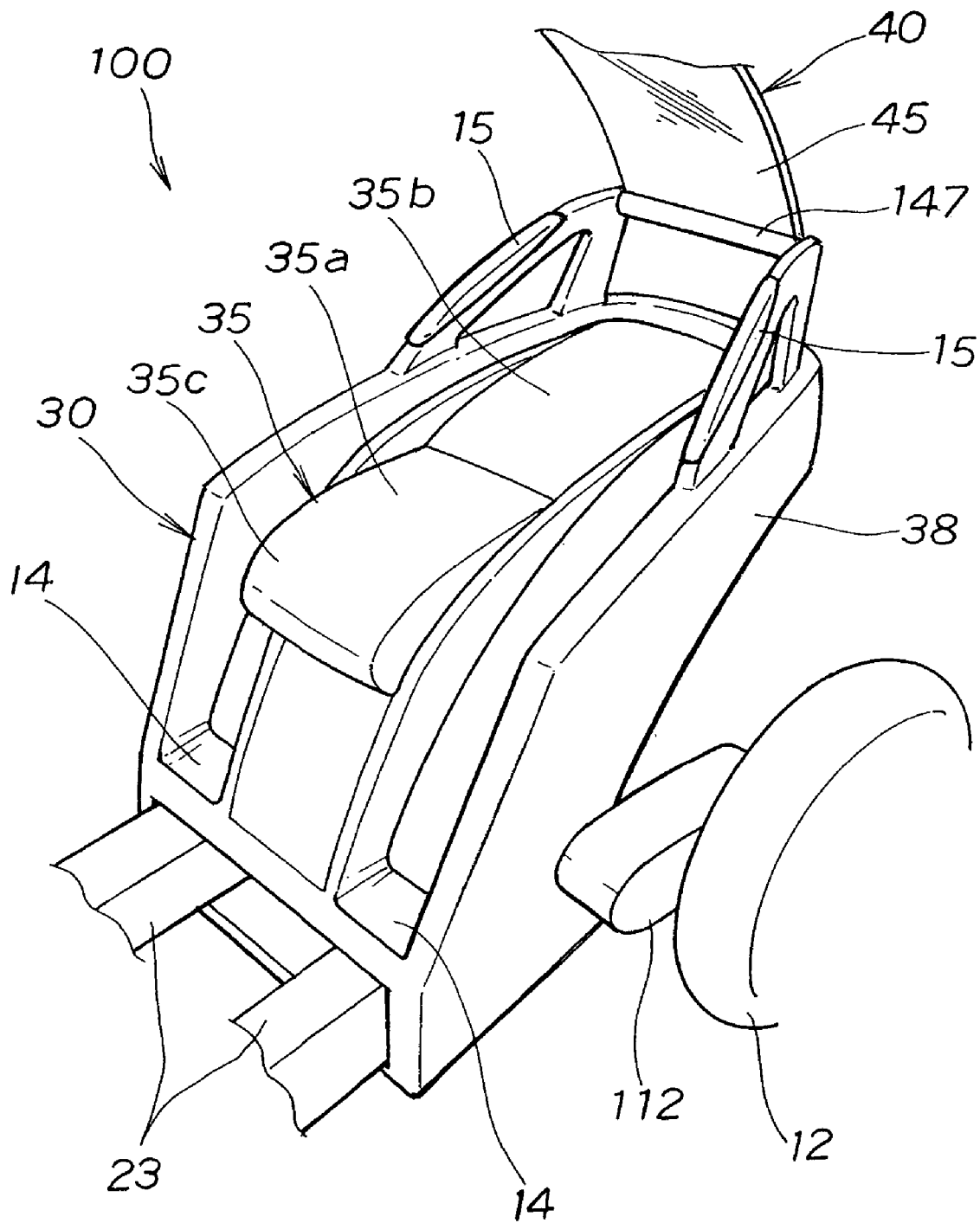
FIG. 42 is a perspective view of a rear frame and a seat of the vehicle of FIG. 40.

As shown in FIG. 40 to FIG. 42, the roofed contractible vehicle 100 in the second embodiment is a two-seater scooter-type four-wheeled vehicle having substantially the same construction as the roofed contractible vehicle 10 according to the fourth embodiment.

The vehicle 100 includes a front frame 20, and a roof 40 having right and left front stays 42, 42 fixed to the front frame 20. More specifically, the roof 40 includes the right and left front stays 42, 42 mounted to the front frame 20, a front roof 43 mounted at its front lower portion to ends of the front stays 42, 42, a rear roof 45 mounted at its front end to a rear end of the front roof 43 via a second hinge 94, and a third hinge 147 on which the rear roof 45 having its rear lower portion mounted to a rear upper portion of a rear frame 30 pivots in a front-and-rear direction of the vehicle 10. The second and third hinges 94, 147 are arranged to bring the roof 40 from a convexly curved state to a more convexly curved state or vice versa.

Figure 43:
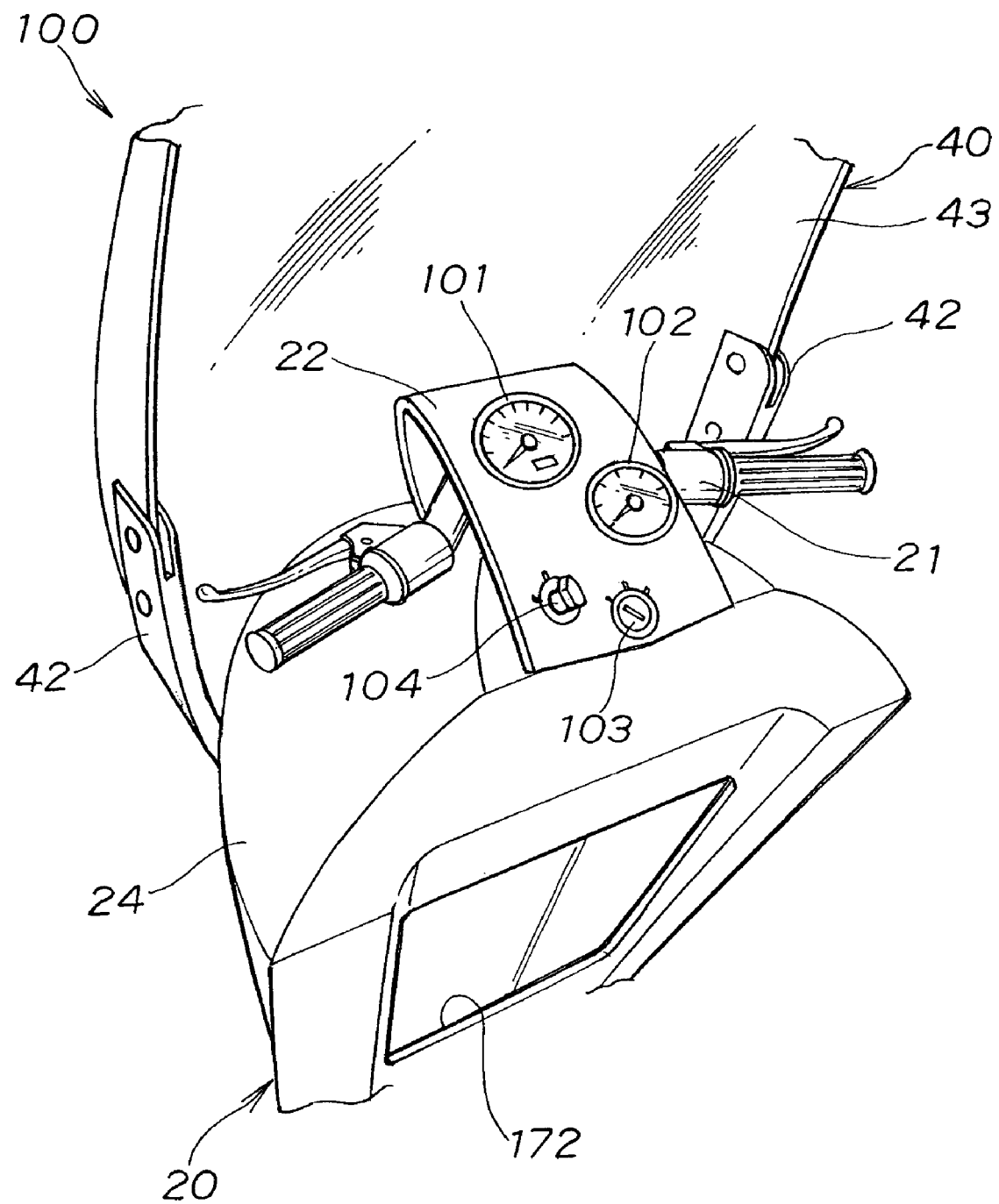
FIG. 43 is a perspective view of a front frame of the vehicle of FIG. 40 including an instrument panel.

Referring to FIG. 43, the vehicle 100 includes an instrument panel 22 having a revolution counter 101 for indicating a vehicle speed or the number of revolutions of an electric motor to be described later, a Global Positioning System (GPS) display 102, a main switch 103, and a rear frame sliding operation switch 104.

The vehicle 100 includes a front cover 24 having a storage recess 172 formed in a rear end surface thereof. The storage recess 172 receives and locks a front end portion 35c of a driver's seat 35a when the rear frame 30 is moved close to the front frame 20 as in the fourth embodiment. Additionally, the recess 172 may accommodate therein goods.

Figure 44:
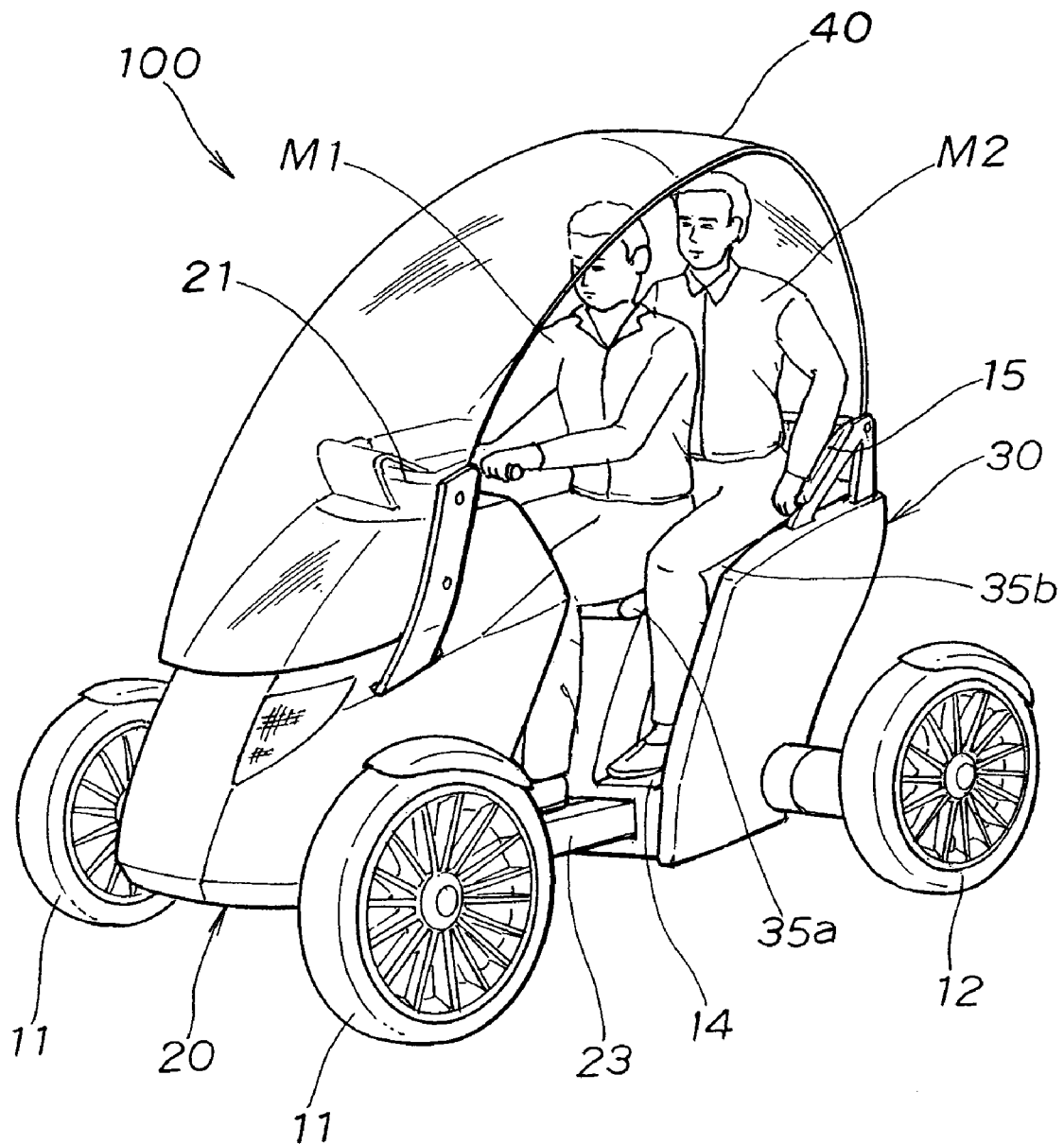
FIG. 44 is a perspective view of the vehicle of FIG. 40 steered by a driver with a passenger sitting behind the driver.
Figure 45:
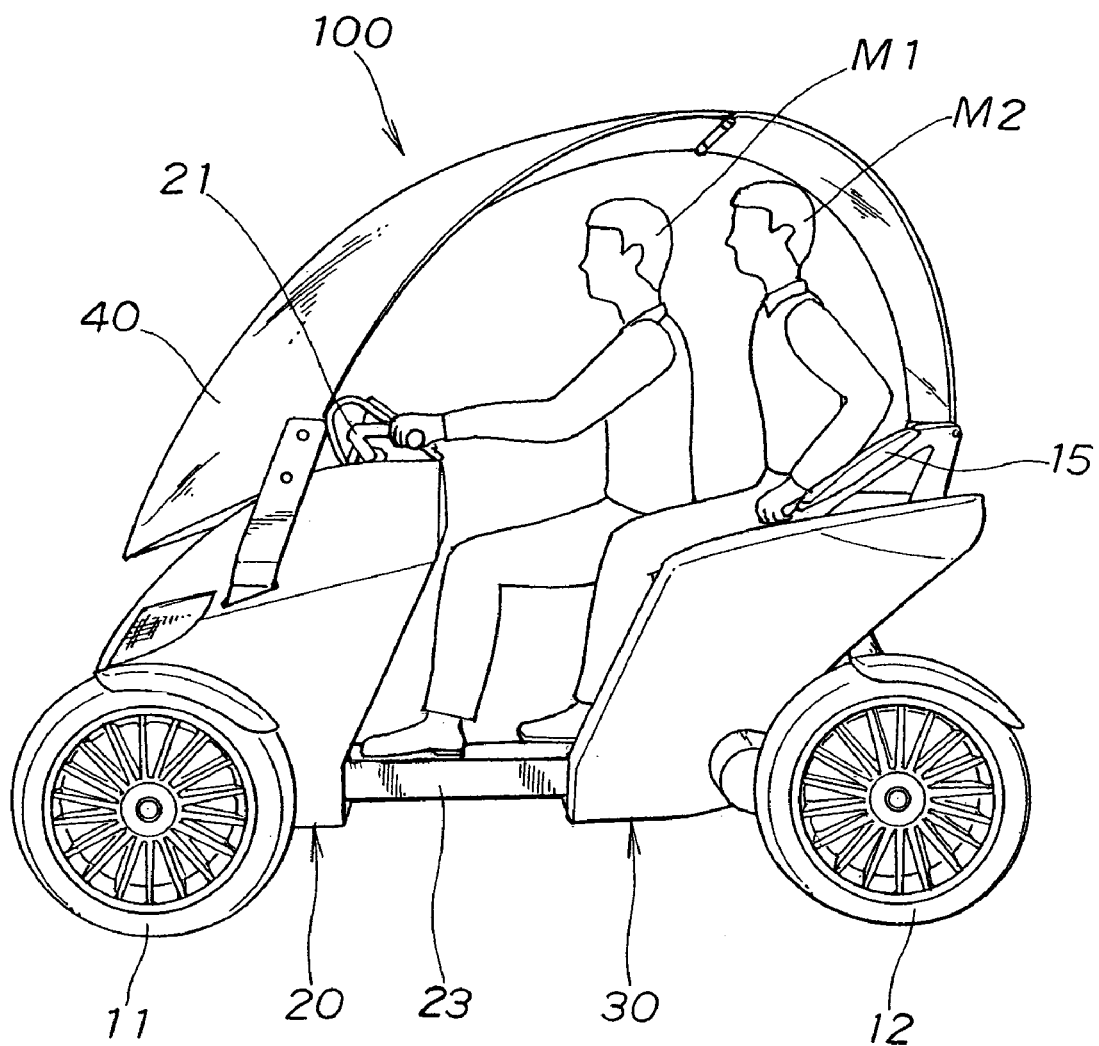
FIG. 45 is a left side elevation of the vehicle of FIG. 44.

Referring to FIG. 44 and FIG. 45, the roofed contractible vehicle 100 is shown traveling with a driver M1 sitting on the driver's seat 35a and resting his or her feet on guide rails 23 and with a passenger M2 sitting on a rear seat 35b and resting his or her feet on rear passenger steps 14.

Figure 46:
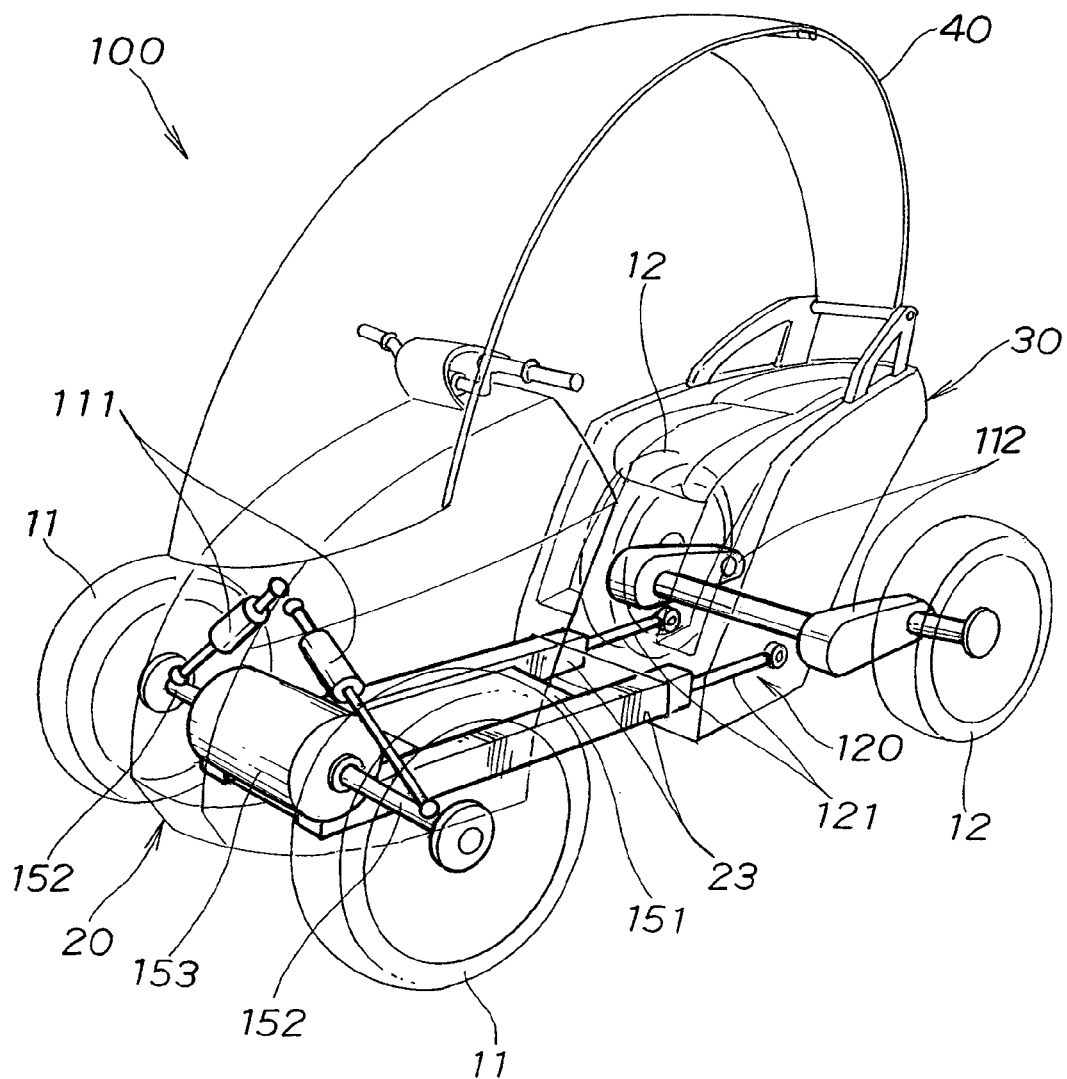
FIG. 46 is a perspective view of the vehicle of FIG. 40 transparent for the purpose of showing inner components including front and rear suspensions, a frame shifter and an electric motor.
Figure 47:
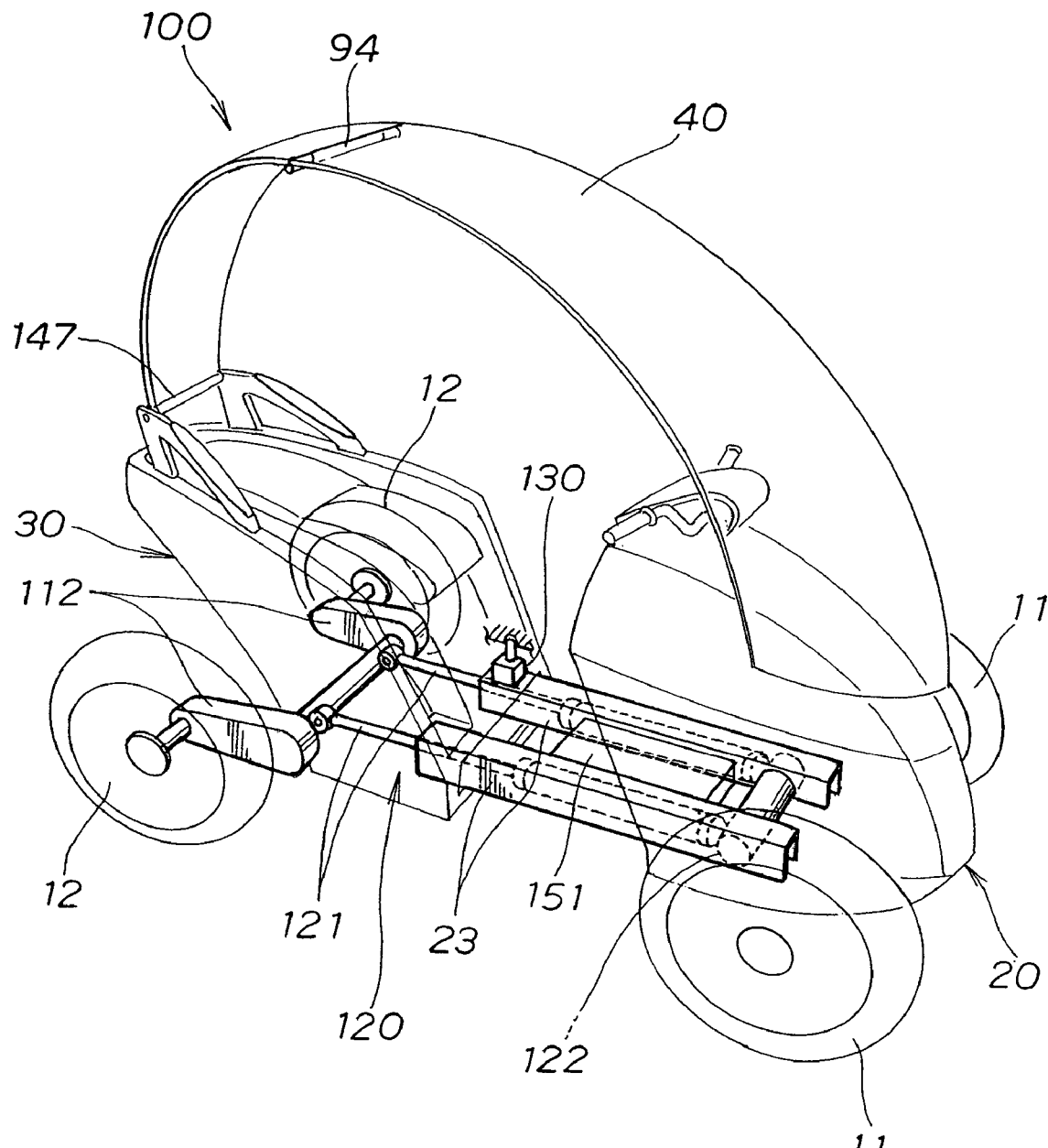
FIG. 47 is another perspective view of the vehicle of FIG. 40 transparent for the purpose of showing the rear suspension and the frame shifter.

Referring to FIG. 46 and FIG. 47, the front frame 20 has front suspensions 111, 111 disposed between right and left front wheels 11, 11 while the rear frame 30 has rear suspensions 112, 112 disposed between right and left rear wheels 12, 12.

The roofed contractible vehicle 100 is a front-wheel drive vehicle having a frame shifter 120 for moving the rear frame 30 in a front-and-rear direction of the vehicle 100, a slide locking device 130 for preventing the movement of the rear frame 30, a battery box 151 disposed between the right and left guide rails 23, 23, and an electric motor 153 disposed concentrically with front wheel axles 152, 152. With the battery box 151 disposed between the right and left guide rails 23, 23, the vehicle 100 can provide its lowered center of gravity. The electric motor 153 drives the front wheels 11, 11 via the front wheel axles 152, 152. The battery box 151 is a container housing therein a battery for supplying electric power to the electric motor 153. The electric motor 153 may be replaced with an engine to serve as a motive power source for driving the vehicle 100 to travel. Because the motor 153 and battery 153 of large weight are provided at a front side of the vehicle 10, it becomes possible to facilitate moving the rear frame 30 back and forth for extension and contraction of the vehicle 100.

The frame shifter 120 includes a pair of right and left hydraulic cylinders 121, 121 and a reserve tank 122 for the cylinders 121, 121. Each of the right and left hydraulic cylinders 121, 121 has its one end mounted to the front frame 20. The other end of each cylinder 121 is mounted to the rear frame 30. The slide locking device 130 includes a solenoid for locking the rear frame 30 in position when the roofed contractible vehicle 100 is in the extended state where the driver can sit on the driver's seat to drive the vehicle 100.

Figure 48:
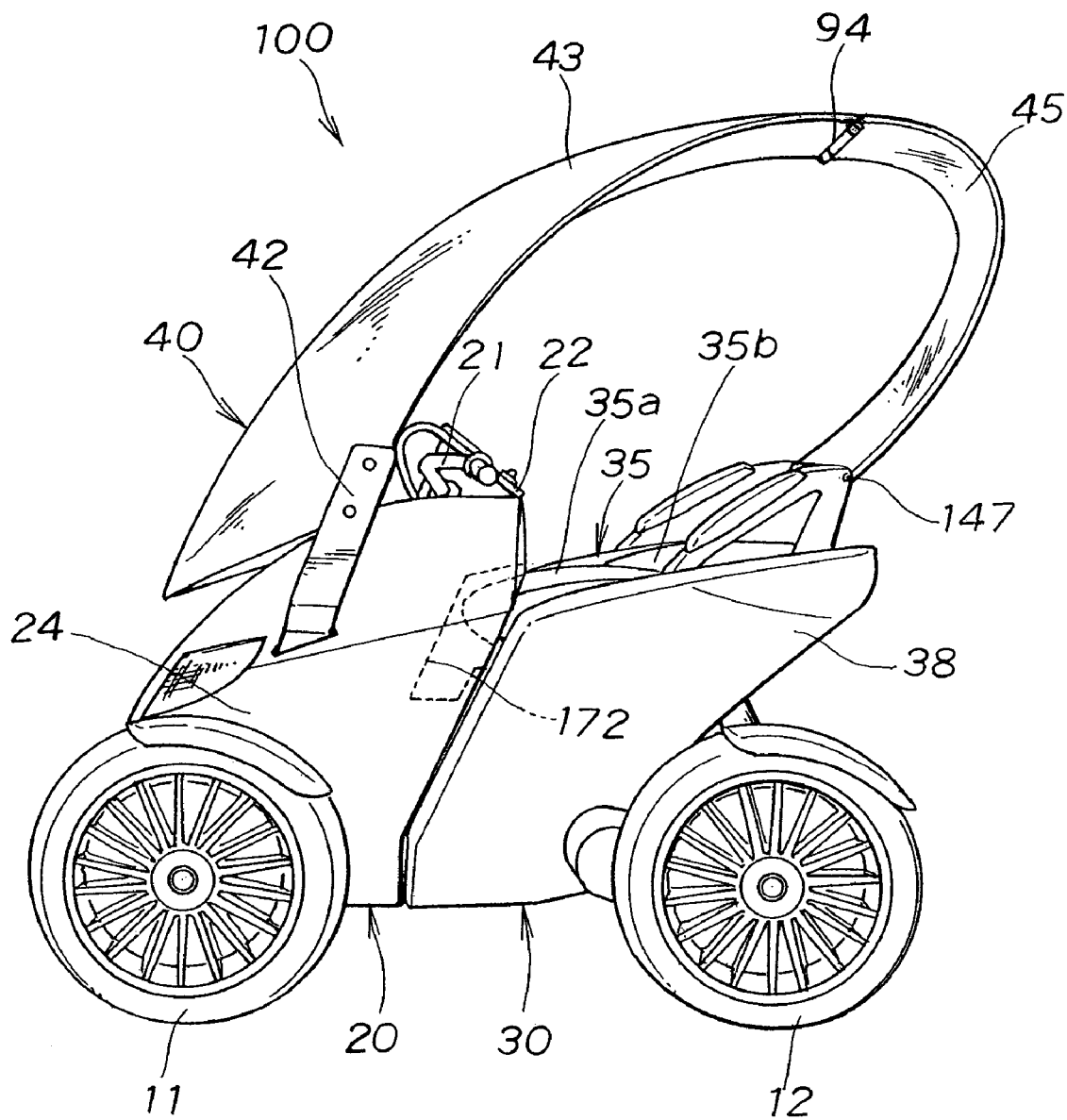
FIG. 48 is a side elevation view of the vehicle of FIG. 40 in a contracted state.

As shown in FIG. 47, when the roofed contractible vehicle 100 is in the extended state, the slide locking device 130 is locked. To contract the roofed contractible vehicle 100, the rear frame sliding operation switch 104 (See FIG. 43) is operated to unlock the slide locking device 130 and shorten the hydraulic cylinders 121, 121. This causes the rear frame 30 to move forwardly or towards the front frame 20. The forward movement of the rear frame 30 causes the roof 40 to be bent on the second and third hinges 94, 147 into a more convexly curved state. This enables the roofed contractible vehicle 100 to be contracted as shown in FIG. 48. Use of the actuator makes it possible to contract and extend the vehicle 100 less troublesomely without requiring human power. The thus arranged vehicle 100 is very easy to contract and extend.

As is clear from the above description, the roofed contractible vehicle 100 in the fifth embodiment has the driver's seat 35a movable in the front-and-rear direction and the roof 40 movable between convexly and more convexly curved states in response to the movement of the driver's seat 35a.

Figure 49:
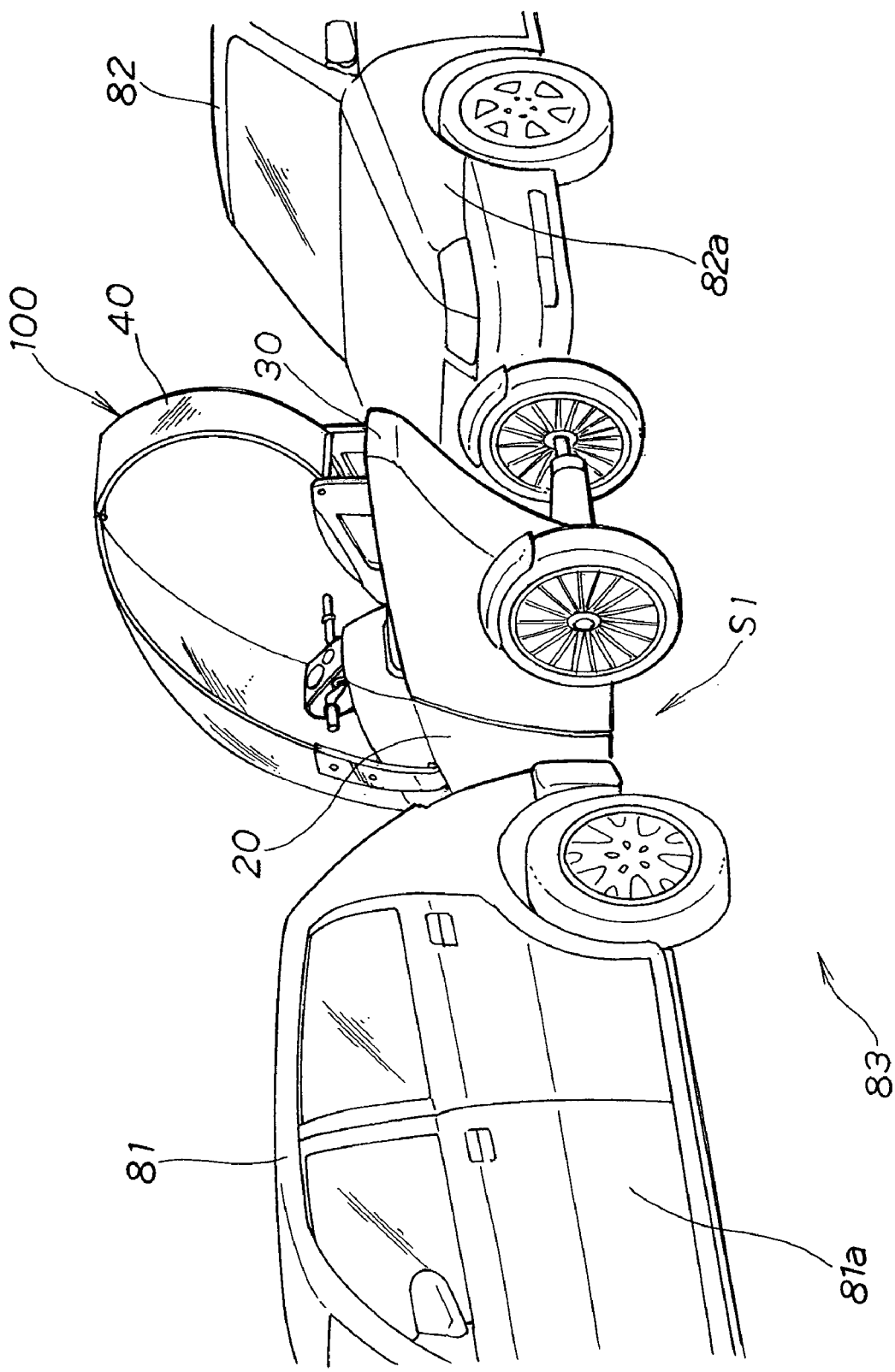
FIG. 49 illustrates the vehicle of FIG. 40 parked in a space provided between vehicles parked in tandem.

Reference is made to FIG. 49. When vehicles 81, 82 parked in tandem are spaced from each other by a distance slightly larger than the width of the roofed contractible vehicle 100 to thereby provide a free space S1, the roofed contractible vehicle 100 may be parked in the space S1 as follows.

First, the roofed contractible vehicle 100 travels in a direction perpendicular to a longitudinal direction of the vehicles 81, 82 for entry into the space S1. The vehicle 100 is then parked in orientation transverse with respect to the longitudinal direction of the vehicles 81, 82. Secondly, the driver and the passenger get off the vehicle 100 and then the roofed contractible vehicle 100 is contracted. In such a contracted state, the roofed contractible vehicle 100 has no portion positioned more closely to the center of a road 83 than sides 81a, 82a of the vehicles 81, 82. In other words, the contracted vehicle 100 is parked within the space S1 without projecting towards the center of the road 83 through the plane in which the sides 81a, 82a lie.

As is apparent from the foregoing description, the roofed contractible vehicle 100 according to the fifth embodiment of the present invention includes the driver's seat 35a to be taken by the driver M1, and the roof 40 disposed above the driver's seat 35a. The driver's seat is movable in the front-and-rear direction of the vehicle 100. The roof 40 is movable between convexly and more convexly curved states in response to the movement of the seat 35a in the front-and-rear direction of the vehicle 100.

When the seat 35a moves in the front-and-rear direction of the vehicle 100, the roof 40 disposed above the seat 35a is brought to the convexly curved state or the more convexly curved state. Thus, the vehicle can be easily contracted and extended upon the forward and rearward movement of the rear frame 30. In other words, the vehicle 100 can be contracted into the smaller entire length, if desired. The thus arranged vehicle 100 can be easily parked even in a smaller space.

Provision of the hinges 94, 147 enables the roof 40 to be brought into the convexly or more convexly curved state when the seat 35a moves in the front-and-rear direction of the vehicle 100.

Further, the vehicle 100 in the fifth embodiment includes a steering mechanism having the bar handle 21, the right and left wheels 11, 11 provided at a front part thereof, the right and left wheels 12, 12 provided at a rear part thereof, a rear passenger seat 35b disposed between the right and left wheels 12, 12 and behind the driver's seat 35a. The rear passenger seat 35b faces forwardly of the vehicle 100.

Referring to FIG. 50 to FIG. 56, there is shown a roofed contractible four-wheeled vehicle 200 according to a sixth embodiment of the present invention. The same components of the vehicle 200 as those of the vehicle 10 in the fourth embodiment are denoted by the same reference numerals and their descriptions will be omitted.

Figure 50:
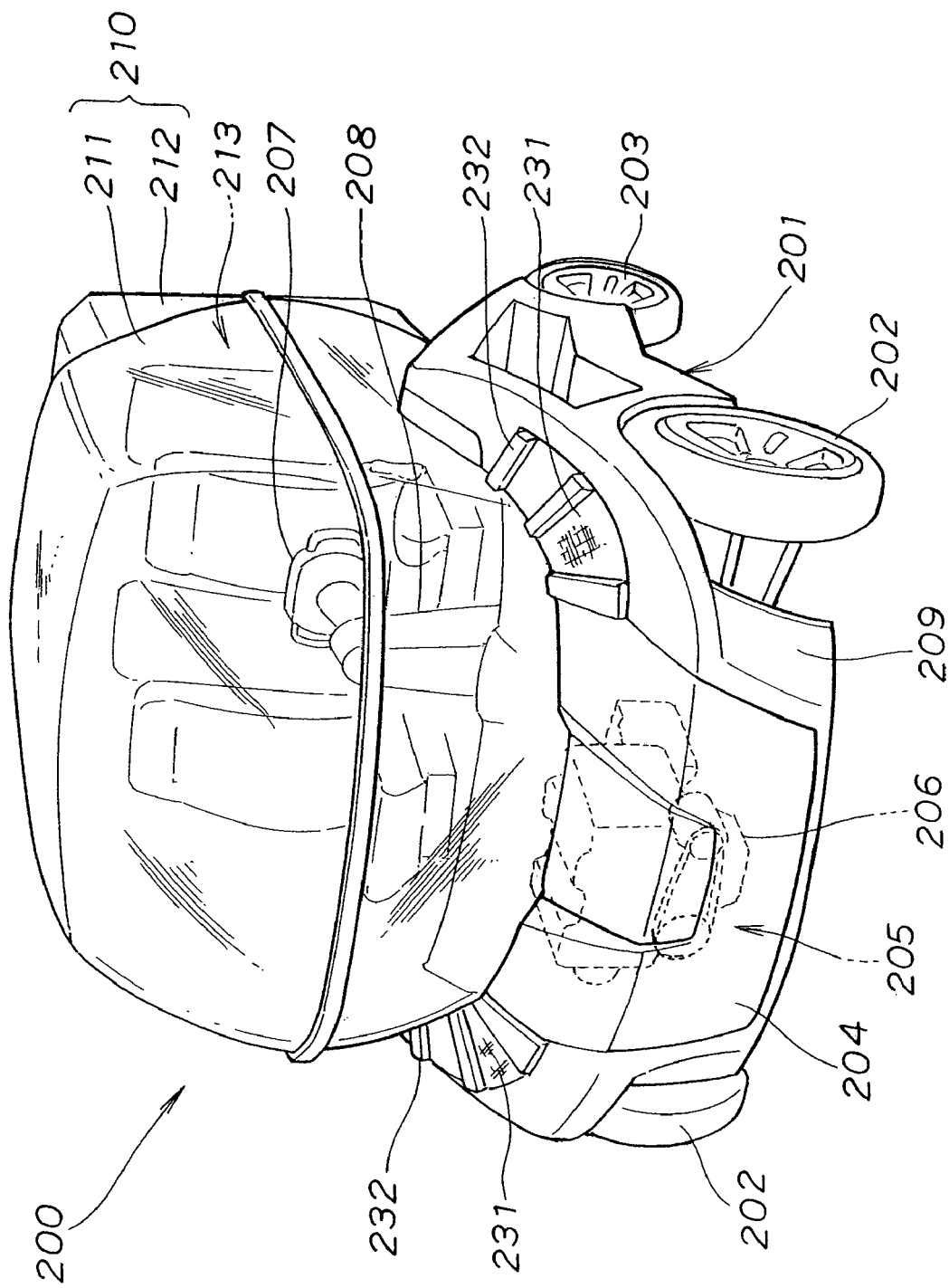
FIG. 50 is a perspective view of a roofed contractible four-wheeled vehicle according to a sixth embodiment of the present invention.
Figure 51:
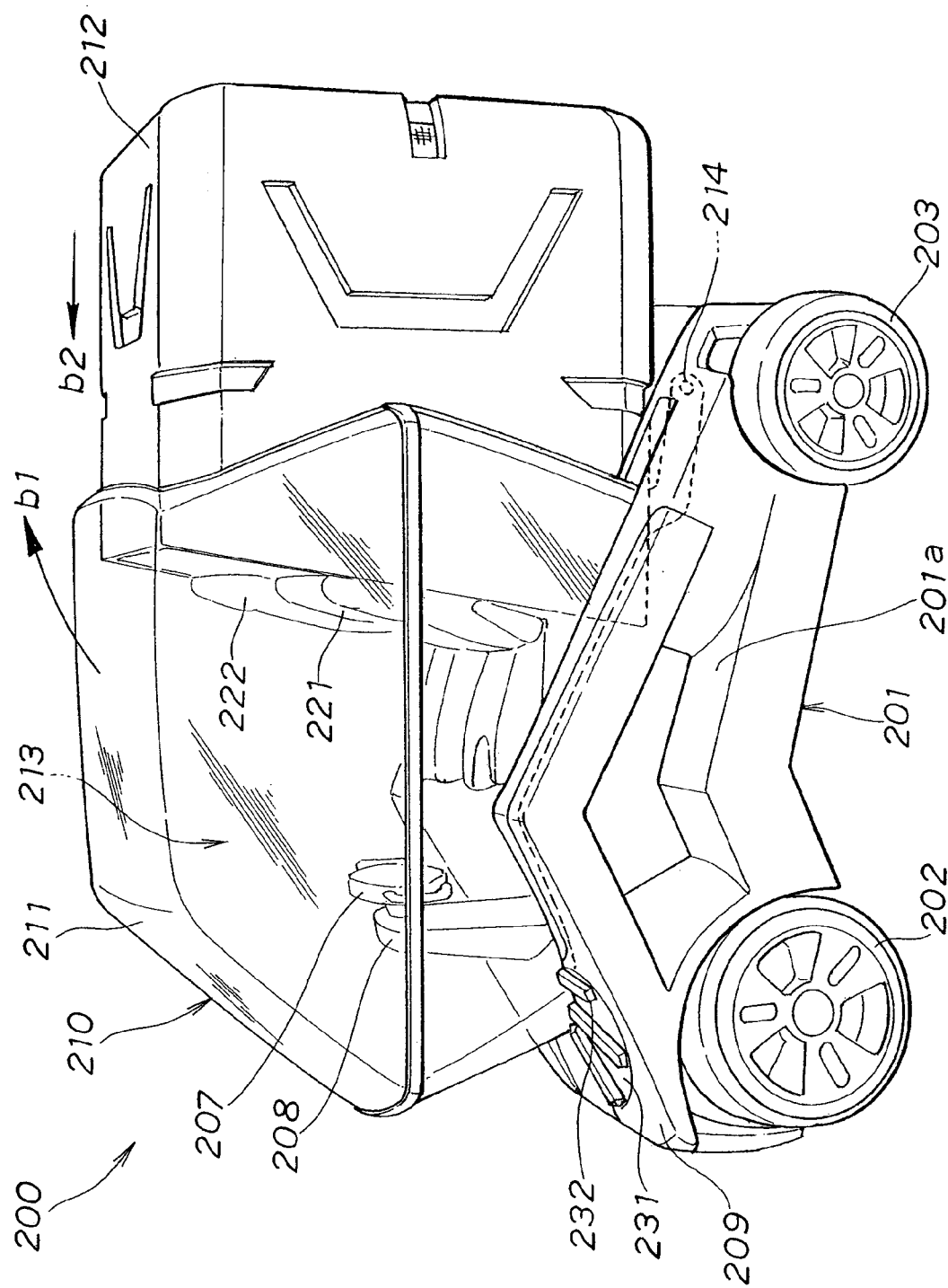
FIG. 51 is a left side elevation view of the vehicle of FIG. 50.
Figure 52:
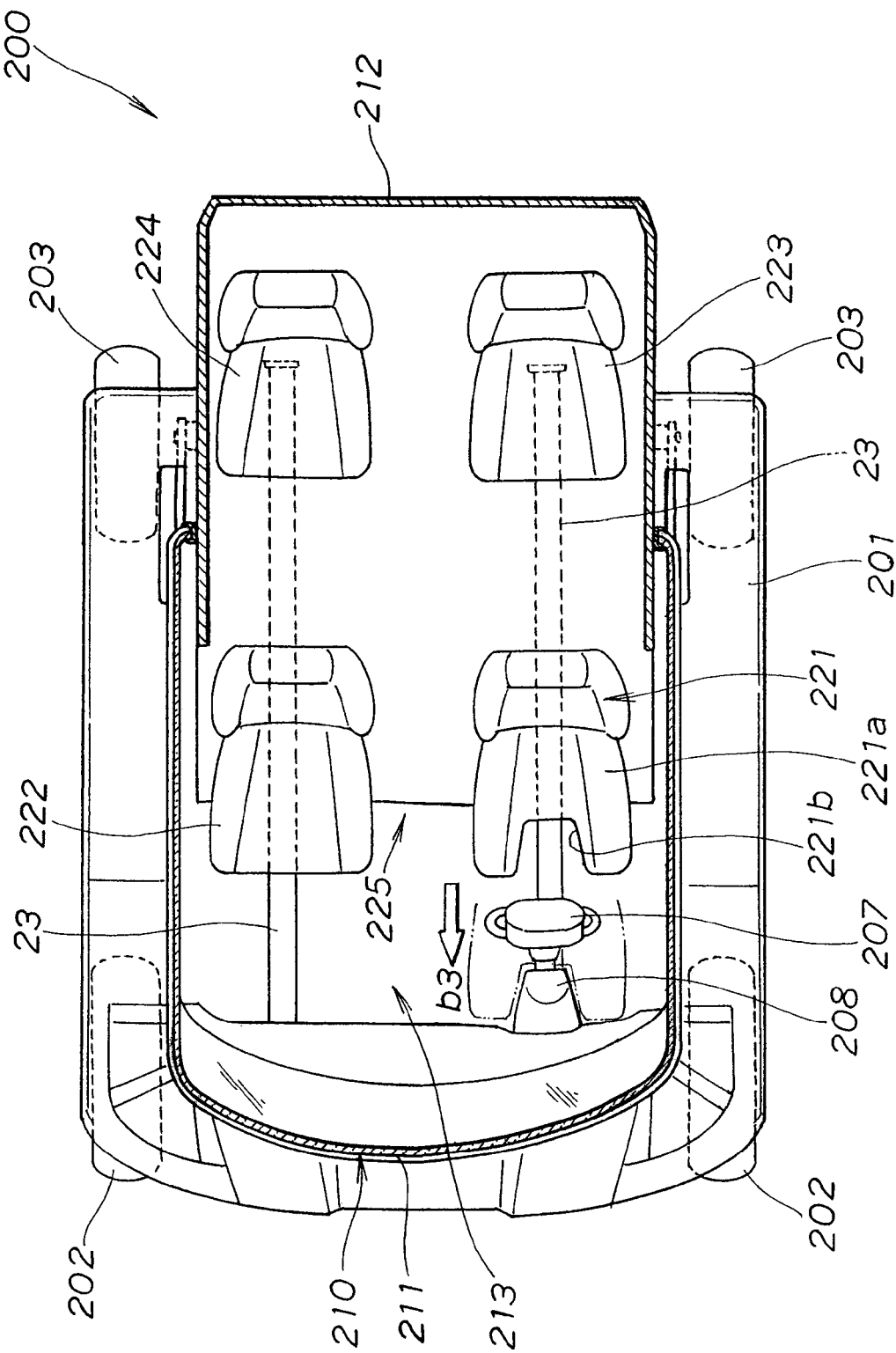
FIG. 52 illustrates partly in cross-section the vehicle of FIG. 50 as viewed in top plan.

As shown in FIG. 50 to FIG. 52, the roofed contractible vehicle 200 is a four-seater, front-wheel-drive four-wheeled one. The vehicle 200 includes a vehicle body frame (a vehicle body) 201 and a roof 210 positioned above the frame 201. The frame 201 and the roof 210 jointly define a space therebetween for use as a passenger compartment (cabin) 213. The compartment 213 is variable in size to thereby change the overall length of the vehicle. The roofed contractible vehicle 200 has its constant wheelbase regardless of the variable overall length of the vehicle 200.

The vehicle body frame 201 has two, or front and rear wheels 202, 203 provided at a right side thereof, and two, or front and rear wheels 202, 203 provided at a left side thereof. The frame 201 has an engine compartment 205 formed in a front part thereof. The engine compartment 205 is opened or closed by a hood (a bonnet) 204. The compartment 205 has an engine 206 disposed therein. The frame 201 has a steering handle 207 and a steering column unit 208 disposed at an upper portion of the front part thereof. The frame 201 is enclosed with a cover 209.

The roof 210 is composed of two members, or front and rear roofs 211, 212. More specifically, the front roof 211 is pivotably mounted to the front part of the vehicle body frame 201. The rear roof 212 is mounted to a rear part of the vehicle body frame 201. The rear roof 212 is sidable in a front-and-rear direction of the vehicle 200. The front roof 211 is a first box-shaped member opened downward and rearward. The vehicle body has a pivot shaft or hinge 214 provided at the rear part thereof. The front roof 211 is supported by the shaft 214 such that the former is pivotable upwardly and rearwardly on the latter, as shown by an arrow b1 of FIG. 51. The rear roof 212 is a second box-shaped member opened forwardly. The rear roof 21 is forwardly slidable or movable into the front roof 211, as shown by an arrow b2 of FIG. 51. Namely, the roof 210 has the front roof 211 and the rear roof 212 capable of fitting into the front roof 211. The rear roof 212 is slidable with respect to the vehicle body frame 201. The thus arranged roof 210 protects the passenger compartment from rain or the like regardless of the movement of the rear roof 212. The front roof 211 is made from transparent or semitransparent material to ensure that a driver views the outside of the vehicle 200, driving the vehicle 200.

The passenger compartment 213 has two or right and left seats (a passenger seat 222 and a driver's seat 221 to be taken by a driver) provided at a front side thereof, and two or right and left seats 223, 224 provided at a rear side thereof. The seats 223, 224 are referred to as "rear seats 223, 224". The roof 210 is disposed above the driver's seat 221. The driver's seat 221 and the passenger seat 222 have a passage 225 formed therebetween, as best shown in FIG. 52. By passing through the passage 225, passengers can move to the rear seats 223, 224. Provision of the rear seats 223, 224 allows the roofed contractible vehicle 200 to seat the increased number of passengers.

The engine 206 may be replaced with an electric motor to serve as a motive power source for driving the vehicle 200 to travel. In FIG. 50 and FIG. 51, reference numerals 231, 231 denote headlamps, and 232, 232 direction indicators.

Figure 53:
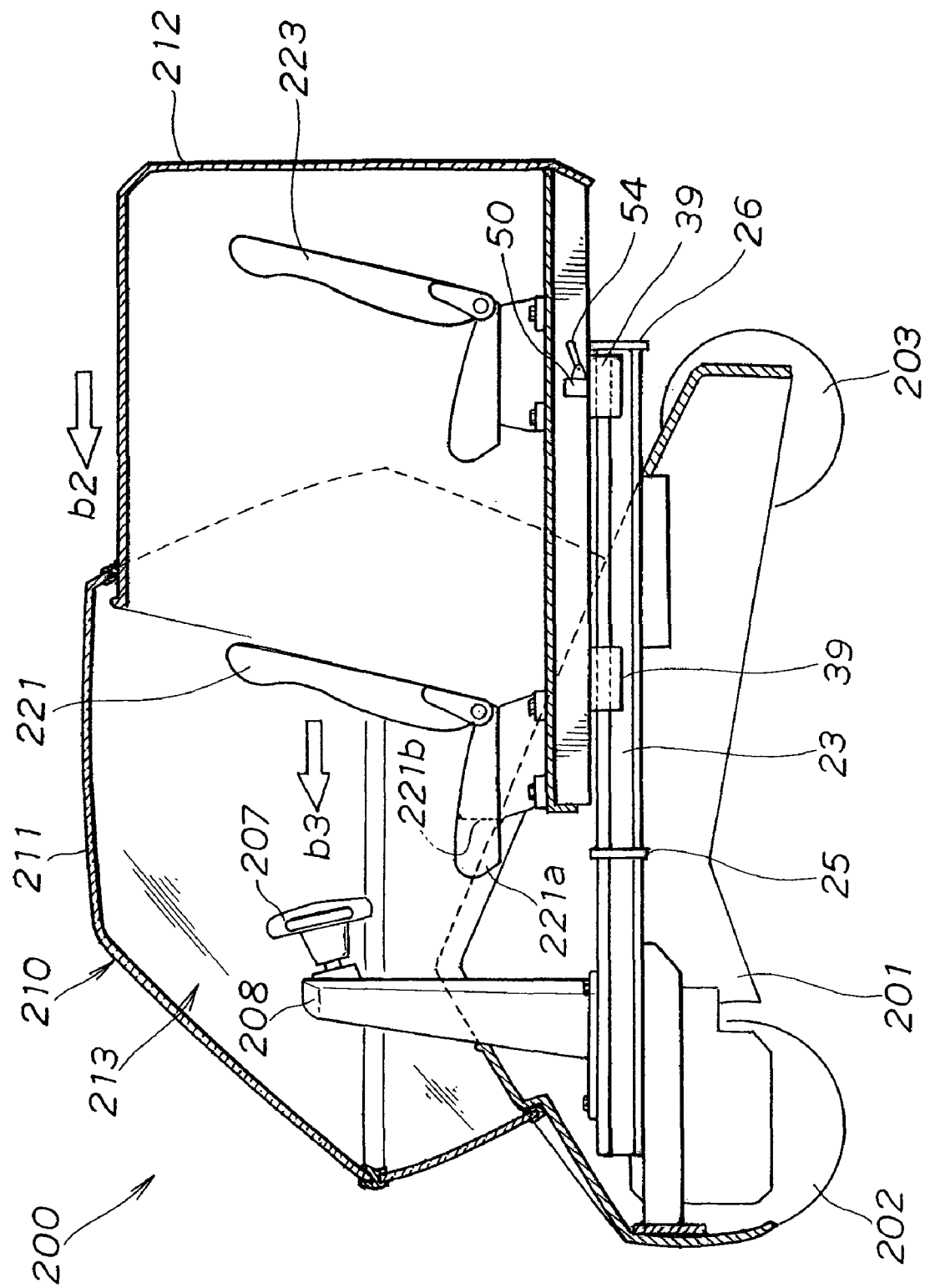
FIG. 53 is a cross-sectional view of the vehicle of FIG. 50 as viewed in left side elevation.

As shown in FIG. 52 and FIG. 53, the vehicle body frame 201 includes its lower part having a pair of right and left guide rails 23, 23 extending in the front-and-rear direction of the vehicle 200. The rear roof 212 includes a floor having the right and left front seats 222, 221 (or passenger seat 222 and the driver's seat 221) and the right and left rear seats 223, 224 secured thereon. The rear roof 212 is mounted on the guide rails 23, 23 in such a manner that the former is movable in the front-and-rear direction of the vehicle 200 into and out of the front roof 211. This movement of the rear roof 212 enables the front seats 221, 222 and the rear seats 223, 224 to move in the front-and-rear direction of the vehicle 200.

The right and left guide rails 23, 23 have front stoppers 25 provided at front sides thereof, and rear stoppers 26 provided at rear ends thereof. The rear roof 212 has at its lower parts four sliders 39. Of these four sliders, the two ones are mounted on the right guide rail 23 and are disposed one behind the other. The other two sliders are mounted on the left guide rail 23 and disposed one behind the other. The two sliders mounted on each guide rail 23 are referred to as "front and rear sliders". One of the rear sliders mounted on the right and left guide rails 23, 23 has a slide locking device 50.

The guide rails and the slide lock device 50 are identical to those as previously described in relation to FIG. 32 and FIG. 33, and hence they will not explained herein.

Figure 54:
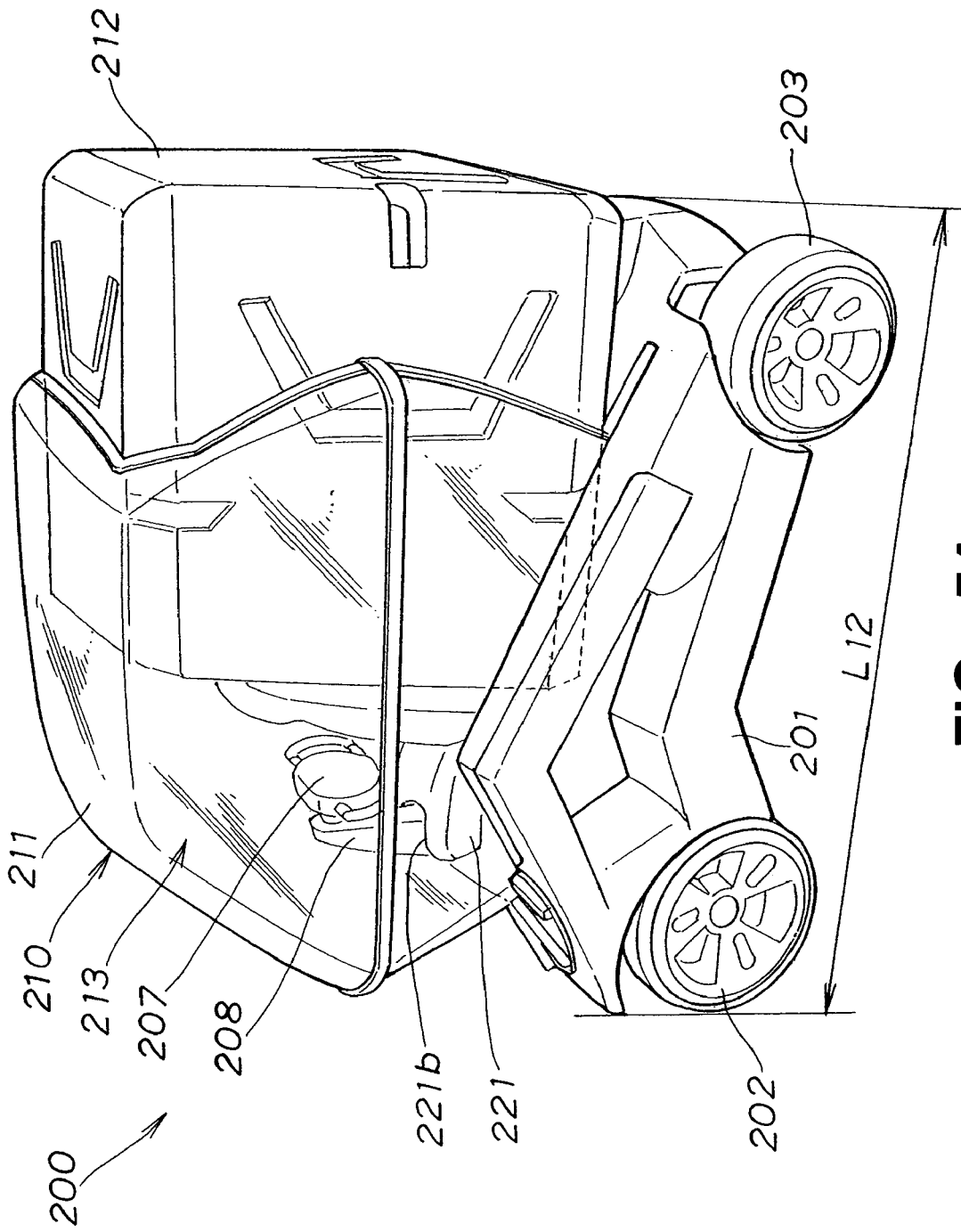
FIG. 54 illustrates the vehicle of FIG. 50 in a contracted state.

Further in FIG. 52 and FIG. 53, when the roofed contractible vehicle 200 is extended into a state where a driver can sit on the driver's seat 221 to drive the vehicle 200, the slide locking device 50 is locked. To contract the roofed contractible vehicle 200, the slide locking device 50 is unlocked with an unlock lever 54 to move the rear roof 212 forwardly into the front roof 211, as shown by an arrow b2 of FIG. 53. The roofed contractible vehicle 200 is thus contracted as shown in FIG. 54. The slide locking device 50 may include a locking mechanism as described in the fourth embodiment.

As is clear from the above description, the roofed contractible vehicle 200 in the sixth embodiment has the driver's seat 221 designed to move in the front-and-rear direction of the vehicle 200, and the roof 210 having the rear roof 212 movable in the same direction as the driver's seat 221 simultaneously with the movement of the driver's seat 221 in the front-and-rear direction of the vehicle 200.

The driver's seat 221 includes a seat cushion 221a having a cut-out portion 221b formed at a front end thereof, as shown in FIG. 52. The cut-out position 221b has a generally U-shaped configuration as viewed in top plan. This arrangement is advantageous in that the seat cushion 221a does not hit the steering column unit 208 when the driver's seat 221 is moved forwardly as shown by an arrow b3.

Figure 55:
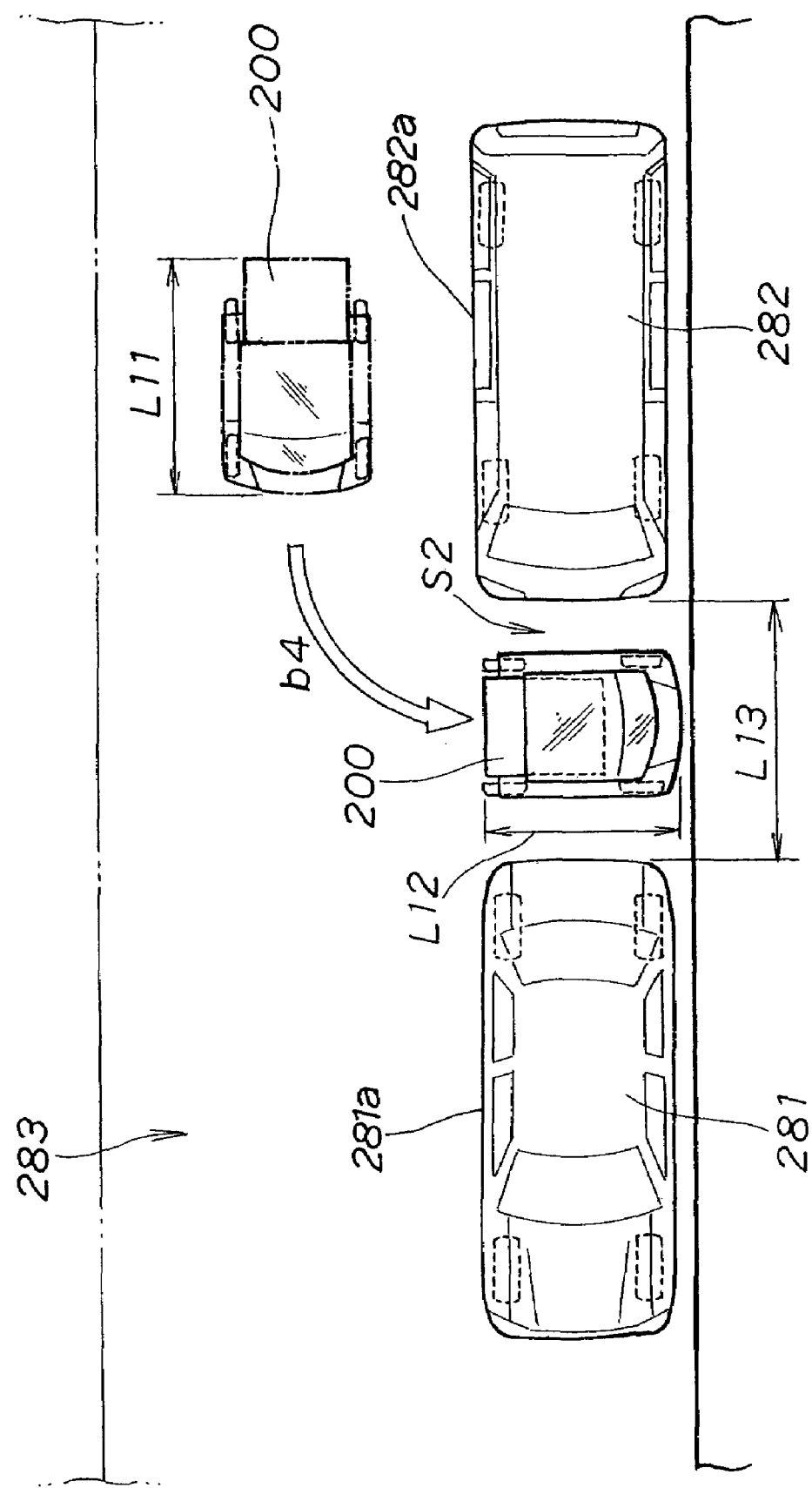
FIG. 55 illustrates how the vehicle of FIG. 50 is parked in a space provided between vehicles parked in tandem.

As shown in FIG. 55, the roofed contractible vehicle 200 has the entire length of L11 when traveling in the extended state as shown by a phantom line. When parked in the contracted state where the vehicle 200 as shown by a solid line, on the other hand, the vehicle 200 has its entire length L12. For example, the entire length L11 is in the order of 2.3 meters and the entire length L12 is in the other of 1.8 meters. The entire length L12 is much smaller than the entire length L11 and is substantially equal to the widths of an automobile, for example.

When vehicles 281, 282 parked in tandem are spaced from each other by a distance L13 slightly larger than the width of the vehicle 200 to thereby provide a free space S2, the roofed contractible vehicle 200 may be parked in the space S2 as follows.

First, the roofed contractible vehicle 200 shown by the phantom line is turned as shown by an arrow b4 to move in a direction perpendicular to a longitudinal direction of the vehicles 281, 282 for the purpose of entry into the space S2. Secondly, the vehicle 200 is parked in orientation transverse with respect to the longitudinal direction of the vehicles 281, 282. The driver gets off the vehicle 200, after which the vehicle 200 is contracted. This is advantageous in that the vehicle 200 in the contracted state has no portion positioned more closely to the center of a road 283 than sides 281a, 282a of the other vehicles 281, 282. In other words, the vehicle 200 in the contracted state is parked within the space S2 without projecting towards the center of the road 283 through the plane in which the sides 281a, 282a lie.

Figure 56:
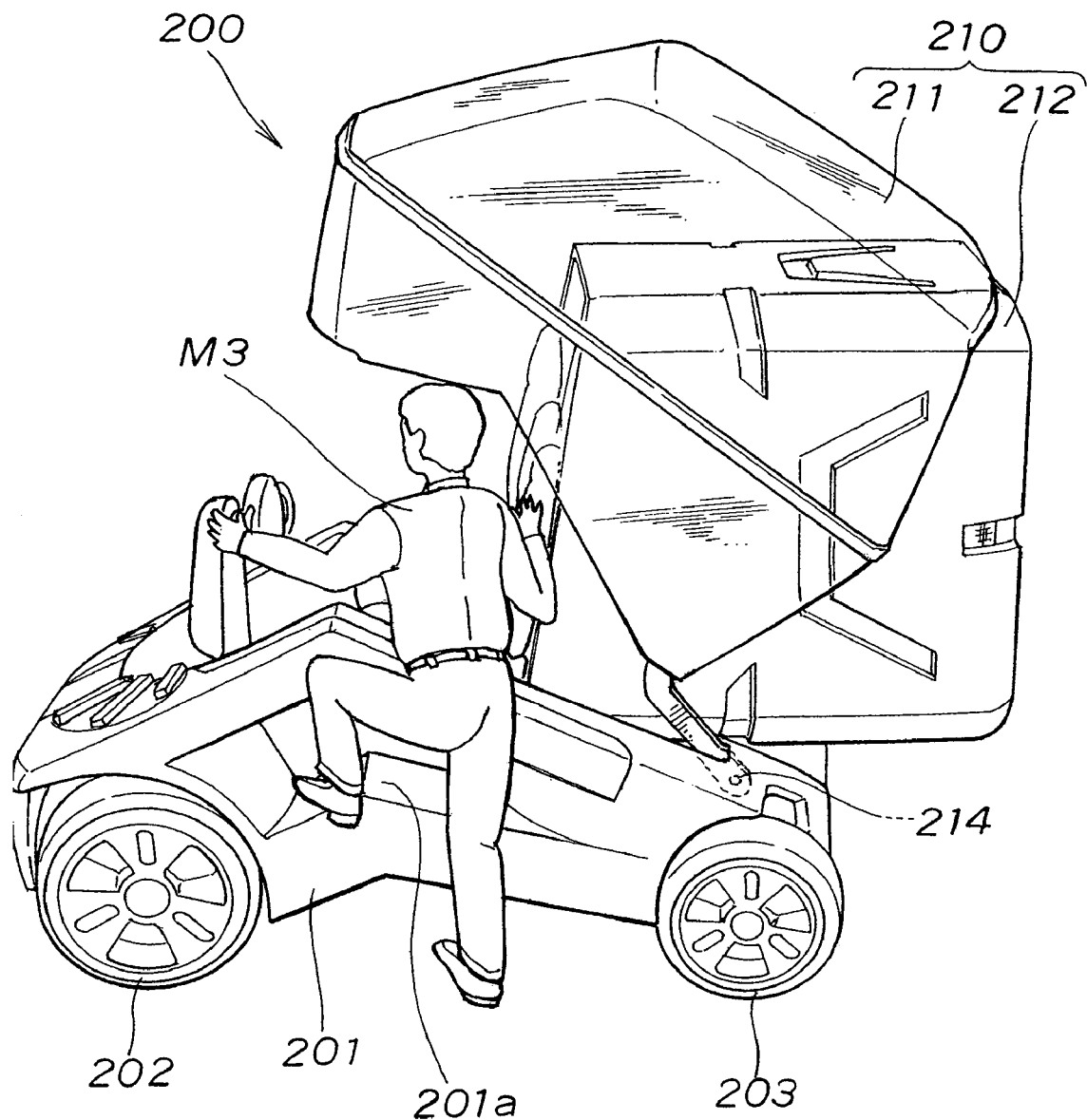
FIG. 56 illustrates the vehicle having a front roof pivoted to allow a passenger to get on or off the vehicle.

As shown in FIG. 56, with the front roof 211 pivoted rearwardly and upwardly, the vehicle 200 has its front, and right and left sides opened. Under such a condition, a passenger M3 can pass through the opened front, right or rear side to get on or off the roofed contractible vehicle 200. With this arrangement, when getting off the vehicle 200, the passenger M3 can pass through the opened front side directly onto a sidewalk. The vehicle 200 has a recessed portion 201a provided either one or both of right and left sides thereof. When getting on or off the vehicle 200, the passenger M3 can pass through the opened right or left side with his or her foot rested on the recessed portion 201a As discussed above, the roofed contractible four-wheeled vehicle 200 includes the driver's seat 221 to be taken by the driver, and the roof 210 positioned above the driver's seat 221. The driver's seat 221 is movable in the front-and-rear direction of the vehicle. The roof 210 has the rear roof 212 movable in the same direction as the driver's seat 221 in response to the movement of the driver's seat 221 in the front-and-rear direction of the vehicle 200.

The movement of the driver's seat 221 in the front-and-rear direction of the vehicle 200 causes the rear roof 212 of the roof 210 positioned above the driver's seat 221 to move in the front-and-rear direction of the vehicle 200. This enables the vehicle 200 to extend and contract easily. Accordingly, the vehicle 200 can contract into the reduced overall length, if desired. It thus becomes possible for the vehicle 200 to be parked even in a small space.

The vehicle 200 according to the sixth embodiment of the present invention includes the two roof halves (i.e., the front roof 211 and the rear roof 212 slidable into and out of the front roof 211). This arrangement has the advantage that the roof 210 protects the passenger compartment or cabin 213 from entry of rain thereinto regardless of the movement of the rear roof 212.

The vehicle 200 includes the roof 210 having the first box-shaped member (the front roof) 211 and the second box-shaped member (the rear roof) 212 capable of fitting into the first box-shaped member 211. The first box-shaped member 211 is pivotable rearwardly and upwardly on the shaft 214. Since the vehicle 200 is opened at its front side when the first box-shaped member 211 pivots rearwardly and upwardly, the passenger can enter or exit the passenger compartment by passing through the opened front side readily.

Figure 57:
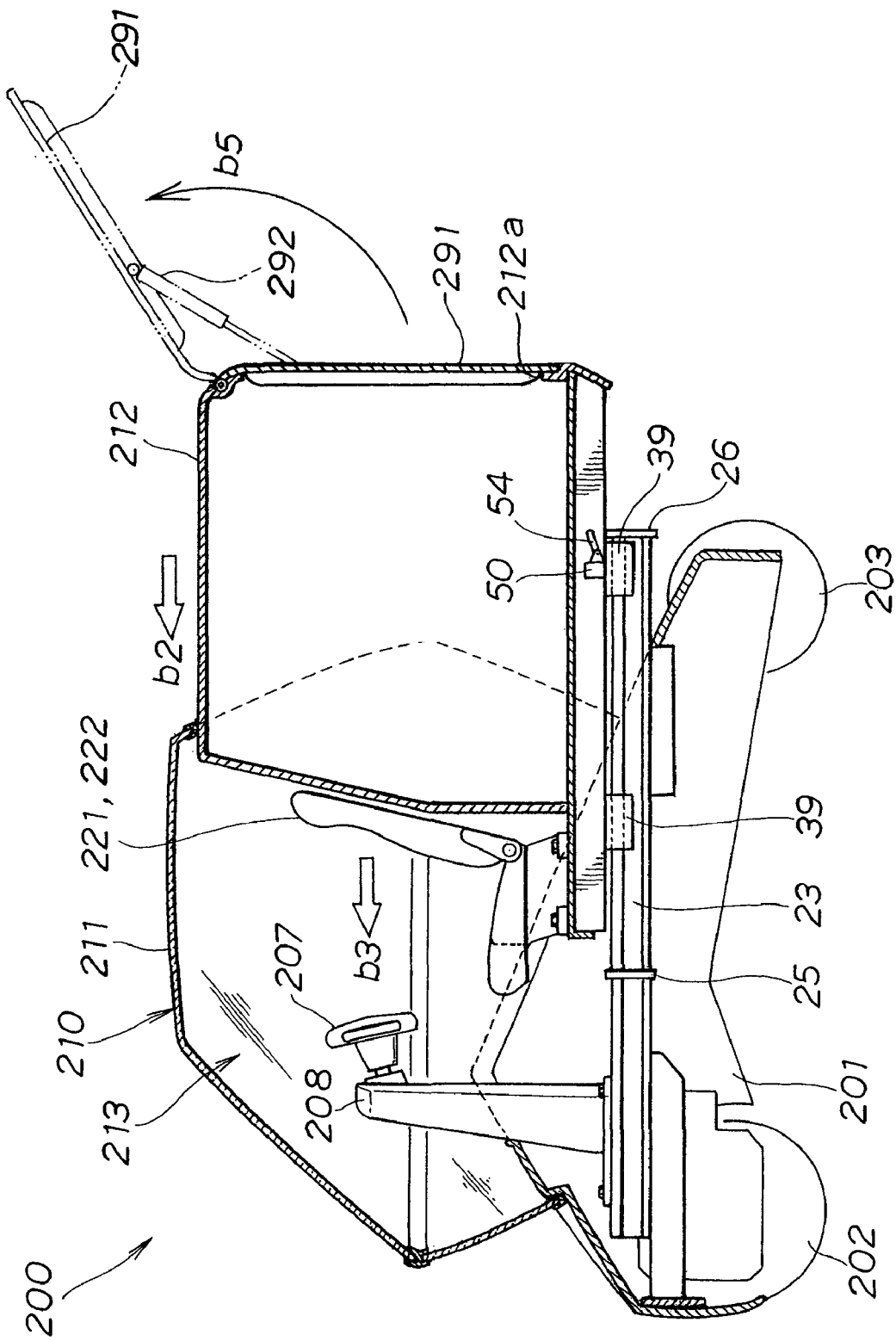
FIG. 57 shows in cross-section a modification of the vehicle of FIG. 50 as viewed in left side elevation.

FIG. 57 illustrates a modification of the rear roof 212 of the roofed contractible vehicle 200 shown in FIG. 51. The modified rear roof 212 is a second box-shaped member opened only rearwardly. In other words, the roof 212 has an opening 212a formed at a rear side thereof. The roof 212 has a tail gate (back door) 291 pivotable between an open position and a closed position. When the tail gate 291 is in the open position, the opening 212a is opened. When the tail gate 291 is in the closed position, on the other hand, the opening 212a is closed. The roof 212 has an open stay 292 for holding the tail gate 291 in the open position.

Upward pivotal movement of the tail gate 291 to the open position as shown by an arrow b5 opens the opening 212a. The modified rear roof 212 has a large space formed therebelow. Such a large space can be used not for accommodating the aforementioned rear seats but for storage purpose. Therefore, it becomes possible to provide the two-seater four-wheeled vehicle including the rear roof 212 having the seats 221, 222 provided only at a front side thereof.

Because the vehicle of FIG. 57 is identical to that of FIG. 50 in other components than the rear roof 212, their descriptions will be omitted.

Referring to FIG. 58 through FIG. 68, there is shown a roofed contractible four-wheeled vehicle 300 according to a seventh embodiment of the present invention. The same components of the vehicle 300 as those in the sixth embodiment are denoted by the same reference numerals and therefore will not be described here.

Figure 58:
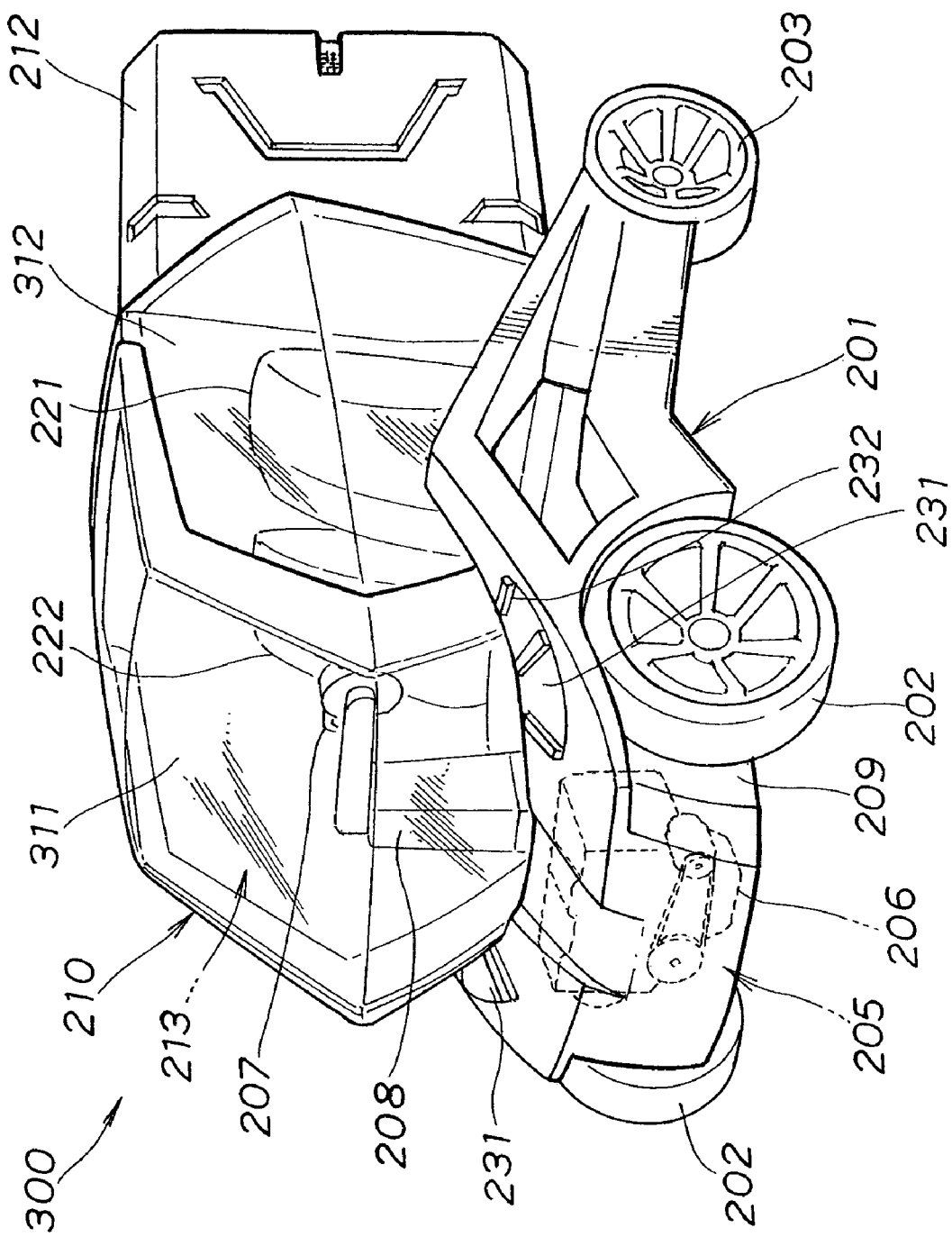
FIG. 58 is a perspective view of a roofed contractible four-wheeled vehicle according to a seventh embodiment of the present invention.
Figure 59:
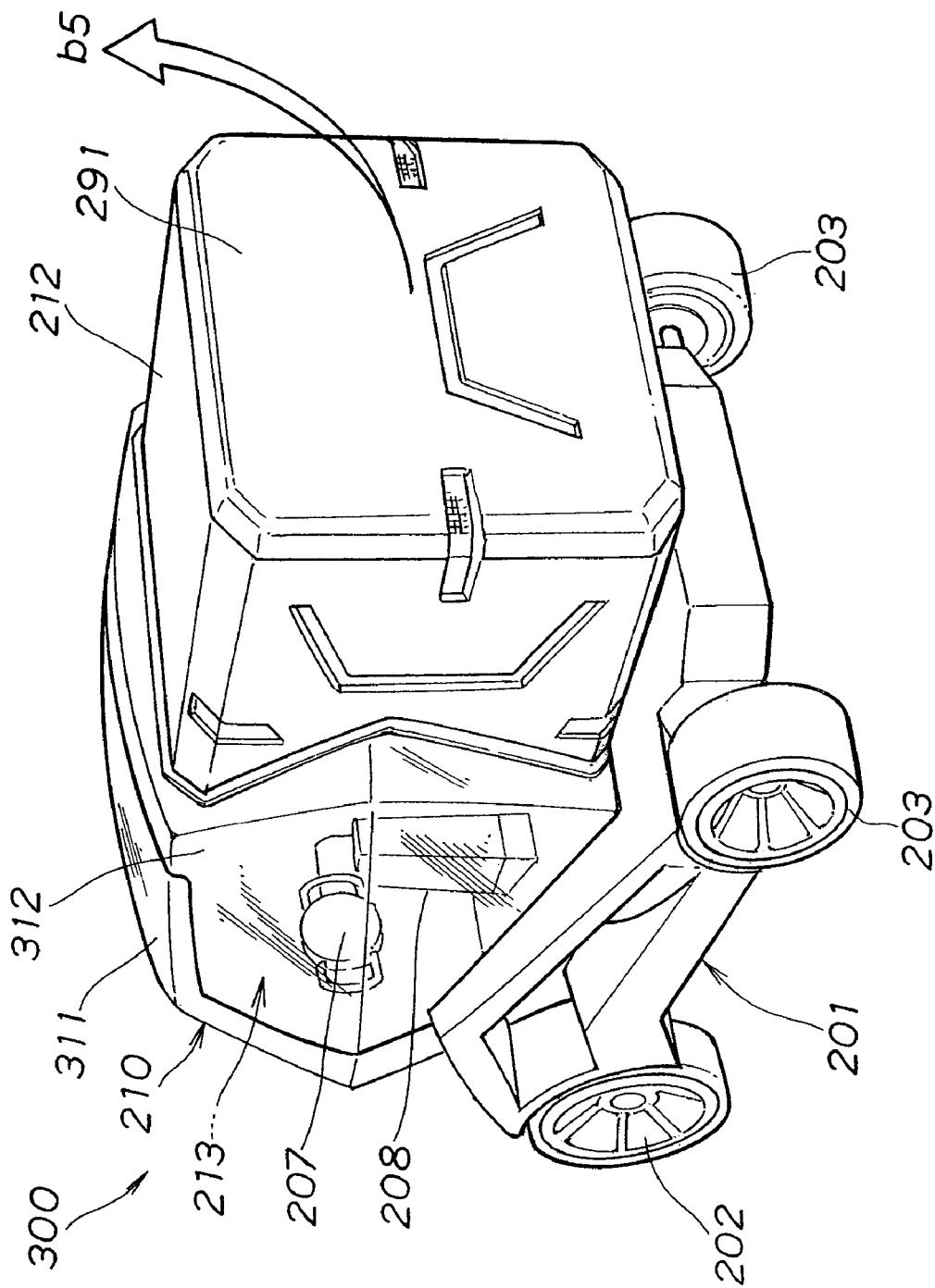
FIG. 59 is another perspective view of the vehicle of FIG. 58, showing especially a rear roof of the vehicle.
Figure 60:
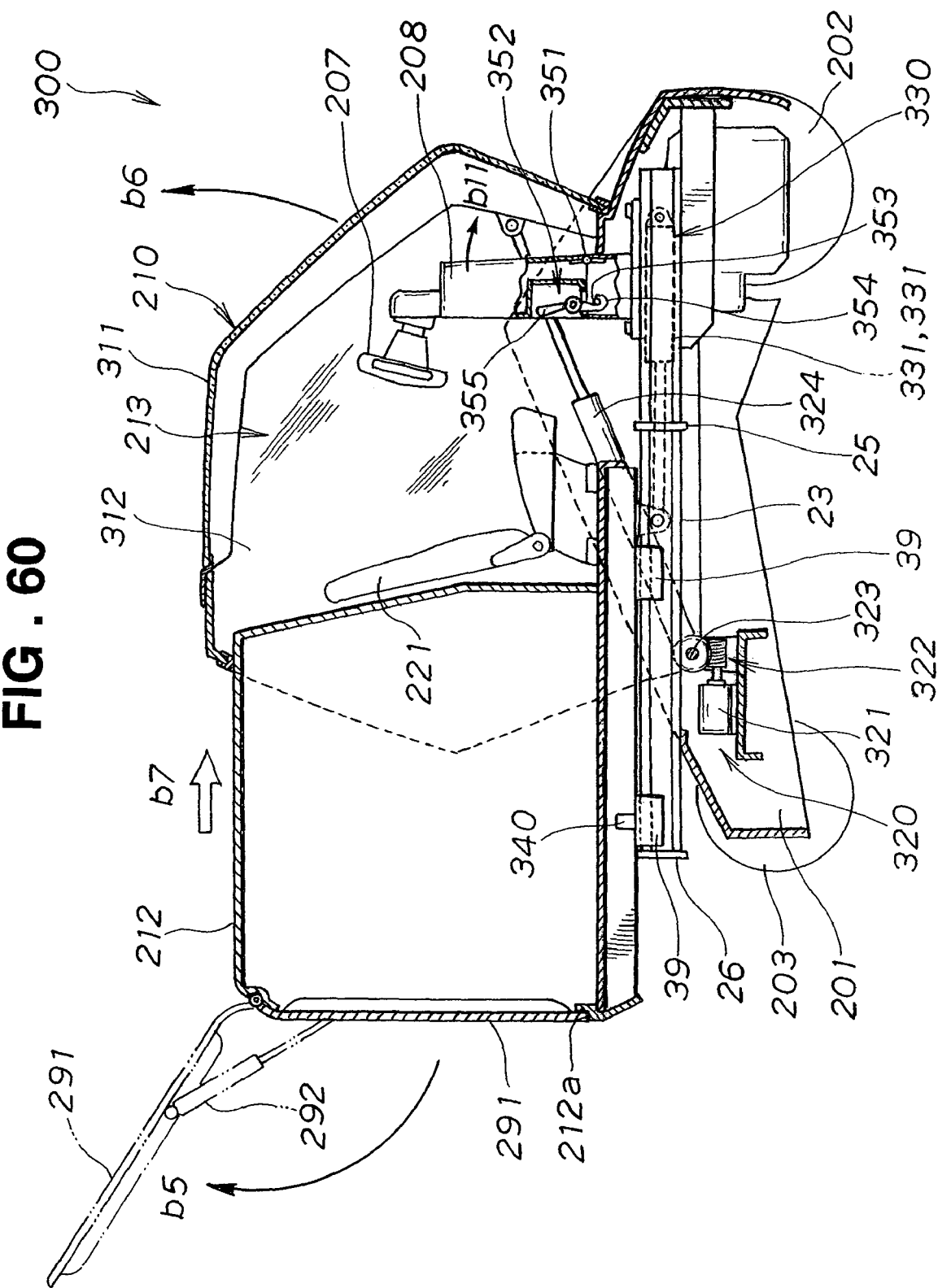
FIG. 60 illustrates in cross-section the vehicle of FIG. 58 as viewed in right side elevation.

As shown in FIG. 58 to FIG. 60, the vehicle 300 is a two-seater four-wheeled one having substantially the same construction as the roofed contractible vehicle 200 in the sixth embodiment.

The vehicle 300 includes a vehicle body frame 201 and a roof 210. The vehicle body frame 201 has a front roof 311 vertically pivotably mounted to a front part thereof, a middle roof 312 mounted to a central part thereof, and a rear roof 212 mounted to a rear part thereof. The rear roof 212 is sidable in a front-and-rear direction of the vehicle 300.

The front roof 311 has its front part positioned in front of a steering handle 207 and a steering column unit 208. The front roof 311 extends upwardly and rearwardly to terminate above a driver' seat 221. The front roof 311 is in the form of a convex curve. The vehicle 300 includes a vehicle body having a pivot shaft 323 provided at a rear part thereof. The front roof 311 is pivotable in a direction of an arrow b6 on the pivot shaft 323. The middle roof 312 is a box-shaped member opened downwardly, forwardly, and rearwardly. The middle roof 312 is secured to the body frame 301. The rear roof 212 is a box-shaped member opened rearwardly, as is the modified rear roof of FIG. 57. The rear roof 212 is sidable or movable into the middle roof 312, as shown by an arrow b7.

The roof 210 has the middle roof 312 and the rear roof 212 movable forwardly for fitting into the middle roof 312. This means that the rear roof 212 is sidable in the front-and-rear direction with respect to the vehicle body frame 201. The front roof 311 is made from transparent or semitransparent material to ensure that a driver views the outside of the vehicle 200, driving the vehicle 200.

The roofed contractible vehicle 300 has a passenger compartment 213. The passenger compartment 213 has two front seats (the driver's seat 221 to be taken by the driver and a passenger seat 222) provided at a front side thereof. These seats are positioned side by side. The vehicle 300 includes the roof 210 disposed above the driver's seat 221.

Figure 61:
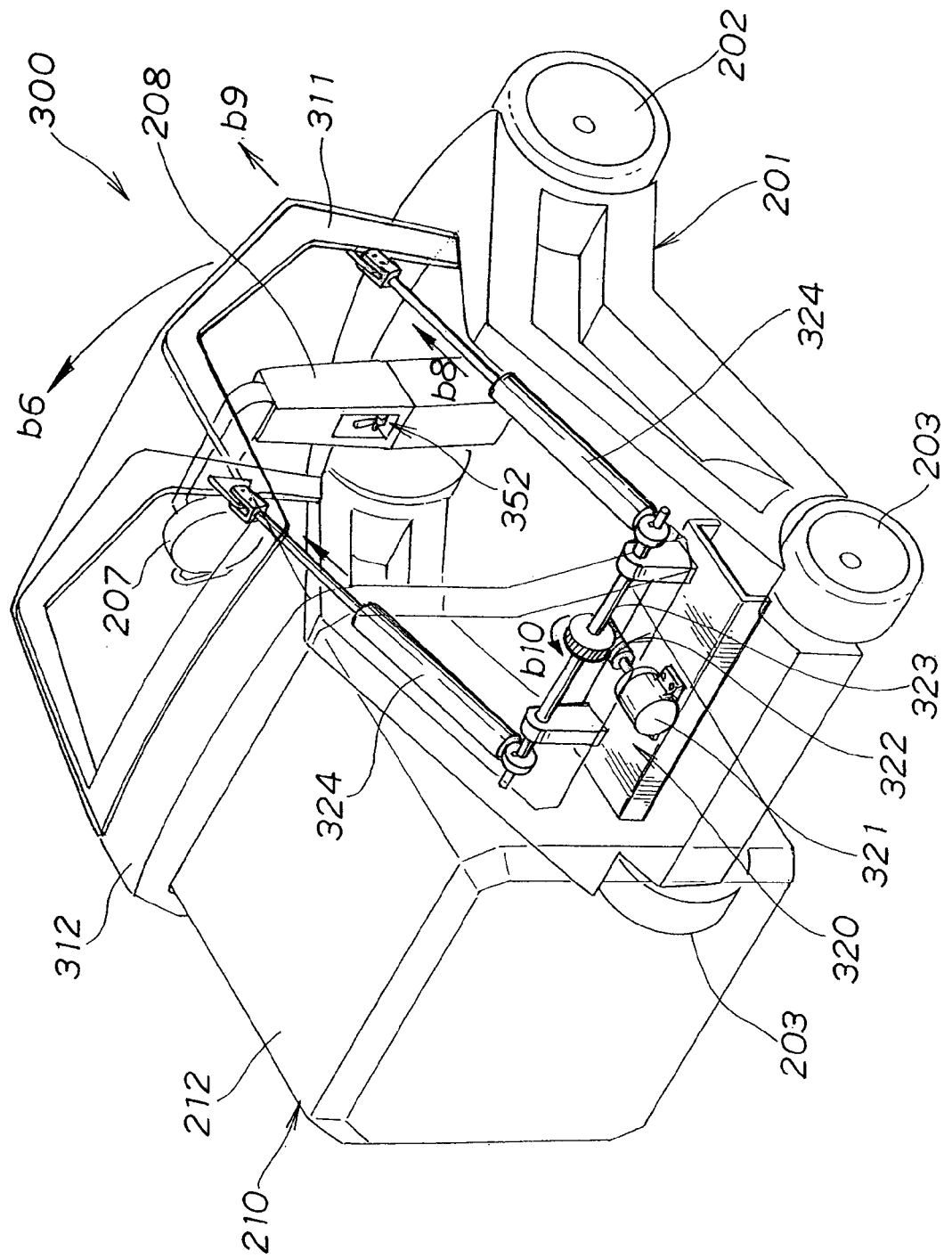
FIG. 61 is another perspective view of the vehicle of FIG. 58 transparent for the purpose of showing a front roof drive device 320 of the vehicle of FIG. 58.
Figure 62:
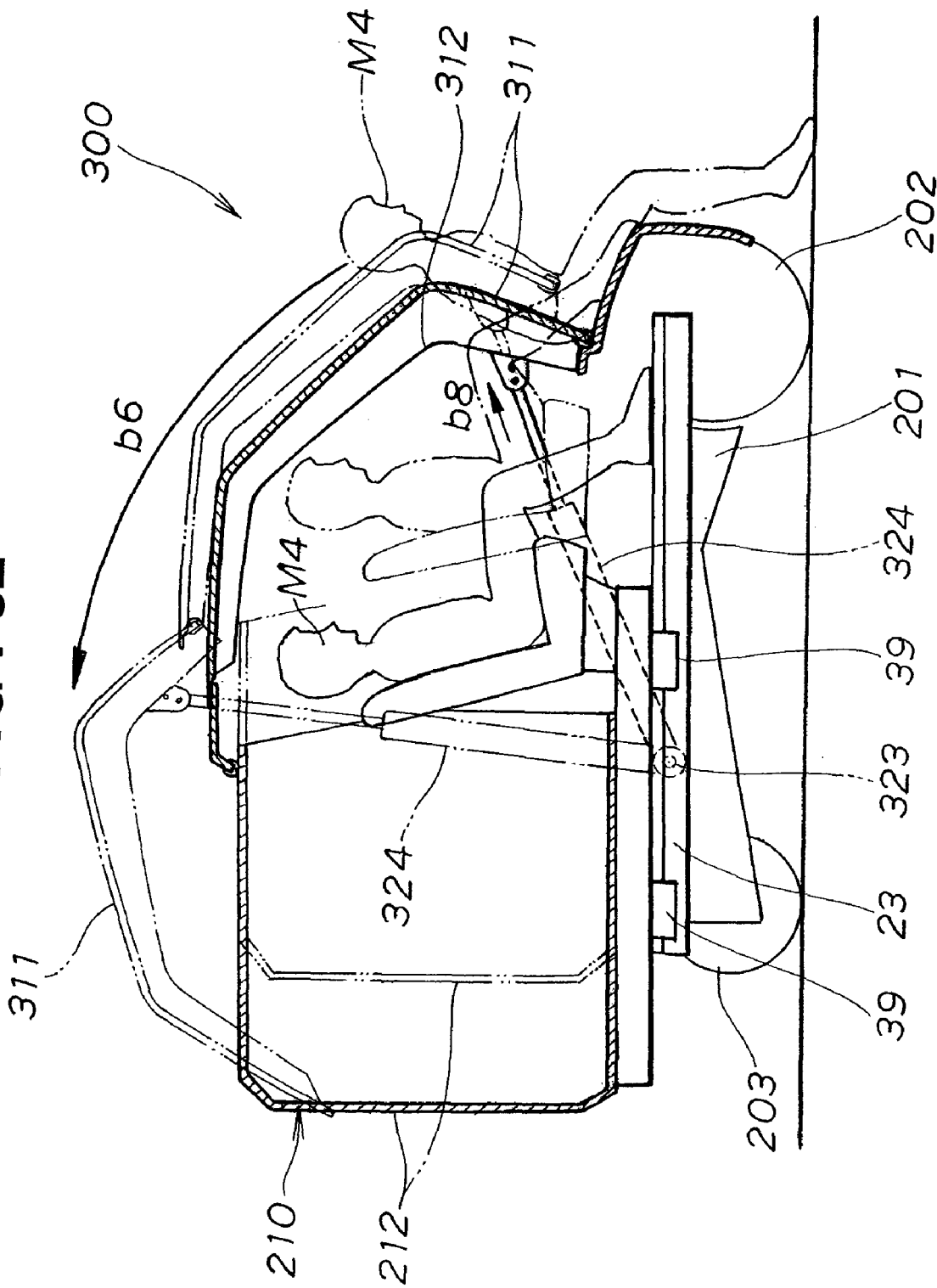
FIG. 62 illustrates in cross-section the vehicle including a roof having a movable, pivotable front roof, a middle roof and a rear roof movable into the middle roof, as viewed in right side elevation.

As shown in FIG. 60 to FIG. 62, the roofed contractible vehicle 300 includes a front roof drive device 320 for opening/closing the front roof 311, a rear roof drive device 330 for moving the rear roof 212 in the front-and-rear direction of the vehicle 300, and a slide locking device 340 for preventing the movement of the rear roof 212.

The front roof drive device 320 includes an electric motor 321 for the front roof 311, the pivot shaft 323 connected to a motor shaft of the roof electric motor 321 via a worm gear 322, and right and left hydraulic cylinders 324, 324. The motor 321 is mounted to the body frame 201. The pivot shaft 323 extends transversely of the vehicle body. Each hydraulic cylinder 324 has its one end fixedly mounted to the pivot shaft 323. The one end of each hydraulic cylinder 323 is not rotatable relative to the pivot shaft 323. The other end of each hydraulic cylinder 324 is connected to the front part of the front roof 311. The respective hydraulic cylinders 324, 324 extend upwardly and forwardly. The hydraulic cylinders 324, 324 have pistons movable to the most advanced position as shown by an arrow b8. The movement of the pistons to the most advanced position causes the front roof 311 to move forwardly and upwardly as shown by an arrow b9. The electric motor 321 is operated to rotate the pivot shaft 323, as shown by an arrow b10, such that the front roof 311 pivots upwardly and rearwardly together with the hydraulic cylinders 324, 324, as shown by an arrow b6.

As shown in FIG. 60, the rear roof drive device 330 includes a pair of right and left hydraulic cylinders 331, 331. Each of the hydraulic cylinders 331, 331 has one end mounted to the front part of the vehicle body frame 201 and the other end mounted to a lower part of the rear roof 212. The slide locking device 340 includes a solenoid for locking the rear roof 212 in position when the roofed contractible vehicle 300 is extended to a state where the driver can sit on the driver's seat to drive the vehicle 300.

As shown in FIG. 60, the steering column unit 208 is designed to pivot on a hinge 351 in the front-and-rear direction of the vehicle 300. The steering column unit 208 includes a swing locking device 352 for locking the unit 208 in an upright position. The swing locking device 352 includes a stationary pin 353, and a lock arm 354 designed to be hooked or get caught on the pin 353 so as to lock the steering column unit 208 in the upright position. The device 352 includes a release lever 355 operable to remove the lock arm 354 from the pin 353. Removal of the lock arm 354 from the pin 353 brings the steering column unit 208 out of the upright position. Upon coming out of the upright position, the unit 208 can be tilted forwardly as shown by an arrow b11.

Discussion will be made as to the function of the thus arranged roofed contractible vehilde 300 with reference to FIG. 63 through FIG. 68.

Figure 63:
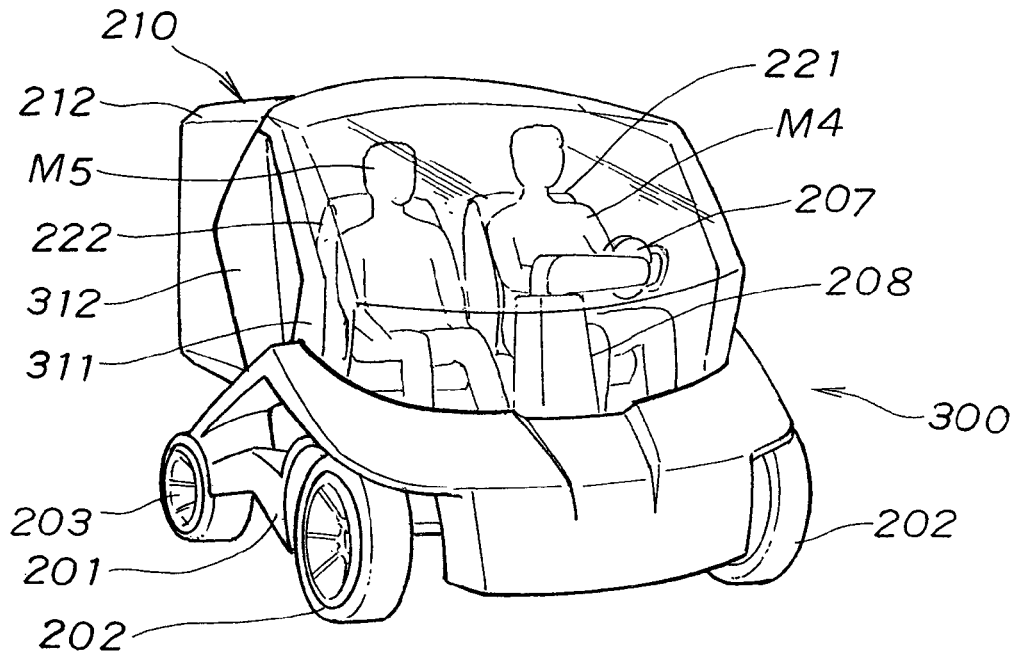
FIG. 63 illustrates the vehicle of FIG. 58 steered by a driver with a passenger sitting side by side with the driver.

As shown in FIG. 63, a driver M4 and a passenger M5 can get on the roofed contractible vehicle 300. The passengers M4, M5 get off the roofed contractible vehicle 300 through the following steps.

Figure 64:
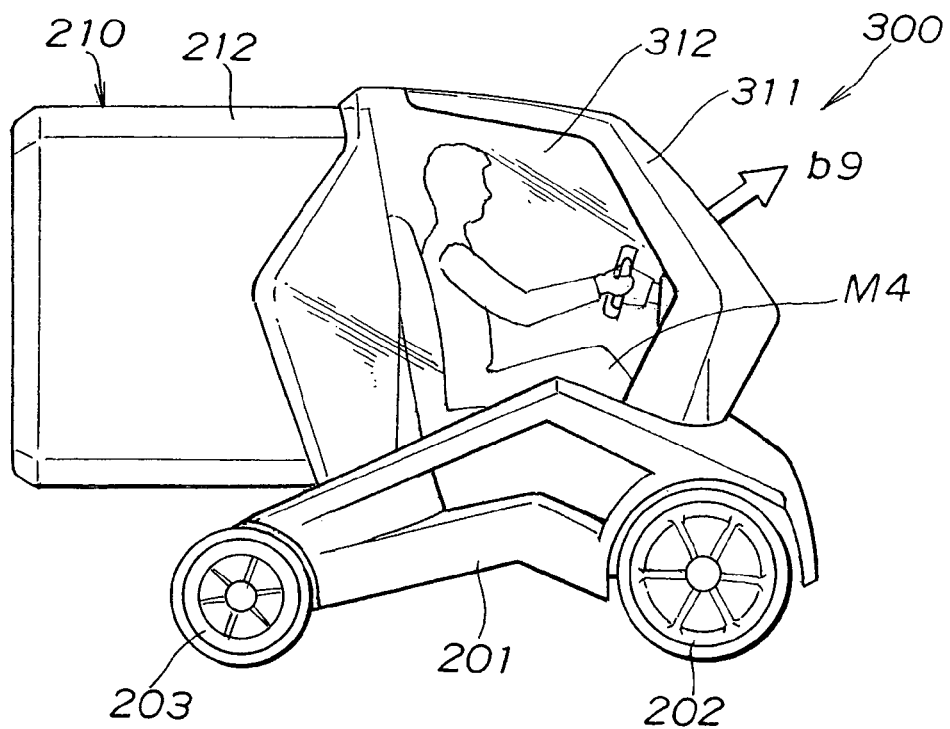
FIG. 64 is a side elevation view of the vehicle of FIG. 58 when the driver stops driving the vehicle.
Figure 65:
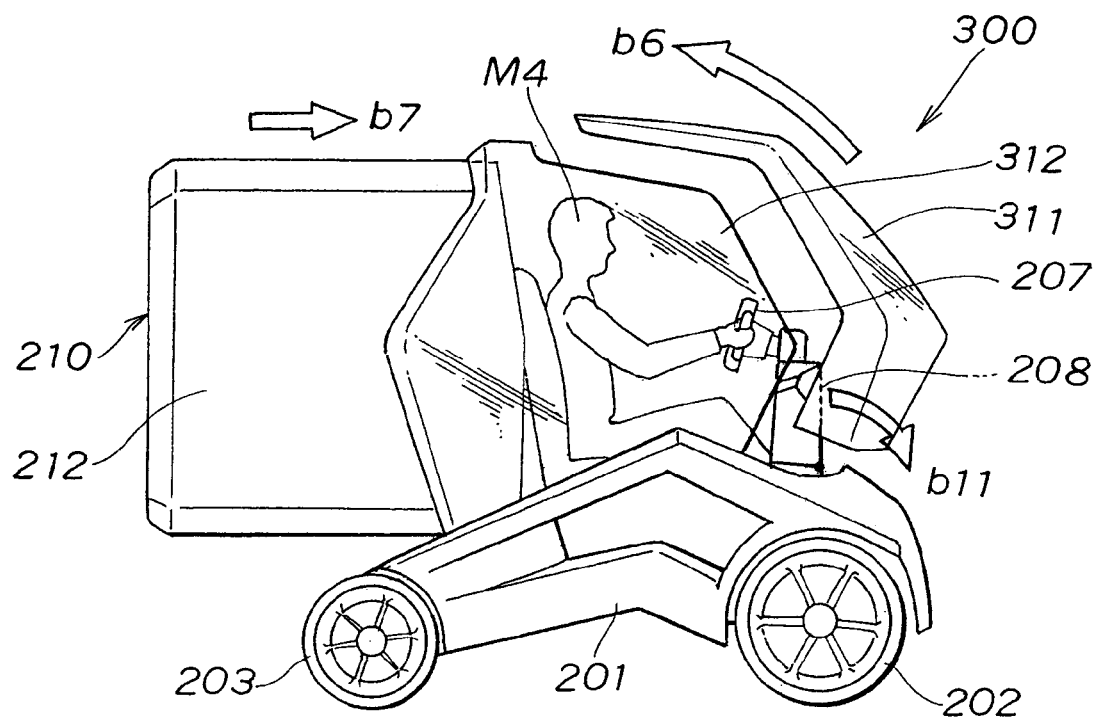
FIG. 65 is the view of FIG. 64 with the front roof moved forwardly and with the rear roof moved into the middle roof.
Figure 66:
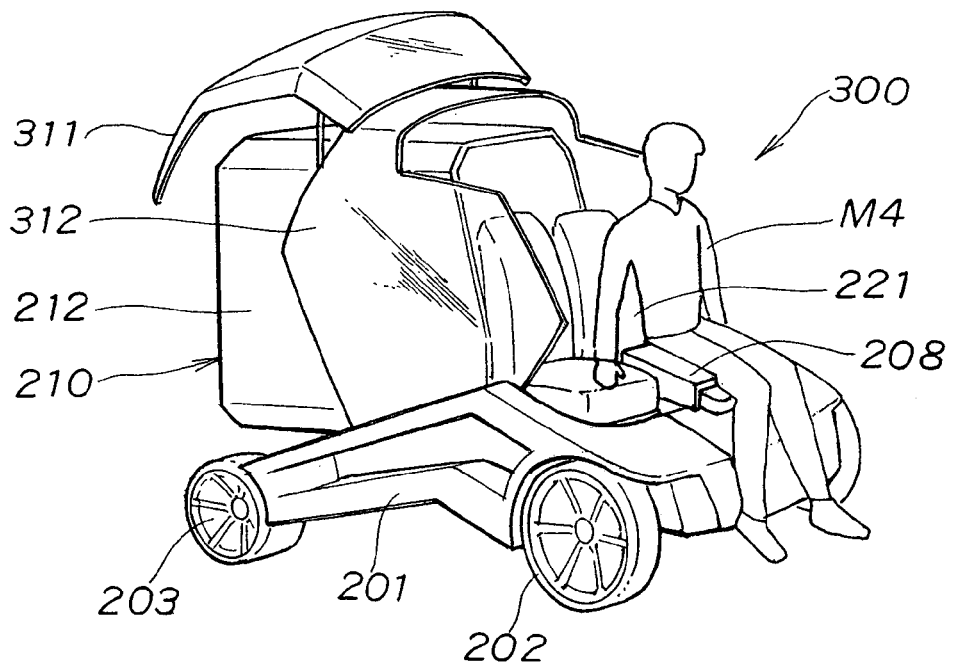
FIG. 66 is the view of FIG. 65 with the front roof pivoted rearwardly to allow the driver to get off the vehicle.
Figure 67:
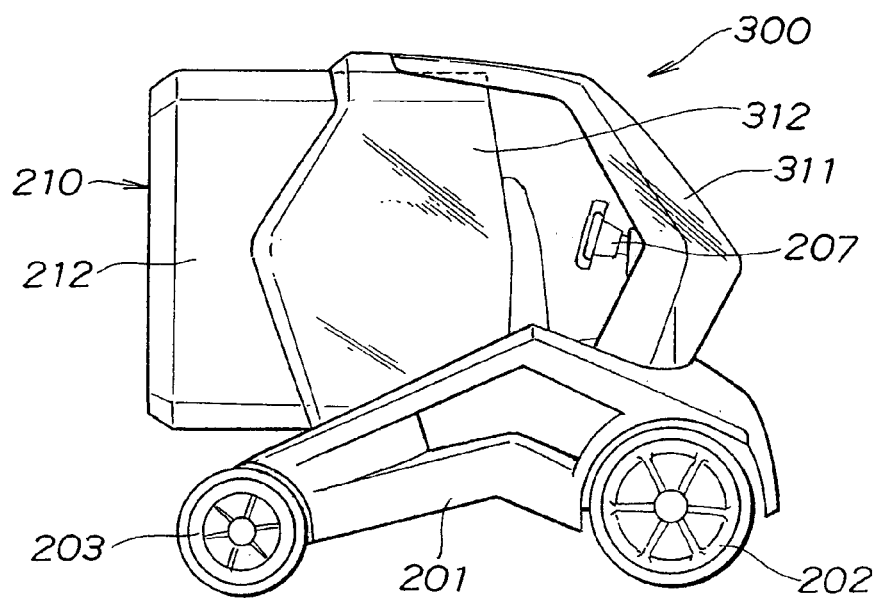
FIG. 67 is the view of FIG. 66 with the front roof pivoted back to its original position and with rear roofs positioned within the middle roof.

First, the roofed contractible vehicle 300 is stopped, after which the front roof 311 is moved upwardly and forwardly as shown by an arrow b9 of FIG. 64. The rear roof 212 is then moved forwardly as shown by an arrow b7 of FIG. 65 to bring the vehicle 300 to a contracted state. Thereafter, the front roof 311 is pivoted upwardly and rearwardly as shown by an arrow b6 of FIG. 65. Since the rear roof 212 is in the forward moved position, the front roof 311 can be pivoted by a greater amount or distance. Then, the steering column unit 208 is tilted forwardly as shown by an arrow b11. As a result, the vehicle 300 has the forwardly moved rear roof 212, the pivoted front roof 311 and the tilted unit 208, as shown in FIG. 66. The thus arranged vehicle 300 is opened at its front side. The passengers M4, M5 can easily exit the passenger compartment 213 by passing through the opened front side to thereby get off the vehicle 300. Thereafter, as shown in FIG. 67, the steering column unit 208 and the front roof 311 are returned to their original positions. More specifically, the unit 208 is moved back to the upright position while the front roof 311 is pivoted back to close the front side of the vehicle 300. This enables the roofed contractible vehicle 300 to be parked in the contracted state.

Figure 68:
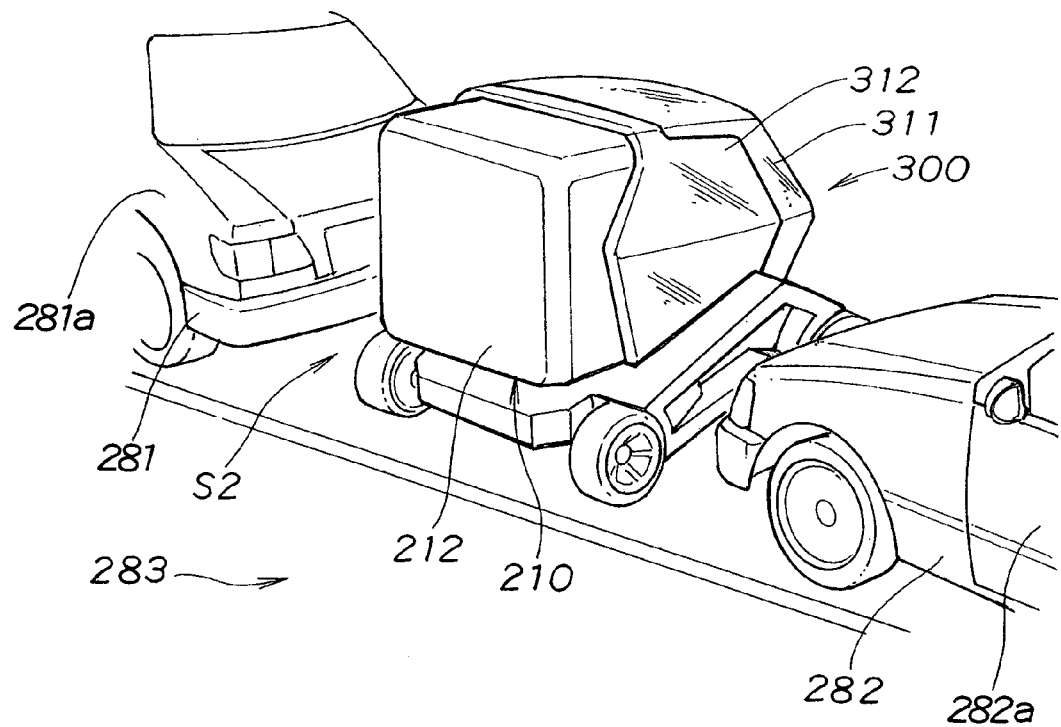
FIG. 68 illustrates the vehicle parked in a space provided between vehicles parked in tandem, with the front and rear roofs held in the positions as shown in FIG. 67.

Reference is made to FIG. 68. When vehicles 281, 281 parked in tandem are spaced from each other by a distance slightly larger than the width of the roofed contractible vehicle 300 to provide a free space S2, the vehicle 300 may be parked in the space S2 as follows.

First, the roofed contractible vehicle 300 is moved in a direction perpendicular to a longitudinal direction of the vehicles 281, 282 for entry into the space S2. The vehicle 300 is then parked in orientation transverse with respect to the longitudinal direction of the vehicles 281, 282. Secondly, the passengers get off the vehicle 300, after which the roofed contractible vehicle 300 is contracted. The thus contracted vehicle 300 has no portion positioned more closely to the center of a road 283 than sides 281a, 282a of the vehicles 281, 282. In other words, the vehicle 300 is parked within the space S2 without projecting towards the center of the road 283 through the plane in which the sides 281a, 282a lie. When getting off the vehicle 300, the passengers can pass through the opened front side of the vehicle 300 directly onto a sidewalk.

As is clear from the above description, the roofed contractible vehicle 300 in the seventh embodiment has the driver's seat 221 movable in the front-and-rear direction thereof, and the roof 210 operable or movable simultaneously with the movement of the driver's seat 221.

The vehicle 300 includes the driver's seat 221 to be taken by the driver, and the roof 210 disposed above the driver's seat 221. The driver's seat 221 is movable in the front-and-rear direction of the vehicle 300. The roof 210 includes the rear roof movable in the front-and-rear direction of the vehicle 300 together with the driver's seat 221.

When the driver's seat 221 moves in the front-and-rear direction of the vehicle 300, the rear roof 212 disposed above the seat 221 moves in the front-and-rear direction of the vehicle 300. The vehicle 300 can be contracted into the smaller entire length, if desired. It thus becomes possible for the vehicle 300 to be parked even in a small space.

The vehicle 300 has the two roof halves (the front and rear roofs) 311, 212 continuous with each other through the middle roof 312. The rear roof 212 is sidable relative to the middle roof 312. The passenger compartment (the cabin) 213 can be protected from rain regardless of the sliding movement of the rear roof 212.

The roof 210 of the vehicle 300 includes the first box-shaped member (the front roof) 311 opened rearwardly, the middle roof 312 positioned centrally thereof, and the second box-shaped member (the rear roof) 212. The second box-shaped member 212 is disposed to fit into the middle roof 312 and the first box-shaped member 311. More specifically, the second box-shaped member 212 is movable through the middle roof 312 into the first box-shaped member 311. The first box-shaped member 311 is disposed to pivot upwardly and rearwardly on the shaft 323 provided at the rear part of the vehicle body. The pivotal movement of the first box-shaped member 311 causes the passengers to easily pass through the front side of the vehicle into or out of the passenger compartment 213.

The roof 210 optionally may include the middle roof 312. Accordingly, the roof 210 may include the two roof halves (the front and rear roofs) 311, 212 without the middle roof 312 being interposed therebetween.

Figure 69:
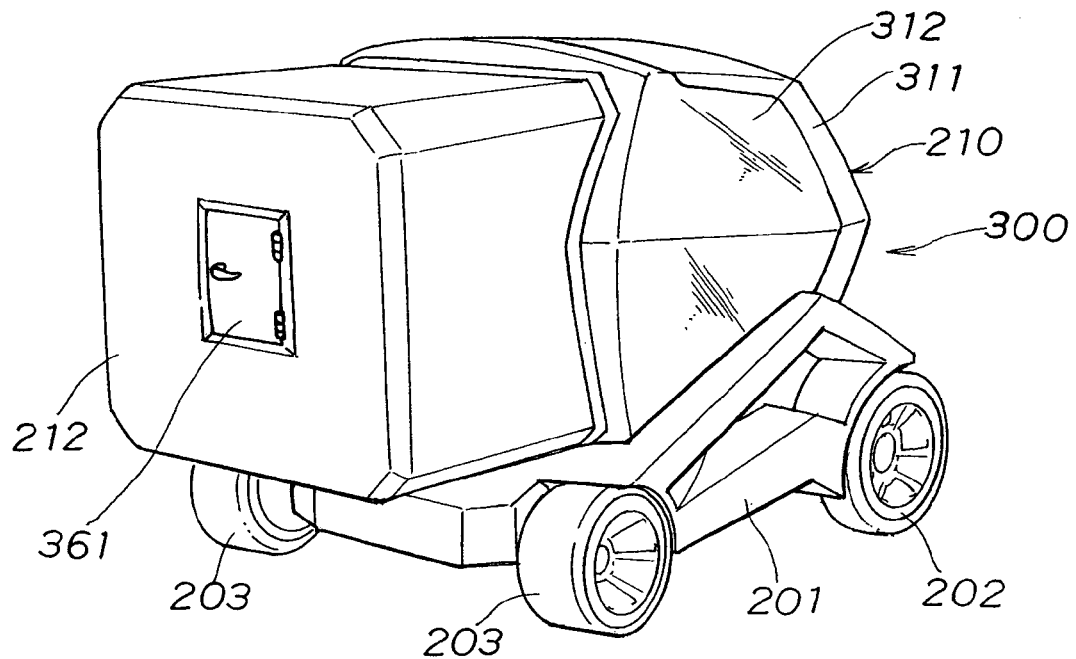
FIG. 69 illustrates a modification of the vehicle of FIG. 58.
Figure 70:
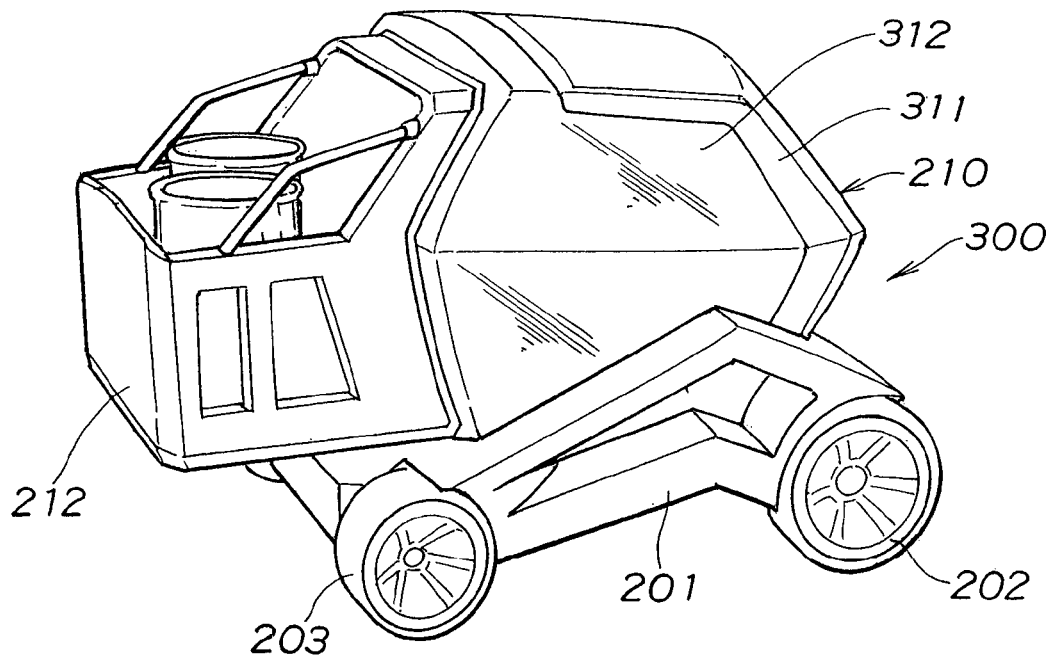
FIG. 70 illustrates a further modification of the vehicle of FIG. 58.
Figure 71:
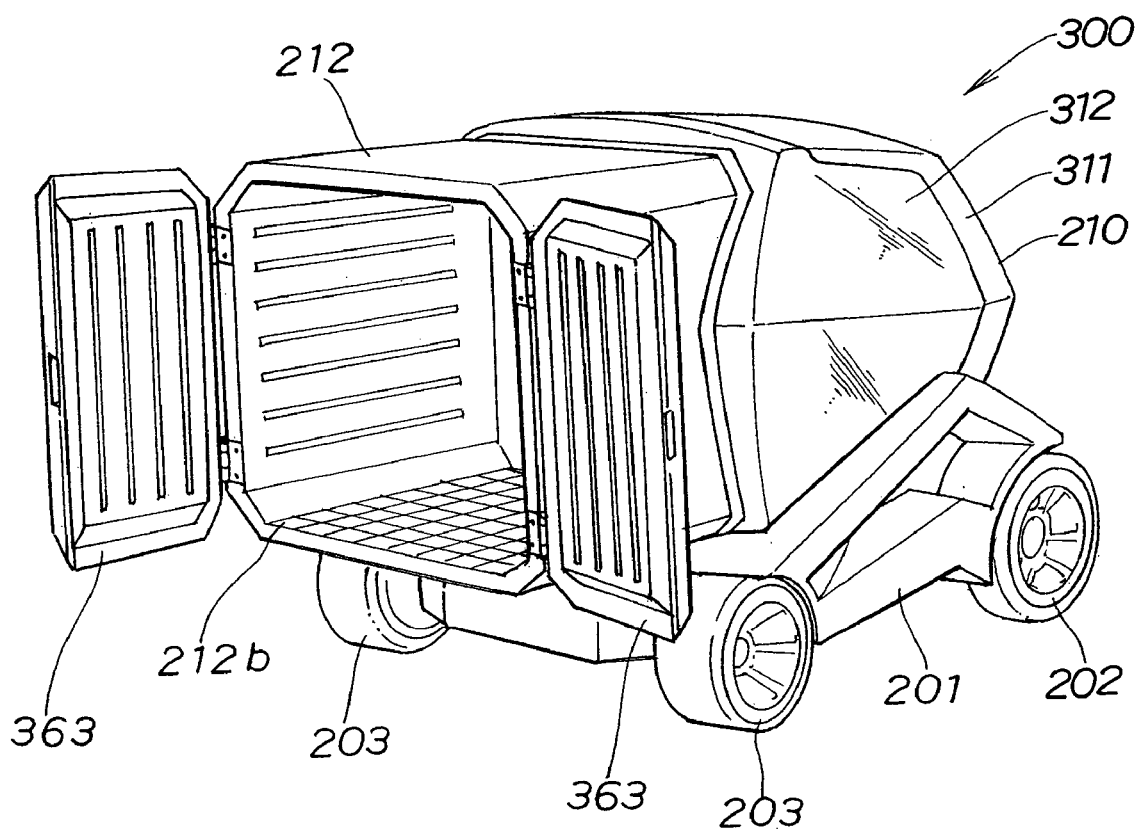
FIG. 71 illustrates a further modification of the vehicle of FIG. 58.

Referring to FIG. 69 through FIG. 71, there are modifications to the rear roof 212 of the vehicle 300. It will be appreciated that vehicles as shown in FIG. 69 to FIG. 71 are identical to the vehicle 300 in other components than the rear roof The other components are denoted by the same reference numerals as those in the seventh embodiment and their descriptions will be omitted.

As shown in FIG. 69, the modified rear roof 212 serves as an icecream box for stocking icecream. Reference numeral 361 denotes a door mounted to the roof 212. With the door 361 opened, the stock of icecream can be taken out from within the box 212.

As shown in FIG. 70, the rear roof 212 is modified into a carrier opened upwardly. The vehicle 300 having such a modified rear roof 212 is called a pickup truck.

As shown in FIG. 71, the rear roof 212 is modified into a storage compartment which is opened rearwardly. In other words, the rear roof 212 taking the form of the storage compartment has an opening 212b formed at a rear side thereof. The rear roof 212 includes doors 363, 363 mounted to right and left rear edges thereof. Each door 363 is arranged to pivot sideways to open and close the opening 212b.

The vehicle 300 can be parked in a small space during commercial use, for example, delivery or transportation of goods as shown in FIG. 69 to FIG. 71.

It should be understood that the illustrated embodiments are considered as exemplary only. It will be understood that various components as described in the different embodiments may be used in combination to provide a four-wheeled vehicle without departing from the scope and spirit of the present invention. It is to be understood that the rear roof especially of the vehicle having the passenger compartment as shown in FIG. 50 to FIG. 71 may be modified for various applications to provide improved usefulness.

The power unit part(s) 407 (601) may be provided below either one or both of the driver's seat 411 and the rear passenger seat 412.

The side support members 507, 507 as shown in FIG. 6 and FIG. 7 may be provided integrally with the storage portion 472 or the rear pillars 553, 553.

The present disclosure relates to the subject matters of Italian Patent Application No. TO2002A000687, filed Jul. 31, 2002, and Japanese Patent Application No. 2003-157359, filed Jun. 2, 2003, the disclosures of which are expressly incorporated herein by reference in their entireties.

What is claimed is:

1. A four-wheeled vehicle comprising:
a steering mechanism having a bar handle;
a front part having right and left front wheels;
a rear part having right and left rear wheels;
the front and rear wheels defining a straight line at a level extending in a longitudinal direction through uppermost points of the front and rear wheels;
a driver's seat disposed at said front part; and
a rear passenger seat disposed behind said driver's seat with a backrest for the driver therebetween, said driver's seat and said rear passenger seat cooperating with each other to provide a single seat, said backrest being positioned at an intermediate part of said single seat, said rear passenger seat facing forwardly, the rear passenger seat is entirely positioned forwardly of forwardmost points of the rear wheels, the rear passenger seat has bulged portions provided at opposite sides thereof for providing a larger width than the driver's seat, and the bulged portions allow the rear passenger seat to be occupied by two passengers sitting thereon side-by-side;
wherein the driver's seat is disposed at substantially the same level as the straight line, such that in side view, more of the driver's seat is located below the straight line than above it so long as some of the driver's seat is located above the straight line, and the rear passenger seat is disposed at a higher level than the driver's seat;
an engine disposed underneath the rear passenger seat and below the straight line;
the vehicle having a width and an overall length, and the width is substantially half the overall length;
whereby said vehicle with driver and passenger maintains a low center of gravity.

2. A four-wheeled vehicle according to claim 1, wherein said driver's seat includes a front part having driver's footrests provided at opposite sides thereof, said driver's seat being formed to allow a driver to sit astride thereon with his feet rested on said footrests.

3. A four-wheeled vehicle according to claim 2, further comprising rear passenger's footrests disposed behind said diver's footrests.

4. A four-wheeled vehicle according to claim 2, wherein each of said footrests has a side edge projecting upwardly.

5. A four-wheeled vehicle according to claim 4, wherein said right front wheel and said right rear wheel provide a first straight line extending therethrough, said left front wheel and said left rear wheel provide a second straight line extending therethrough, and said side edges are positioned within a region defined between said first and second straight lines when viewed in top plan.

6. A four-wheeled vehicle according to claim 1, wherein said driver's seat and said rear passenger seat are opened at opposite sides thereof.

7. A four-wheeled vehicle according to claim 6, further comprising a front cover and a windshield disposed in front of said bar handle, and a body cover disposed behind and below said driver's seat.

8. A four-wheeled vehicle according to claim 7, further comprising a roof member continuous with said windshield and disposed above said driver's seat and said rear passenger seat.

9. A four-wheeled vehicle according to claim 1, further comprising first side support members disposed at opposite sides of said driver's seat.

10. A four-wheeled vehicle according to claim 9, further comprising the backrest disposed behind said driver's seat and united with said first side support members.

11. A four-wheeled vehicle according to claim 1, further comprising second side support members disposed at opposite sides of said rear passenger seat.

12. A four-wheeled vehicle according to claim 11, further comprising a storage portion, a roll bar and roof supporting posts provided behind said rear passenger seat, and at least one of said storage portion, and said roll bar and said roof supporting posts is united with said second side support members.

13. A four-wheeled vehicle according to claim 1, further comprising a torque converter mechanism disposed underneath the rear passenger seat.

14. A four-wheeled vehicle according to claim 13, further comprising a transmission mechanism for transmitting an output from said torque converter mechanism to said right and left rear wheels to drive said right and left rear wheels.

15. A four-wheeled vehicle according to claim 1, wherein said driver's seat is formed to allow the driver to sit astride thereon.

16. A four-wheeled vehicle according to claim 1, wherein the engine is part of a swing-type power unit part disposed below said rear passenger seat, said swing-type power unit is connected to the vehicle by a pivot shaft to allow vertical pivoting of the power unit.

17. A four-wheeled vehicle according to claim 1, wherein the engine is a forwardly directed engine.

18. A four-wheeled vehicle comprising:
a front part having right and left front wheels;
a rear part having right and left rear wheels;
the front and rear wheels defining a straight line at a level extending in a longitudinal direction through uppermost points of the front and rear wheels;
a driver's seat disposed at the front part; and
a rear passenger seat disposed behind said driver's seat with a backrest for the driver therebetween, said rear passenger seat facing forwardly, and the rear passenger seat is entirely positioned forwardly of forwardmost points of the rear wheels, the rear passenger seat has bulged portions provided at opposite sides thereof for providing a larger width than the driver's seat, and the bulged portions allow the rear passenger seat to be occupied by two passengers sitting thereon side-by-side;
an engine disposed underneath the rear passenger seat and below the straight line;
the vehicle having a width and an overall length, and the width is substantially half the overall length;
wherein the driver's seat is disposed at substantially the same level as the straight line such that in side view, more of the driver's seat is located below the straight line than above the straight line so long as some of the driver's seat is located above the straight line, and the rear passenger seat is disposed at a higher level than the driver's seat.

* * * * *